United States Patent
Yushin et al.

(10) Patent No.: US 11,552,328 B2
(45) Date of Patent: Jan. 10, 2023

(54) LITHIUM BATTERY CELL INCLUDING CATHODE HAVING METAL FLUORIDE CORE-SHELL PARTICLE

(71) Applicant: Sila Nanotechnologies Inc., Alameda, CA (US)

(72) Inventors: Gleb Yushin, Atlanta, GA (US); Laura Gerber, Oakland, CA (US); Matthew Clark, Oakland, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 131 days.

(21) Appl. No.: 16/748,056

(22) Filed: Jan. 21, 2020

(65) Prior Publication Data

US 2020/0235420 A1 Jul. 23, 2020

Related U.S. Application Data

(60) Provisional application No. 62/794,424, filed on Jan. 18, 2019.

(51) Int. Cl.
| | | |
|---|---|---|
| *H01M 10/0525* | (2010.01) | |
| *H01M 4/134* | (2010.01) | |
| *H01M 10/0565* | (2010.01) | |
| *H01M 4/133* | (2010.01) | |
| *H01M 50/46* | (2021.01) | |

(52) U.S. Cl.
CPC ....... *H01M 10/0525* (2013.01); *H01M 4/133* (2013.01); *H01M 4/134* (2013.01); *H01M 10/0565* (2013.01); *H01M 50/46* (2021.01); *H01M 2300/0082* (2013.01)

(58) Field of Classification Search
CPC ......... H01M 10/0525; H01M 10/0565; H01M 50/46; H01M 4/133; H01M 4/134
USPC ................................................ 429/188, 218.1
See application file for complete search history.

(56) References Cited

U.S. PATENT DOCUMENTS

| | | | |
|---|---|---|---|
| 6,335,123 B1 * | 1/2002 | Lascaud | H01B 1/122 429/306 |
| 2003/0044688 A1 * | 3/2003 | Kang | H01M 10/0565 429/317 |
| 2006/0014066 A1 * | 1/2006 | Nishimoto | C08F 8/44 429/493 |

(Continued)

FOREIGN PATENT DOCUMENTS

| | | | | |
|---|---|---|---|---|
| WO | WO-2014129971 A1 * | 8/2014 | | H01M 10/052 |
| WO | WO-2014129972 A1 * | 8/2014 | | H01B 1/122 |
| WO | WO-2016196873 A1 * | 12/2016 | | H01M 10/052 |

*Primary Examiner* — Sean P Cullen
(74) *Attorney, Agent, or Firm* — Muncy, Geissler, Olds & Lowe, P.C.; Daniel Podhajny

(57) ABSTRACT

An embodiment is directed to a Li metal or Li-ion battery, including a conversion-type metal fluoride comprising cathode capable of storing and releasing Li ions during battery operation, a conversion-type type or Li metal-type anode capable of storing and releasing Li ions during battery operation, a separator membrane ionically coupling and electronically insulating the cathode and the anode, and a solid electrolyte with a Li transference number in the range from around 0.7 to around 1.0 impregnating at least the cathode, wherein the cathode comprises composite a core-shell particle and has an areal capacity loading that ranges from around 2 mAh/cm² to around 12 mAh/cm².

21 Claims, 8 Drawing Sheets

(56) References Cited

U.S. PATENT DOCUMENTS

| | | | | |
|---|---|---|---|---|
| 2012/0202112 | A1* | 8/2012 | Yushin | H01M 4/463 |
| | | | | 429/200 |
| 2013/0344391 | A1* | 12/2013 | Yushin | H01M 4/587 |
| | | | | 429/231.8 |
| 2014/0234715 | A1* | 8/2014 | Fasching | H01M 4/04 |
| | | | | 429/220 |
| 2015/0155546 | A1* | 6/2015 | Yushin | H01M 4/1397 |
| | | | | 427/78 |
| 2016/0104882 | A1* | 4/2016 | Yushin | H01M 4/388 |
| | | | | 429/218.1 |
| 2017/0005356 | A1* | 1/2017 | Zimmerman | B01J 47/12 |
| 2017/0018768 | A1* | 1/2017 | Yushin | H01M 4/38 |
| 2017/0170515 | A1* | 6/2017 | Yushin | H01M 10/052 |

* cited by examiner

LITHIUM BATTERY CELL INCLUDING CATHODE HAVING METAL FLUORIDE CORE-SHELL PARTICLE

CROSS-REFERENCE TO RELATED APPLICATIONS

The present application for patent claims the benefit of U.S. Provisional Application No. 62/794,424, entitled "LITHIUM FLUORIDE-BASED AND RELATED CATHODE COMPOSITIONS AND BATTERIES COMPRISING THE SAME," filed Jan. 18, 2019, which is expressly incorporated herein by reference in its entirety.

BACKGROUND

Field

The present disclosure relates generally to energy storage devices, and more particularly to metal and metal-ion battery technology and the like.

Background

Owing in part to their relatively high energy densities, relatively high specific energy, light weight, and potential for long lifetimes, advanced rechargeable metal batteries and rechargeable metal-ion batteries such as lithium-ion (Li-ion) batteries are desirable for a wide range of consumer electronics, electric vehicle, grid storage and other important applications. Similarly, primary metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these batteries is needed, particularly for potential applications in low- or zero-emission, hybrid-electrical or fully-electrical vehicles, consumer electronics, energy-efficient cargo ships and locomotives, drones, flying cars, electric aviation, aerospace applications, and power grids.

Conversion-type electrodes, such as metal fluorides, metal chlorides, metal iodides, metal sulfides, sulfur, oxides, metal nitrides, metal phosphides, metal hydrides and others for Li-ion batteries offer high gravimetric and volumetric capacities. In these electrodes, so-called conversion reactions take place when metal ions such as Li are inserted or extracted during battery operation. For example, an iron-III fluoride (e.g., $FeF_3$) is converted to $3LiF$ and $Fe$ during an electrochemical reaction of $FeF_3$ with Li ions during Li-ion or Li cell discharge.

Metal fluorides offer a combination of relatively high average voltage and high capacities but suffer from several limitations for various metal-ion (such as Li-ion) battery chemistries. For example, only select metal fluoride particles have been reported to offer some reasonable (although still poor) cycle stability in Li-ion battery cells (specifically $AgF_2$, $FeF_2$, $FeF_3$, $CoF_2$, and $NiF_2$). Many other metal fluorides are generally believed not to be practical for applications in Li-ion batteries due to the irreversible changes that occur in such cathodes during battery operation. For example, during Li-ion insertion into some of the other fluorides (such as $CuF_2$, for example) and the subsequent formation of LiF during the conversion reaction, the original fluoride-forming element (such as Cu in the case of $CuF_2$) produces electrically isolated (Cu) nanoparticles. Being electrically isolated, such nanoparticles cannot electrochemically react with LiF to transform back into $CuF_2$ during subsequent Li extraction, thereby preventing reversibility of the conversion reaction. As a result, after a discharge, the cell cannot be charged back to the initial capacity. In addition to formation of electrically isolated nanoparticles, the irreversible growth of LiF and metal (M) clusters during cycling and the resulting growth of resistance may be yet another serious limitation. This additionally limits the rate performance of such chemistries. Moreover, many attractive (in terms of high theoretical energy density) metal fluorides (such as $CuF_2$) suffer from another degradation mechanism: during Li (or Li-ion) battery operation, the cathode is often exposed to a potential level where a metal (of the corresponding metal fluoride, such as Cu metal) is oxidized and dissolves into the electrolyte at the potential below the potential required for charging the cell. The dissolved metal ions migrate to the anode and get irreversibly reduced. This process leads to rapid irreversible capacity losses and cell degradation, and may be particularly serious for some of the most otherwise-attractive metal fluoride cathode materials (such as $CuF_2$-based cathodes). Metal chlorides suffer from similar limitations. In addition, their dissolution during cycling induces formation of Cl-containing ions that corrode cathode current collectors.

Even the cathodes based on those metal fluorides that are believed to be most practical due to their relatively reversible operation and reasonably low cost (such as $FeF_2$, $FeF_3$, $NiF_2$ and others), suffer from multiple limitations including: (i) relatively low electrical conductivity of fluorides, which limits their utilization and both energy and power characteristics in batteries; (ii) relatively low ionic conductivity, which limits their utilization and both energy and power characteristics in batteries; (iii) volume expansion during Li-ion insertion, which may cause mechanical and electrical degradation in the electrodes during battery operation; (iv) gradual segregation of metal and LiF clusters, which significantly reduce energy efficiency and increase cell resistance; and (v) accelerated decomposition of the electrolyte and irreversible consumption of cyclable Li, which leads to capacity fading, particularly at elevated temperatures.

As a result, despite multiple theoretical advantages of fluoride-based cathodes (and some of the chloride-based cathodes), for example, their high specific capacity and practical application in metal-ion batteries are difficult to achieve because cells produced with fluoride-based cathodes currently suffer from poor stability, volume changes, slow charging, and high impedance.

Several approaches have been developed to overcome some of the above-described difficulties, but none have been fully successful in overcoming a sufficient number of them so as to make their application practical.

For example, decreasing particle size decreases the ion diffusion distance, and offers one approach to addressing the low ionic conductivity limitation. However, nanopowders suffer from high electrical resistance caused by the multiple, highly resistive point contacts formed between the individual particles. In addition, small particle size increases the specific surface area available for undesirable electrochemical (or chemical) side reactions. Furthermore, simply decreasing the particle size does not address, and may in some cases exacerbate, other limitations of such materials, such as volume changes as well as weakening of the particle-binder interfaces. Moreover, in contrast to using micron-scale particles for cathode formulations, handling nanoparticles and using them to prepare dense electrodes is technologically difficult. Nanoparticles are difficult to disperse uniformly within conductive carbon additives and the binder of the cathode, and an undesirable formation of agglomerates of nanoparticles tends to take place. Formation of such agglomerates reduces the electrode density (thus reducing volume-normalized capacity and energy density of the cells), reduces electrode stability (since the binder and conductive additives do not connect individual particles within such agglomerates) and reduces capacity utilization (since some of the nanoparticles become electrically insulated and thus do not participate in Li-ion storage).

In another approach, select metal fluoride particles which offer some reasonable cycle stability in Li-ion battery cells (specifically $FeF_2$, $FeF_3$, $CoF_2$, and $NiF_2$) may be mechanically mixed with or deposited onto the surface of conductive substrates, such as carbon black, graphite, multi-walled carbon nanotubes, or carbon fibers. In this case, the high electrical conductivity of the carbon enhances electrical conductivity of the electrodes. However, many degradation mechanisms (including those discussed above) are not addressed by this approach. In addition, the phase transformations during battery operation and the volume changes discussed above may induce a separation of the active material from the conductive additives, leading to resistance growth and battery degradation.

In yet another approach, select metal fluoride particles (specifically, $FeF_2$ particles) may be coated with a solid multi-walled graphitic carbon shell layer. In this case, the electrical conductivity of a metal fluoride cathode may be improved. However, the above-described volume changes during metal-ion insertion may break the graphitic carbon coating and induce irreversible capacity losses. Similarly, the phase transformation during subsequent charging and discharging cycles may induce a separation of the active material from the graphitic carbon shell, leading to resistance growth and battery degradation. Furthermore, some of the carbon shells are incredibly difficult to deposit on selected metal fluorides (such as copper fluorides) and chlorides due to the simultaneous metal fluoride reduction (for example, reduction of $Cu^{2+}$ in $CuF_2$ to metallic $Cu^0$).

Accordingly, there remains a need for improved metal and metal-ion batteries, components, and other related materials and manufacturing processes.

SUMMARY

Embodiments disclosed herein address the above stated needs by providing improved battery components, improved batteries made therefrom, and methods of making and using the same.

An embodiment is directed to a Li metal or Li-ion battery, including a conversion-type metal fluoride comprising cathode capable of storing and releasing Li ions during battery operation, a conversion-type type or Li metal-type anode capable of storing and releasing Li ions during battery operation, a separator membrane ionically coupling and electronically insulating the cathode and the anode, and a solid electrolyte with a Li transference number in the range from around 0.7 to around 1.0 impregnating at least the cathode, wherein the cathode comprises composite a core-shell particle and has an areal capacity loading that ranges from around 2 $mAh/cm^2$ to around 12 $mAh/cm^2$.

BRIEF DESCRIPTION OF THE DRAWINGS

The accompanying drawings are presented to aid in the description of embodiments of the invention and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
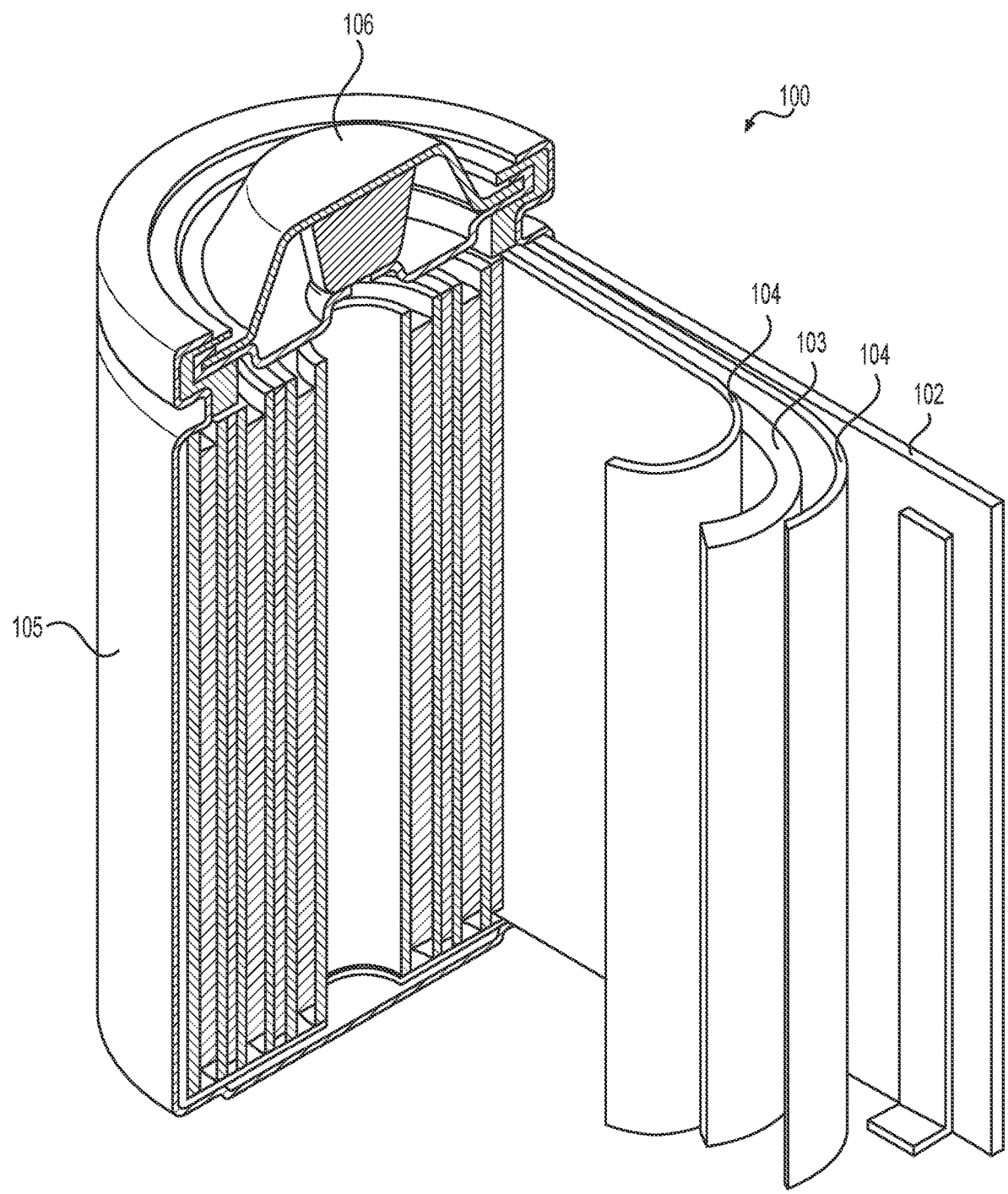
FIG. 1 illustrates an example metal-ion (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

While the description below may describe certain examples in the context of Li metal and Li-ion batteries (for brevity and convenience, and because of the current popularity of Li technology), it will be appreciated that various aspects may be applicable to other rechargeable and primary, metal and metal-ion batteries (such as Na metal and Na-ion, Mg metal and Mg-ion, K metal and K-ion, Ca metal and Ca-ion, Al metal and Al-ion, and others).

While the description below may also describe certain examples of the cathode material formulations either in a Li-free (e.g., charged) state or in a fully lithiated (e.g., discharged) state (e.g., as LiF-metal composites), it will be appreciated that various aspects may be applicable to various Li-containing electrodes (e.g., in either a partially or fully discharged state) or to essentially Li-free electrodes (e.g., in either a partially or fully charged state).

While the description below may also describe certain examples of Li presence in the form of the LiF, it will be appreciated that various aspects may be applicable when Li may be contained in the oxides, oxyfluorides, polymers (including conductive polymers) and other components of the cathode material formulations.

While the description below may describe certain examples of Li-ion batteries with LiF-comprising cathodes and Si-comprising anodes, it will be appreciated that various aspects may be applicable to battery cells comprising no Si in the anodes or no LiF in the cathodes.

While the description below may describe certain examples in the context of LiF chemistry, it will be appreciated that various aspects may be applicable to other lithium halide chemistries (such as LiCl, for example) or other alkali halide chemistries (such as NaF or KF or NaCl, for example) or alkaline earth halide chemistries (such as $CaF_2$ or $CaCl_2$, for example).

While the description below may describe certain examples in the context of "pure" fluoride-based chemistry of active conversion-type cathode materials (e.g., LiF and Cu, LiF and Fe, LiF and Fe—Cu, $FeF_3$, $CuF_2$, $NiF_2$, $BiF_3$, $MnF_3$, Cu—Fe—$F_{2-3}$, Cu—Fe—Mn—$F_{2-3}$, Cu—Fe—Ni—$F_{2-3}$, Cu—Bi—$F_{2-3}$, Cu—Fe—Bi—$F_{2-3}$ and many other "pure" metal fluoride-based chemistries and their mixtures), it will be appreciated that various aspects may be applicable to metal oxyfluorides/oxy-fluorides (e.g., Cu—O—F, Fe—O—F, Fe—Cu—O—F, Cu—Li—O—F, Fe—Li—O—F, Fe—Cu—Li—O—F, Fe—Cu—Mn—Li—O—F, Fe—Cu—Ni—Li—O—F, Fe—Cu—Bi—Li—O—F, and other compositions comprising mixed F and O anions), metal chloro-fluorides (e.g., Cu—Cl—F, Fe—Cl—F, Fe—Cu—Cl—F, Cu—Li—Cl—F, Fe—Li—Cl—F, Fe—Cu—Li—Cl—F, Fe—Cu—Mn—Li—Cl—F, Fe—Cu—Ni—Li—Cl—F, Fe—Cu—Bi—Li—Cl—F, and various other compositions comprising mixed F and Cl anions), metal bromo-fluorides (various compositions comprising mixed F and Br anions), metal oxy-chloro-fluorides (various compositions comprising mixed F, Cl and O anions), metal oxy-bromo-fluorides (various compositions comprising mixed F, Br and O anions), metal sulfo-fluorides (various compositions comprising mixed F and S anions), metal sulfo-oxy-fluorides (various compositions comprising mixed F, O and S anions), their various mixtures, alloys and other combinations and other mixed anions' comprising conversion-type cathode compositions where the atomic ratio of all the present nonmetals (e.g., O, S, Cl, Se and/or others) to F in the cathode material composition (e.g., the atomic ratio of O:F or the atomic ratio of (O and Cl and S and Se):F, etc.) may range from around $10^{-20}$ to around $7 \cdot 10^{-1}$.

While the description below may describe certain examples in the context of Li storage in the cathodes based on the transition metal (such as Cu, Fe, Mn, Ni, Bi, etc.) reduction-oxidation (redox) reactions, it will be appreciated that various aspects may be applicable to materials where a portion of Li storage relies on the anion (such as oxygen, O, etc.) redox reactions in the cathodes. Examples of such materials may include various conversion-type or intercalation-type or mixed type cathode active materials that comprise both fluorine and at least one non-fluorine electronegative element that may exhibit multiple oxidation states, such as oxygen. In some designs, other (more rare) illustrative examples of such materials include those that in addition to metal(s) and fluorine also comprise sulfur or chlorine or other multivalent anions and their various combinations, etc.

While the description below may describe certain examples in the context of Li storage in the cathodes in the potential range from around 1.5 V to around 4-4.2V vs. Li/Li+, it will be appreciated that various aspects may be applicable to reversible Li storage in the potentials above around 4V vs. Li/Li+ (e.g., up to around 5.4 V vs. Li/Li+) or to reversible Li storage in the potentials below around 1.5V vs. Li/Li+ (e.g., down to around 0.5V vs. Li/Li+) or both. Also, it will be appreciated that the lower range of the potentials may be higher than around 1.5 V vs. Li/Li+ and the higher range of potentials may be lower than around 4.0 V vs. Li/Li+.

While the description below may describe certain examples in the context of "pure" conversion-type chemistry of active cathode materials, it will be appreciated that various aspects may be applicable to mixed intercalation/conversion type active materials where both intercalation and conversion mechanisms of Li ion storage may take place during battery cell operation. Furthermore, in some designs, primarily (e.g., between about 50-100%) intercalation-type mechanism(s) of Li ion storage may take place during some range of the cell charge or discharge (as an illustrative but not limited example, from around 0.0% to around 40.0% of the full discharge capacity). Similarly, in some designs, primarily (e.g., between about 50-100%) conversion-type mechanism(s) of Li ion storage may take place during some range of the cell charge or discharge (as an illustrative but not limited example, from around 0.5% to around 100.0% of the full discharge capacity).

While the description below may describe certain examples in the context of fluoride-based chemistry of active conversion-type cathode materials (e.g., LiF and Cu, LiF and Fe, LiF and Fe—Cu, $FeF_3$, $CuF_2$, $BiF_3$, $NiF_2$, Cu—Fe—$F_{2-3}$ and other fluoride-based chemistries), it will be appreciated that various aspects may be applicable to lithium chalcogenide (e.g., $Li_2S$ or $Li_2Se$ or $Li_2$—S—Se, etc.) based and other types of chemistries of conversion-type (including a displacement-type and a chemical transformation-type) active cathode (or anode, including Si-comprising or Si-based) materials.

While the description below may describe certain examples of polymer-comprising cathode (or anode) compositions in the context of specific polymer chemistries, it will be appreciated that various aspects may be applicable to cathodes (or anodes) and batteries (e.g., Li or Li-ion batteries) comprising other polymers, such as those that exhibit sufficiently high ionic conductivity and other suitable performance characteristics or compositional or structural or mechanical or physical or chemical features, as described herein.

While the description below may describe certain examples of Li metal and Li-ion batteries with a combination of conversion-type metal fluoride cathode materials and specific liquid or solid electrolytes, it will be appreciated that various aspects may be applicable to battery cells comprising various other solid and/or semisolid electrolytes, including but not limited to various gel polymer electrolytes, various solid polymer electrolytes (including those where anions are chemically linked to the polymer backbone), various ceramic electrolytes, various glass-ceramic electrolytes, various glass-liquid composite electrolytes, various ceramic-liquid composite electrolytes, various glass electrolytes, various other composite and nanocomposite solid electrolytes (e.g., those that comprise both polymer and inorganic (nano)materials), among others.

While the description below may describe certain examples in the context of particular electrode or electrode particle chemistry, composition, architecture and morphology, certain examples in the context of particular or electrode particle synthesis stages, certain examples in the context of particular electrolyte composition, certain examples in the context of particular electrolyte incorporation into an electrode or a battery cell, it will be appreciated that various aspects may be applicable to battery cells that advantageously incorporate a combination of some of the described electrode chemistries, composition, architecture as well as electrolyte composition and electrode or cell manufacturing methods.

While the description below may describe certain examples in the context of metal fluoride-based electrode chemistry, it will be appreciated that various aspects may be applicable to other types of cathodes as well as various types of anodes (e.g., silicon (Si)-comprising anodes), including various alloying-type anodes (including Li metal anode), conversion-type cathodes and anodes, intercalation-type and mixed type cathodes and anodes. Furthermore, various electrolyte-related aspects of the description may be related to full cells, where electrolyte may be incorporated into the anode, cathode and/or the separator.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

FIG. 1 illustrates an example metal (e.g., Li or Li alloy) or metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic, coin or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104 (and typically the anode 102 and the cathode 103 as well), a battery case 105, and a sealing member 106 sealing the battery case 105.

In some designs, electrolyte (e.g., in the form of a solid electrolyte) may be used as the separator (or separator membrane) 104, while in other designs the electrolyte may interface with one or more other separator components (e.g., a polymeric material, a ceramic material, etc.) to form the separator 104.

Conventional cathode materials utilized in metal-ion batteries are of an intercalation-type. Metal ions are intercalated into and occupy the interstitial positions of such materials during the discharge of a battery. However, such cathodes exhibit small gravimetric and more importantly small volumetric capacities: e.g., typically less than around 220 mAh/g active material and less than around 700 mAh/cm$^3$ at the electrode level, respectively. This low capacity of intercalation-type cathodes limits the energy density and specific energy of metal and metal-ion batteries for some applications.

Fluoride-based cathodes may offer outstanding technological potential due to their very high capacities, in some cases exceeding around 300 mAh/g (and greater than around 1200 mAh/cm$^3$ at the electrode level). For example, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g.

In addition, in cases where the fluoride-forming element is inexpensive, fluoride-based cathodes offer a low-cost potential as well. The 5-year averaged wholesale commodity cost of many fluoride-forming elements is reasonably low. For example, in 2013, the cost of Fe was only around $0.2/kg; the cost of Cu was only around $4-9/kg; the cost of Zn was only around $1-2/kg; the cost of Cd was only around $1/kg; the cost of Pb was only around $1-2/kg; and the cost of Sb was only around $6-15/kg.

However, many fluorides with high theoretical capacity and high theoretical energy density (such as $CuF_2$, $NiF_2$, $MnF_3$, $PbF_2$, $BiF_3$, $BiF_5$, $SnF_2$, $SnF_4$, $SbF_3$, $CdF_2$, $ZnF_2$, and others) have been believed not to be practical for use in rechargeable Li-ion batteries due to the previously observed lack of stability and very large polarizations experimentally observed when they were used in conventional cathode configurations, where metal fluorides were mechanically mixed with carbon additives or deposited on the outer surface of carbon particles. One advantage of some of these so-called "impractical" fluorides (such as $CuF_2$, $PbF_2$, $SnF_2$, $CdF_2$, $ZnF_2$, and others) over more generally used (and still not very practical yet) $FeF_3$ is an experimentally observed flatter discharge curve and often (e.g., in case of $CuF_2$) higher energy density and higher specific energy at the battery cell level.

In contrast to the small structural, chemical, and volumetric differences observed during insertion/extraction of Li ions into/out of so-called intercalation cathode compounds (where Li is inserted/intercalated into the interstitials of the intercalation crystals), conversion-type fluorides exhibit dramatic structural changes and significant volume changes accompanying cell cycling. During electrochemical Li insertion into a metal fluoride-based cathode, a displacement/conversion process takes place, where Li displaces solid fluoride-forming element(s) (such as metals or semimetals, or in some cases semiconductors), leading to the formation of solid LiF and clusters of the fluoride-forming element(s), e.g., typically only around 2-10 nanometers in size. Theoretically, the Li capacity of fluorides is determined by their stoichiometry and the density of the fluoride-forming metal according to the following reaction (which assumes fully reversible electrochemical transformation during charge and discharge):

$$xLi^+ + xe^- + MF_x \leftrightarrow xLiF + M \quad (Eq. 1)$$

where M is a fluoride-forming element (e.g., a transition metal).

Mechanistically, initial insertion of Li into some of the metal fluorides with metals possessing a higher oxidation state (such as $FeF_3$) may take place as intercalation. For example, during electrochemical reaction of Li with $FeF_3$, Li may first intercalate into the structure forming:

$$Li^+ + e^- + FeF_3 \rightarrow LiFeF_3 \quad (Eq. 2)$$

Only after additional Li insertion, a conversion reaction may transform the reaction products to LiF and (in an ideal case) interconnected Fe nanoparticles according to:

$$2Li^+ + 2e^- + LiFeF_3 \rightarrow 3LiF + Fe \quad (Eq. 3)$$

As discussed in the background above, conventional fluoride cathodes may suffer from limitations, such as (i) low electrical conductivity; (ii) low ionic conductivity, and (iii) volume expansion during electrochemical lithiation and formation of LiF and metal clusters. Other limitations may include (iv) gas generation during fluoride reactions with electrolytes (particularly at high potentials), which may cause battery degradation; (v) formation of surface species during surface reactions with the electrolyte, which may increase resistance and reduce reversibility of electrochemical reactions; (vi) irreversible oxidation of metals and dissolution of the metal fluorides during cycling, which may increase resistance, damage the solid electrolyte interphase (SEI) layer on the anode, and reduce both the power performance and cycle stability of battery cells; (vii) irreversible changes within their structure during battery operation (such as irreversible growth of the LiF and metal clusters/nanoparticles), which may also lead to irreversible resistance growth capacity losses; (viii) continuous electrolyte decomposition on the cathode and associated large irreversible Li losses typically leading to cell degradation via the undesirable increase in cell resistance and irreversible capacity losses; and (ix) the need to couple a Li-free metal fluoride-comprising cathode with a reactive and difficult to handle Li-comprising anode to form a functional cell. Aspects of the present disclosure overcome some or all of the above-discussed above challenges to facilitate production of stable, high capacity, high energy density fluoride-based cathodes.

The performance of cells comprising conversion-type fluoride cathodes often becomes particularly poor for certain applications when the electrode capacity loading becomes moderate (e.g., about 2-4 mAh/cm² —on each side in case of double-sided electrodes) or even more so when it becomes high (e.g., about 4-12 mAh/cm² —on each side in case of double-sided electrodes). Higher capacity loading, however, is advantageous for increasing cell energy density and reducing cell manufacturing costs. Aspects of the present disclosure overcome this challenge to facilitate production of stable, high capacity, high energy density fluoride-based cathodes with moderate or high capacity loadings.

The performance of cells comprising conversion-type fluoride cathodes often becomes particularly poor for certain applications when volumetric electrode capacity becomes moderate (e.g., in the range from around 600 to around 1000 mAh/cm³) and even more so when it becomes high (e.g., in the range from around 1000 to around 1800 mAh/cm³). Higher volumetric capacity, however, is highly beneficial for maximizing cell-level volumetric energy (and often cell-level specific energy). Aspects of the present disclosure overcome this challenge to facilitate production of stable metal fluoride-based conversion-type cathodes with moderate or high volumetric capacities at the electrode level.

The performance of cells comprising conversion-type fluoride cathodes often becomes particularly poor when the cell anodes also comprise conversion-type anodes (e.g., silicon-comprising or aluminum-comprising or tin-comprising or lithium metal or lithium metal alloy-comprising anodes, among other known types of conversion type anodes that also include alloying-type anodes). Aspects of the present disclosure overcome this challenge to facilitate production of cells that comprise conversion-type materials in both electrodes in order to attain higher energy density and better overall cell performance.

The performance of cells comprising conversion-type fluoride cathodes often becomes particularly poor for certain applications when relatively thin (e.g., in the range from around 2.0 micron to around 15.0 micron) current collector foils are used (particularly when moderate and even more so when high areal capacity electrodes are utilized in cell designs and when electrodes exhibit moderate and even more so when they exhibit high volumetric capacities). The use of thinner current collector foils, however, is beneficial for maximizing cell-level energy density and specific energy and, in some cases, for reducing battery manufacturing cost (on a $/Wh basis). Aspects of the present disclosure overcome this challenge to facilitate production of stable metal fluoride-based conversion-type cathodes coated on relatively thin current collector foils (e.g., in the range from around 2.0 micron to around 15.0 micron; in some designs from around 6.0 micron to around 12.0 micron).

The performance of cells comprising conversion-type fluoride cathodes often becomes particularly poor for certain applications when cells are exposed to moderately elevated temperatures (e.g., temperatures in the range from around +25.0° C. to around +60.0° C.) and even more so when cells are exposed to highly elevated temperatures (e.g., temperature in the range from around +60.0° C. to around +200.0° C.). However, some applications may require occasional cell exposure to temperatures above about +25° C. or higher temperatures during at least some operational time for at least some customers. Keeping the cell temperature sufficiently low (e.g., below about 25.0° C. or below about 60.0° C.) may undesirably increase battery or battery pack weight and volume and costs (e.g., by utilizing relatively bulky and expensive thermal management system(s)). Aspects of the present disclosure overcome this challenge to facilitate production of stable cells with metal fluoride-based conversion-type cathodes that may be exposed to moderately elevated temperatures or highly elevated temperatures while keeping sufficiently high (for a given application) cycle stability or operational life stability.

The performance of cells comprising conversion-type fluoride cathodes often becomes particularly poor for certain applications when cells need to be charged moderately quickly (e.g., from around 2 h to around 6 h from less than around 20% state of charge to over around 80% state of charge) or quickly (e.g., from around 0.5 h to around 2 h from less than around 20% state of charge to over around 80% state of charge) or very quickly (e.g., from around 3 min to around 30 min from less than around 20% state of charge to over around 80% state of charge). Faster charging, however, may be highly desired or advantageous in some applications (e.g., for some electronic devices or for some ground or marine or mixed-use electric vehicles or some unmanned electric vehicles or drones or battery-powered robots). Aspects of the present disclosure overcome this challenge to facilitate production of stable cells with metal fluoride-based conversion-type cathodes that may be charged moderately quickly, quickly or very quickly.

The performance of cells comprising conversion-type fluoride cathodes often becomes particularly poor for certain applications when the volume fraction of electrolyte within the cathodes becomes relatively small or moderate (e.g., from around 8.0 vol. % to around 40.0 vol. %). However, reducing (e.g., minimizing) the volume fraction of electrolyte in the cathodes (while keeping the rate performance and stability sufficiently good for specific applications) may be advantageous for increasing (e.g., maximizing) volumetric capacity of the electrodes and cell-level energy density and specific energy values. Aspects of the present disclosure overcome this challenge to facilitate production of stable cells with sufficiently high rate performance and energy density with electrolyte occupying relatively small or moderate fraction of the total cathode volume (e.g., from around 8.0 vol. % to around 40.0 vol. %; in some designs from around 20 vol. % to around 35 vol. %). Similarly, the performance of cells comprising conversion-type anodes (or a combination of conversion type anodes and conversion type cathodes) may become poor when the volume fraction of electrolyte within the anode becomes relatively small or moderate (e.g., from around 108.0 vol. % to around 40.0 vol. %). Aspects of the present disclosure overcome this challenge as well.

The performance of cells comprising conversion-type fluoride cathodes often becomes particularly poor for certain applications when the volume fraction of electrolyte within the cells become relatively small or moderate (e.g., from around 8.0 vol. % to around 40.0 vol. %). However, reducing (e.g., minimizing) the volume fraction of electrolyte in the cells (while keeping the rate performance and stability sufficiently good for specific applications) may be advantageous for increasing (e.g., maximizing) volumetric capacity of the cells and cell-level energy density and specific energy values. Aspects of the present disclosure overcome this challenge to facilitate production of stable cells with sufficiently high rate performance and energy density with electrolyte occupying relatively small or moderate fraction of the total cell volume (e.g., from around 10.0 vol. % to around 40.0 vol. %; in some designs from around 20 vol. % to around 35 vol. %).

The performance of cells comprising conversion-type fluoride cathodes often becomes particularly poor for certain applications when the cell size or cell capacity becomes medium (e.g., from around 10 mAh to around 200 mAh in terms of the total cell capacity), large (e.g., from around 200 mAh to around 10,000 mAh), or extra-large (e.g., above around 10,000 mAh). Such cells, however, may be particularly useful in certain applications (e.g., in electronic devices or in transportation, etc.). Aspects of the present disclosure allow one to overcome this challenge to facilitate production of stable cells (comprising conversion-type fluoride cathodes) of medium size (e.g., from around 10 mAh to around 200 mAh), large size (e.g., from around 200 mAh to around 10,000 mAh), or extra-large size (e.g., above around 10,000 mAh).

Liquid electrolytes (with or without organic solvent molecules, including ionic liquid or molten salt electrolytes), solid electrolytes (including solid polymer electrolytes and solid ceramic or glass electrolytes), gel electrolytes, composite electrolytes (including liquid-solid composite electrolytes, polymer-polymer and polymer-ceramic composite electrolytes) and mixed electrolytes may be effectively used for the designs herein. Note that in some designs, it may be advantageous to use more than one electrolyte in a single cell (e.g., to optimize performance of the anode and cathode separately or to achieve performance that is difficult to attain when using a single electrolyte). Furthermore, in some designs, it may be advantageous for more than one electrolyte to exhibit more than one form (e.g., one being liquid and another (or others) being solid or one being one type of solid (e.g., polymer gel or ceramic or glass) and another (or others) being another type of solid (e.g., a polymer), etc.).

In some designs in the context of the present disclosure, it may be advantageous to utilize different electrolyte compositions in the anode and cathode (e.g., in order to optimize the anode and cathode performance independently). In some designs, it may be advantageous to utilize a different electrolyte composition in the separator layer between the anode and the cathode compared to the electrolyte composition within the cathode (or within the anode). In some designs, the electrolyte composition within the separator layer and within at least one of the electrodes may exhibit a different physical state—for example, being liquid in one and solid or semisolid in another (e.g., solid or semisolid in the cathode or the anode or both and liquid in the separator or vice versa). Electrolytes in conventional cell designs typically impregnate anode, cathode and a separator and exhibit minimal electronic conductivity (only conduct ions and act as insulators for the flow of electrons) in order to prevent cell discharge. In some designs, it may be advantageous to utilize mixed conductors (materials that conduct both electrons and ions) within at least one of the electrodes (e.g., within the cathode or within the anode or both) while using a pure ionic conductor in the separator layer between the electrodes. In some designs, the ratio or the electronic-to-ionic conductivities in such mixed conductors may range from around 0.0000001 to around 1,000,000 (in some designs, from around 0.001 to around 1000). In some designs, the mixed conductors may be solids (e.g., ceramics, polymer, polymer-ceramic composites, etc.) or semi-solids (e.g., comprising both solids and liquids). In some designs, the mixed conductors may comprise a single phase. In other designs, the mixed conductors may comprise two, three or more distinct phases (e.g., where some phases exhibit substantially (e.g., by 10 times or more) higher ratio or the electronic-to-ionic conductivities than others). In some designs, such phases could be nanostructured (e.g., have average grain size or average characteristic dimensions in the range from around 2 nm to around 500 nm) or X-ray amorphous (e.g., having grain size below around 2 nm). In some designs, it may be advantageous for the mixed conductors to exhibit Li ion conductivity (or Na ion conductivity, if the cell is pf Na metal or Na ion type, etc.) in the range from around $10^{-6}$ to $10^{-1}$ S/cm (in some designs, from around $10^{-4}$ to $10^{-2}$ S/cm) at cell operating conditions (in some designs, at room temperature).

Conventional liquid electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of solvents (such as a mixture of carbonates, most commonly). Conventionally, salt concentrations range from around 0.8 to around 1.1M for such electrolytes. Such liquid electrolytes may also be used in accordance with one or more aspects of the present disclosure.

The most common salt used in a Li-ion battery electrolyte, for example, is $LiPF_6$, while less common salts include lithium tetrafluoroborate ($LiBF_4$), lithium perchlorate (Li- $ClO_4$), lithium bis(oxalato)borate ($LiB(C_2O_4)_2$, lithium difluoro(oxalate)borate ($LiBF_2(C_2O_4)$), lithium hexafluorosilicate ($Li_2SiF_6$), lithium hexafluoroaluminate ($Li_3AlF_6$), lithium bis(oxalato)borate ($LiB(C_2O_4)_2$), lithium difluoro (oxalate)borate ($LiBF_2(C_2O_4)$), lithium tetraborate, various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N(Li^+)SO_2CF_2OCF_3$, $CF_3OCF_2SO_2N(Li^+)SO_2CF_2OCF_3$, $C_6F_5SO_2N^-(Li^+) SO_2CF_3$, $C_6F_5SO_2N(Li^+)SO_2C_6F_5$ or $CF_3SO_2N(Li^+)SO_2PhCF_3$, and others) and others. Electrolytes for Mg-ion, K-ion, Ca-ion, and Al-ion batteries are often more exotic as these batteries are in earlier stages of development. In some designs, electrolytes for certain batteries may comprise different salts and solvents (in some cases, ionic liquids may replace organic solvents for certain applications). Such salts or components of such salts may also be utilized in electrolytes in accordance with one or more aspects of the present disclosure.

In some designs in the context of the present disclosure, it may be advantageous (e.g., for enhanced stability or capacity utilization) to utilize electrolyte compositions with higher than around 1M molar fraction of salt(s) in solvent(s) in accordance with one or more aspects of the present disclosure. In some designs, it may be advantageous (e.g., for faster rate performance, lower cell cost, lower cell density, better stability, etc.) to utilize electrolyte compositions with lower than around 0.8M fraction of the salt(s) in solvents. In some designs, a suitable molar fraction range for the salt(s) in solvent(s) may vary broadly from as little as around 0.1 M to as high as around 4.0 M (in some designs, from around 1.2M to around 2.2M; in other designs, from around 0.1M to around 0.8M), depending on the salt and solvent composition as well as cell chemistry.

In some designs in the context of the present disclosure, it may be advantageous (for stability, rate performance and/or other benefits) to utilize a relatively high content of relatively uncommon solvents—e.g., various esters, various ethers, various sulfur-based solvents (sulfones, sulfoxides, etc.—for example, but not limited to ethyl methyl sulfone, butyl sulfone, ethyl phenyl sulfone, dimethyl sulfone, ethyl vinyl sulfone, methyl phenyl sulfone, dimethyl sulfone, ethyl methyl sulfide, sulfolane, etc.), various lactones, various anhydrides, various phosphorous based solvents, various silicon-based based solvents, various nitrogen-based or nitrogen-containing solvents or their various mixtures in the electrolyte (e.g., from around 10 vol. % to around 100 vol. % in total of all the solvents; in some designs—from around 20 vol. % to around 70 vol. %). In some designs, such solvents may exhibit one or more additional functional groups (e.g., halogens, alcohols, alkanes, alkenes, alkynes, ketones, aldehydes, ethers, amines, amides, imides, nitriles, sulfonyls, carboxylic acids, phosphates, etc.). In some designs, it may be advantageous to use a combination of cyclic and linear solvents in the electrolyte. In some designs, it may be advantageous to use a combination of carbonate-type solvents and other solvents (e.g., esters, ethers, sulfones, sulfoxides, lactones, anhydrides, phosphorous based solvents, silicon-based based solvents or their various mixtures).

Illustrative examples of various suitable esters include, but are not limited to, various formates (e.g., methyl formate, ethyl formate, propyl formate, butyl formate, amyl formate, hexyl formate, heptyl formate, etc.), various acetates (e.g., methyl acetate, ethyl acetate, propyl acetate, butyl acetate, amyl acetate, hexyl acetate, heptyl acetate, etc.), various propionates (e.g., methyl propionate, ethyl propionate, propyl propionate, butyl propionate, amyl propionate, hexyl propionate, heptyl propionate, etc.), various butyrates (e.g., methyl butyrate, ethyl butyrate, propyl butyrate, butyl butyrate, amyl butyrate, hexyl butyrate, heptyl butyrate, etc.), various valerates (e.g., methyl valerate, ethyl valerate, propyl valerate, butyl valerate, amyl valerate, hexyl valerate, heptyl valerate, etc.), various caproates (e.g., methyl caproate, ethyl caproate, propyl caproate, butyl caproate, amyl caproate, hexyl caproate, heptyl caproate, etc.), various heptanoates (e.g., methyl heptanoate, ethyl heptanoate, propyl heptanoate, butyl heptanoate, amyl heptanoate, hexyl heptanoate, heptyl heptanoate, etc.), various caprylates (e.g., methyl caprylate, ethyl caprylate, propyl caprylate, butyl caprylate, amyl caprylate, hexyl caprylate, heptyl caprylate, etc.), various nonaoates (e.g., methyl nonaoate, ethyl nonaoate, propyl nonaoate, butyl nonaoate, amyl nonaoate, hexyl nonaoate, heptyl nonaoate, etc.), various decanoates (e.g., e.g., methyl decanoate, ethyl decanoate, propyl decanoate, butyl decanoate, amyl decanoate, hexyl decanoate, heptyl decanoate, etc.), and fluorinated versions of the above-discussed esters, to name a few examples.

Illustrative examples of various suitable ethers include, but are not limited to, dioxolane, polyethylene oxide, tetrahydrofuran, tetrahydropyran, furan, 4-methylpyran, pyran, 12-crown-4, 15-crown-5, 18-crown-6, 4-methyl-1,3-dioxane, dimethyl ether, methyl t-butyl ether, diethyl ether, methoxyethane, dioxane, dioxolane, monoglyme, diglyme, triglyme, tetraglyme, to name a few examples.

Illustrative examples of various suitable sulfur-based solvents include, but are not limited to, various sulfolanes, various sulfolenes, various sulfones and substitutions thereof such as 2-fluorophenyl methyl sulfone, tetrahydrothiophene, thiophene, 2,3-dihydrothiophene, dithiolane, etc.

Illustrative examples of various suitable sulfones include, but are not limited to, dimethyl sulfone, ethylmethyl sulfone, methyl vinyl sulfone, ethyl vinyl sulfone, trichloromethyl sulfone, trifluoromethyl sulfone, butadiene sulfone, bromophenyl methyl sulfone, chlorophenyl methyl sulfone, chlorophenyl ethyl sulfone, fluorophenyl methyl sulfone, fluorophenyl ethyl sulfone, among others.

Illustrative examples of various suitable sulfoxides include, but are not limited to, dimethyl sulfoxide, diethyl sulfoxide, methyl phenyl sulfoxide, among others.

Illustrative examples of various suitable lactones include, but are not limited to, α-acetolactone, β-propiolactone, γ-butyrolactone, δ-valerolactone, γ-valerolactone, ε-caprolactone, and their various derivatives, among others (e.g., α-hydroxy-γ-butyrolactone, α-angelica lactone, α-methylene-γ-butyrolactone, α-bromo-γ-valerolactone, α-methyl-γ-butyrolactone, α-acetylbutyrolactone, ε-caprolactone, γ-caprolactone, γ-octanoic lactone, γ-nonanoic lactone, γ-phenyl-γ-butyrolactone, 5-decanolide, undecanoic δ-lactone, undecanoic γ-lactone, 5-dodecanolide, pentadecanolide, 16-hexadecanolide, among others).

Illustrative examples of various suitable phosphorus-based solvents include, but are not limited to, dimethyl methyl phosphonate, tributyl phosphate, triethyl phosphate, trimethyl phosphate, triphenyl phosphate, tripropyl phosphate, and longer chain trialkylphosphates and other organophosphates and their various derivatives, among many others.

Illustrative examples of suitable nitrogen-based solvents include, but are not limited to, dimethylformamide, dimethylacetamide, formamide, N-methyl-2-pyrrolidone, acetonitrile, propionitrile, triethylamine, pyridine, benzonitrile, pyrrole, N-methyl piperidine, N-methyl pyrrolidine, imidazole, pyrimidine, 4-methylmorpholine 4-oxide, N-methylmorpholine, tetramethylurea, etc.

Illustrative examples of various suitable silicon-based based solvents include, but are not limited to, tetramethylsilane, tetraethylsilanes, and other tetraalkyl silanes, among others.

Illustrative examples of various suitable anhydrides include, but are not limited to, glutaric anhydride, succinic anhydride, maleic anhydride, phthalic anhydride, cyclobutane-1,2,3,4-tetracarboxylicdianhydride, butyric anhydride, isobutyric anhydride, among others.

In some designs in the context of the present disclosure, it may be advantageous (for cycle stability, rate performance and/or other benefits in full cells) for the solvent mixture to comprise a significant fraction (e.g., from around 20 vol. % to around 100.0 vol. %) of at least one low-melting point solvent (e.g., melting point in the range from around minus (−) 100° to around minus (−) 60° C.).

In some designs in the context of the present disclosure, it may be advantageous (for cycle stability, rate performance and/or other benefits in full cells) for the solvent mixture to comprise a significant fraction (e.g., from around 2.5 vol. % to around 100.0 vol. %; in some designs from around 5.0 vol. % to around 30.0 vol. %) of one or more (either fully or at least partially) fluorinated solvents.

In some designs in the context of the present disclosure, it may be advantageous (for cycle stability, rate performance and/or other benefits in full cells) for the electrolyte to comprise a mixture of two or more Li salts.

In some designs, it may be advantageous in the context of the present disclosure (for cycle stability, rate performance and/or other benefits in full cells) for the electrolyte to comprise a mixture of Li and non-Li salts (e.g., salts of other metals, such as Cs, Mg, Ca, Na, K, Sr, La, Ba, Y, etc.).

In some designs in the context of the present disclosure, it may be advantageous (for cycle stability, rate performance and/or other benefits in full cells) for the electrolyte to comprise a mixture of organic and inorganic salts.

In some designs in the context of the present disclosure, it may be advantageous (for cycle stability, rate performance and/or other benefits in full cells) for the electrolyte to comprise iodine (I) or phosphorous (P) or sulfur (S) or selenium (Se) containing salts.

In some designs in the context of the present disclosure, it may be advantageous (for cycle stability, capacity utilization, rate performance and/or other benefits in full cells) for the liquid electrolyte to comprise solvents (e.g., from around 3 vol. % to around 60 vol. % relatively to all the solvents in electrolyte) that exhibit low polarity (including nonpolar solvents) and exhibit minimal electrolyte salt solubility (e.g., by around 50 to around 5000,000 times smaller than the most effective solvent in the electrolyte system for salt (or Li+ or other metal cations) dissolution). Such solvents may be partially or fully fluorinated, in some designs. Such solvents may effectively reduce electrolyte viscosity and may suppress undesirable side reactions in cells (including, but not limited to the conversion-type cathode dissolution reactions).

Solid electrolytes may provide some promising advantages for fluoride-based cathodes in certain applications, such as reduced undesirable side reactions between the cathode and electrolyte (e.g., reduced metal dissolution or reduced or self-passivating electrolyte decomposition, etc.), as well as enhanced safety and/or other performance benefits (e.g., enhanced high temperature stability, etc.).

In some designs, it may be important for commercially viable cathodes with solid electrolytes to exhibit sufficiently high volume-fraction of active material (e.g., about 40-95 vol. %, or about 55-80 vol. % in a fully expanded (e.g., lithiated) state) in order to achieve sufficiently high cell-level volumetric energy density or gravimetric (specific) energy density suitable for particular applications. Such a high fraction of active material (and thus low volume fraction of solid electrolyte and conductive additives; preferably in the range of about 8-60 vol. % in some designs, in some designs in the range of about 10-35 vol. %) may be very challenging and expensive to achieve using conventional techniques for preparing all-solid electrodes (e.g., by mixing, milling, sintering or annealing at high temperatures, often in the inert or moisture-free or oxygen containing environment etc.). Furthermore, conventional processing (e.g., high energy milling, heat-treatment at high temperatures, exposure to moisture or oxygen or sulfur at elevated temperatures, etc.) may induce undesirable reactions between metal fluorides and many solid electrolytes, leading to irreversible damages to the fluorides (e.g., reduction of $CuF_2$ to Cu or reduction of $FeF_3$ to $FeF_2$ or Fe, formation of CuS or FeS or $Fe_2S_4$ from $CuF_2$ or $FeF_3$, formation of CuO or $Fe_2O_3$ or $Fe_3O_4$ from $CuF_2$ or $FeF_3$, etc.). One or more aspects of the present disclosure are directed to overcoming these and other limitations for the formation of fluoride and solid electrolyte-based cathodes that exhibit a high volume fraction of active materials and a low (e.g., minimum) content of undesirable or side products (e.g., about 0.0-5.0% vol.).

In some designs, it may be highly advantageous for the ratio of the mobility of non-Li cations (e.g., $Cu^{2+}$ or $Fe^{2+}$ or $Fe^{3+}$ or other cations that may be present in the fluoride-based cathodes) to that of $Li^+$ cations in the solid electrolyte compositions to range from around $10^{-20}$ to around 0.05 during cell operation. In some designs, it may be highly advantageous for the ratio of the conductivity of non-Li cations (e.g., $Cu^{2+}$ or $Fe^{2+}$ or $Fe^{3+}$ or other cations that may be present in the fluoride-based cathodes) to that of $Li^+$ cations in the solid electrolyte compositions to range from around $10^{-20}$ to around 0.05.

In some designs, in the context of the present disclosure, the solid electrolyte may exhibit Li ion conductivity in excess of $10^{-4}$ S/cm either at room temperature or at cell operating temperatures. In a particular example, it may be highly advantageous for the solid electrolytes used to ionically couple the anode and cathode in a cell construction to exhibit Li ion conductivity in the range from around $10^{-6}$ to $10^{-1}$ S/cm (in some designs, from around $10^{-4}$ to $10^{-2}$ S/cm) at cell operating conditions (in some designs, at room temperature). In some designs, a ratio of a mobility of $Cu^{2+}$ and $Fe^{2+}$ to that of $Li^+$ in the solid electrolyte ranges from around $10^{-20}$ to around 0.05 at the cell operation temperatures. In some designs, the solid electrolyte comprises a solid polymer electrolyte. In some designs, the solid polymer electrolyte exhibits ultimate tensile strength in the range from around 0.05 MPa a to around 500.0 MPa. In some designs, the solid polymer electrolyte exhibits a glass transition temperature from around minus (−) 90° C. to around 0° C. In some designs, the solid polymer electrolyte comprises one, two or more copolymers In some designs where solid electrolytes are used in combination with liquid electrolytes in the fluoride-comprising cathode, it may be advantageous for the ratio of the mobility of all the liquid electrolyte solvent molecules to that of $Li^+$ cations in the solid electrolyte compositions to range from around $10^{-100}$ to around 0.1 during the cell operation. In some designs, minimizing this ratio within this range to the extent possible may be desired.

In some designs, various types of solid electrolytes may be effectively used in combination with conversion-type metal fluoride cathodes. Suitable examples include, but are not limited to, various gel polymer electrolytes, various solid polymer electrolytes (including those where some or all anions are chemically linked to the polymer backbone in order to attain high Li transfer number in the range from around 0.7 to around 1.0), various ceramic electrolytes, various glass-ceramic electrolytes, various glass electrolytes, various other composite and nanocomposite solid electrolytes (e.g., those that comprise both polymer and inorganic ceramic or glass (nano)materials), among others.

Illustrative examples of suitable solid ceramic or glass-ceramic or glass electrolytes include, but are not limited to, (a) various selenide-based or sulfide-based electrolytes (such as $Li_2S$—$P_2S_5$, $Li_2Se$—$P_2Se_5$, $Li_2S$—$P_2S_5$—LiCl, $Li_2Se$—$P_2Se_5$—LiCl, $Li_2S$—$P_2S_5$—LiBr, $Li_2Se$—$P_2Se_5$—LiBr, $Li_2S$—$P_2S_5$—LiF, $Li_2S$—$Ga_2S_3$—$GeS_2$, $Li_2S$—$SiS_2$, their various mixtures and combinations with other elements to produce electrolytes that in addition to S (or Se) and Li may also comprise P, Mg, Cl, Br, F, Ca, Cs, Sc, Y, Zn, La, Al, Mg, Mo, Si, Sn, Ge, Ga and other elements; although care must be taken to prevent undesirable chemical reactions between such and other solid electrolytes and active materials); (b) various telluride-based (tellurium comprising) electrolytes which may also comprise Li, P, Cl, Br, F, Ca, Cs, Sc, Y, Al, Zn, Mg, Mo, S, Se, Si, Sn, Ge, Ga, among other suitable elements; (c) various mixed halide-based electrolytes (such as those that comprise Cl, possibly other halogens (e.g., F or Br), Li and other metals or semimetals, including but not limited to Ca, Zn, Mg, Zn, Cs, Al, Ta, Sc, B, La, Y, Si, Sn, Sb, etc.); (d) various lithium-oxy-halide, various lithium-hydroxy-halide, various lithium-metal-hydroxy-halide and various lithium-metal-oxy-halide based electrolytes (such as those that comprise Cl, possibly other halogens (e.g., F or Br), Li and possibly other metals or semimetals, including but not limited to H, Ca, Zn, Mg, Zn, Cs, Al, Ta, Sc, B, La, Y, Si, Sn, Sb, etc., and oxygen (which may be partially substituted by nitrogen) (examples of which may include, but are not limited to, $Li_3$—O—Cl, $Li_3$—O—$Cl_{0.5}I_{0.5}$, $Li_2$—H—O—Cl, $Li_2$—H—O—$Cl_{0.5}Br_{0.5}$, $Li_{1.5}$—$H_{0.5}$—$Al_{0.5}Br_{0.5}$, $Li_z$—H—B—$O_2$—$Cl_2$, etc.); (e) various hydride-based electrolytes (including regular and complex hydrides) such as those that comprise Li, H, B, possibly halogens (e.g., Cl, F or Br), possibly other metals or semimetals (including but not limited to Ca, Zn, Mg, Zn, Cs, Al, Ta, Sc, B, La, Y, Si, Sn, Sb, etc.), possibly carbon and possibly nitrogen (examples of which may include, but are not limited to, $LiBH_4$, $LiBH_4$—LiCl, $LiBH_4$—LiF, $LiBH_4$—LiF—LiCl, $LiCB_9H_{10}$, $LiCB_{11}H_{12}$, their various mixtures including but not limited to solid solutions, etc.); (f) various oxide-based electrolytes (such as Li—La—Ti—O garnet, Li—La—Ta—O garnet, Li—Si—O glass, Li—Ge—O glass, $Li_9SiAlO_8$, etc.); (g) mixed sulfide-oxide electrolytes (such as $Li_2S$—$SiS_2$—$Li_4SiO_4$, LiI—$La_2O_2S$—$La_2O_2S_2$, etc.); (h) various lithium-sulfide-oxy-halides, various lithium-hydrogen-sulfide-halides, various lithium-hydroxy-sulfide-halides, various lithium-metal-hydroxy-sulfide-halides and various lithium-metal-oxy-halide-sulfide based electrolytes (such as those that may comprise O, S, halogen (e.g., Cl, Br, F), H, Li, and various metals and semimetals, including but not limited to Ca, Zn, Mg, Zn, B, Cs, Al, Ta, Sc, Y, Si, Sn, Sb, La, etc.; illustrative examples of which may include, but are not limited to, $Li_3$—$O_{0.5}$—$S_{0.5}$—Cl, $Li_2$—H—S—Cl, $Li_2$—H—S—$Cl_{0.5}Br_{0.5}$, $Li_2$—H—$O_{0.5}$—$S_{0.5}$—Cl, $Li_2$—H—$O_{0.333}$—$S_{0.667}$—Cl, $Li_2$—H—$O_{0.5}$—$S_{0.5}$—$Cl_{0.5}Br_{0.5}$, $Li_{1.5}$—$H_{0.5}$—$Al_{0.3}$—$O_{0.5}$—$S_{0.5}$—$Cl_{0.5}Br_{0.5}$, etc.); their various mixtures including but not limited to solid solutions, and many others.

The use of solid ceramic or glass electrolytes with conversion-type cathode materials in the construction of the cathodes (or with conversion-type or alloying-type anode materials in the construction of the anodes) has been traditionally hindered by the inability of ceramics to accommodate the volume changes that take place during charge and discharge cycling of conversion-type active materials. Their use with fluoride-based cathodes has been particularly difficult because fluoride-based active cathode particles exhibit large volume changes (compared to other, e.g., intercalation-type, cathode materials).

To overcome this limitation, it may be highly advantageous to produce fluoride-based cathodes in at least partially (e.g., preferably fully) expanded (at least partially or fully lithiated) state. In this case, instead of the traditionally used transition metal fluorides (such as $FeF_2$, $FeF_3$, $CuF_2$, $BiF_3$, $CoF_2$, $NiF_2$ and others and their various mixtures, etc.), the cathode materials in accordance with one or more aspects of the present disclosure may comprise lithium fluoride (LiF) intermixed with clusters or nanoparticles of metal(s) or metal alloy(s) as active material.

In some designs, it may further be advantageous for such cathodes (or cathode particles) to additionally comprise a mechanically, thermally and electrochemically stable (during cell operation at typical cell operation conditions) so-called "matrix" material(s), thus forming LiF-comprising and metal-comprising composites. As used herein, a primary function of such a stable "matrix" material is to enhance electrical, ionic, chemical, electrochemical, morphological (dimensional) and/or mechanical stability of the metal fluoride-based cathodes during cell operation. Such a matrix material may also help in preventing or reducing metal dissolution during cycling or help in preventing or reducing other undesirable interactions between the metal fluorides (or metals) and electrolyte during cell manufacturing or cell cycling. In some designs, such a matrix material (or combination of two or more distinct matrix materials) may exhibit significantly smaller capacity or energy density (in full cells) or alternatively not even contribute to capacity storage in cathodes at all, but importantly may help to significantly reduce volume changes at the composite particle level during battery change and discharge. At least some portion of such matrix materials may also be advantageously electrically conductive (e.g., exhibit electrical conductivity in the range from around 0.001 S/m to around 60,000,000 S/m at the cell operating temperatures).

In some designs, it may further be advantageous for such a matrix material (or at least a component of the matrix material and/or an associated active material embedded inside the matrix material, any combination of which may be broader referred to herein as a core component or a core material) to exhibit relatively high Li+ conductivity (e.g., from around $10^{-8}$ S cm$^{-1}$ to around $10^{-3}$ S cm$^{-1}$) at cell operational temperature (e.g., at around a room temperature, in some designs). In some designs, the matrix material may be highly nanostructured and may advantageously exhibit noticeably higher (e.g., by around 10-1000 times or more) surface (or interface) mobility of Li+ compared to the mobility of Li$^+$ in the bulk.

In some designs, the core material (or a meaningful (about 1 vol. % or above) portion of the core material composition) may exhibit mixed cationic and anionic conductivity. In some designs, the conductivity of F$^-$ anions in such a core material may range from around 0.0000001% to around 500% of the Li$^+$ ion conductivity in the same core material (in some designs, from around 0.1% to around 500%). In some designs, the core material may comprise $LaF_3$, $BiF_3$, $Ba_{1-y}Sb_yF_{2+y}$, $La_{1-y}Ba_yF_{3-y}$, and other known F anion conductors. In some designs, the total volume fraction of such conductors may range from around 0.1 vol. % to around 30 vol. % of the total volume of the composite cathode particles. Note that in some designs, $F^-$ anion conductors that exhibit relatively high reversible capacity (e.g., around 100-300 mAh/g) may be considered to be a part of the active material rather than a part of the matrix material (e.g., either of which may be broadly referred to as a core component or a core material). In some designs, the wt. fraction of either Bi or Ba or La or their combination in the cathode may exceed around 0.1 wt. % (as the portion of the total weight of the cathode layer on the current collector). In some designs, at least one core component (e.g., the matrix material, an active material embedded in the matrix material, etc.) ionically conducts both Li+ cations and F– anions. In a further example, the at least one core component (e.g., the matrix material, an active material embedded in the matrix material, etc.) ma exhibit F– conductivity in the range from around 0.1% to around 500% of Li+ conductivity in the ionically conducting material.

In some designs, it may be advantageous for such fluoride-based cathodes (or cathode particles) to exhibit a core-shell morphology, where the shell essentially encloses all or the majority of the particle core. In some designs, the core of such particles may comprise a composite (e.g., comprising LiF, metal clusters and matrix material). In some designs, it may be advantageous for the shell in such particles to exhibit significantly lower (e.g., around 10-1000,000,000 times lower) $F^-$ anion conductivity compared to the core of such particles. In some designs, the shell may comprise metal oxides. In some designs, the shell may exhibit a gradient in composition or be composed of two or more distinct layers. In some designs, the shell may exhibit significantly lower (e.g., around 50-50,000,000,000 times lower) $Cu^{2+}$ or $Fe^{2+}$ conductivity compared to that of $Li^+$.

In some designs, it may be advantageous for metal fluoride-based cathodes that comprise one or more solid electrolytes to also comprise a compliant, ionically conductive interfacial layer between the individual (e.g., composite) cathode particles and solid electrolyte composition that reduces interfacial stresses and enhances cathode stability. In some designs, such a compliant interlayer thickness may range from around 1 nm to around 100 nm. In some designs, too small of a layer thickness in the compliant interlayer may be insufficient to provide the needed benefits (e.g., insufficient interfacial stress reduction and/or cathode stability enhancement), while too large of a layer thickness in the compliant interlayer may reduce energy and/or power performance characteristics of the cells to an undesirable degree. In some designs, such a compliant interlayer may comprise closed pores. In some designs, such a compliant interlayer may comprise open pores. In some designs, the total pore volume in the compliant interlayer may range from around 0.1 vol. % to around 80 vol. %. In some designs, too large of a pore volume in the compliant interlayer may undesirably reduce its mechanical stability. In some designs, it may be advantageous for at least a portion (e.g., from around 1 vol. % to around 100 vol. %) of the pores in such a layer not to be filled with the solid electrolyte. In some designs, such remaining (unfilled) pores may comprise a compressible gas.

In some designs, this compliant interlayer may be a part of the matrix material in the conversion-type metal fluoride (including lithium fluoride) comprising composite cathode composition. In other designs, this compliant interlayer may be at least partially formed during the solid electrolyte infiltration or electrode assembling procedures.

Since the use of various matrix-material comprising composites may also be advantageous in some applications in combination with various types of electrolytes (e.g., not only solid electrolytes, but also liquid electrolytes or liquid-solid mixed electrolytes, etc.), the composite and matrix material chemistry, morphology, architecture and synthesis methodologies are disclosed in a separate (standalone) section of the present disclosure.

In some designs, cathodes that comprise solid electrolytes may be produced at elevated temperatures. Unfortunately, conventional lithium-free state metal fluorides cathodes often exhibit limited thermal stability and limited chemical stability at such elevated temperatures. As such, it becomes challenging to use metal fluoride-based active material composition in combination with solid electrolytes. To overcome this limitation in some designs, it may similarly be highly advantageous to produce fluoride-based cathodes in an at least partially (e.g., preferably fully) lithiated state. In this case, instead of the traditionally used Li-free transition metal fluorides (such as $FeF_2$, $FeF_3$, $BiF_3$, $BiF_5$, $CuF_2$, $CoF_2$, $NiF_2$ and others and their various mixtures, etc.), exemplary cathode materials in some designs may comprise lithium fluoride (LiF) intermixed with clusters or nanoparticles of metal(s) (e.g., Cu, Fe, Bi, Co, Ni, etc.) or metal alloy(s) as active material. LiF is typically significantly more thermally stable and less reactive than other metal fluorides (such as $CuF_2$, $FeF_2$, $FeF_3$, $NiF_2$ and most others).

Due to limited thermal stability of metal fluoride-based active material compositions, it may also be advantageous in some designs to utilize solid electrolytes that could be processed or deposited onto (or into) or otherwise incorporated into the cathode at sufficiently low temperatures (e.g., preferably in the temperature range from around 0.0° C. to around +500.0° C.; in some designs, from around +15.0° C. to around +300.0° C.). In some designs, it may be advantageous for the solid electrolyte(s) to exhibit a melting point or a glass transition temperature below around 400° C. For example, it may be advantageous in some designs for the solid electrolytes to exhibit a glass transition temperature from around –10.0° C. to around +500.0° C. (in some designs, from around 50.0° C. to around 300.0° C.). In some designs, it may be advantageous for the solid electrolytes to exhibit a melting point from around 10.0° C. to around +500.0° C. (in some designs, from around 50.0° C. to around 300.0° C.). In some designs, it may be advantageous for the solid electrolytes to exhibit viscosity in the range from around 1 cP to around 1000,000 cP (centipoise) (in some designs, from around 100 cP to around 100,000 cP) at or below +600.0° C. (in some designs, at or below about +400° C.). In some designs, a lower viscosity at lower temperatures may allow fabrication of metal fluoride-based cathodes with a higher fraction of active materials and a lower fraction of solid electrolytes without applying excessive mechanical pressure (which may induce undesirable damage to the composite cathodes).

In some designs, it may be advantageous to infiltrate (e.g., into electrode pores) at least some portion of the solid electrolyte after fabrication of the substantially electrolyte-free electrodes (e.g., electrodes comprising about 0-10 vol. % of the solid electrolyte). In some designs, it may be advantageous for the solid electrolyte to be in the form of a vapor or a liquid during the electrolyte infiltration procedure. In some designs, it may be advantageous to infiltrate solid electrolyte into pre-assembled (substantially electrolyte-free) electrode/separator cell stack or roll. In this case, undesirable exposure of the solid electrolyte to atmospheric conditions (e.g., humid air) may be easier and cheaper to reduce or minimize (e.g., dry rooms or glove boxes need not be used for the electrode fabrication and cell stack assembling). In some designs, infiltration of the solid electrolyte may be conducted in a vacuum (in some designs, from around $10^{-6}$ Torr to around 200 Torr vacuum level). In some designs, infiltration of the solid electrolyte may be conducted via a so-called melt-infiltration procedure, where solid electrolyte is heated to sufficiently high temperatures to become a relatively low viscosity (e.g., from around 1 cP to around 1000,000 cP) liquid that may be infiltrated into the electrode (and separator, in some designs) pores via capillary forces and/or applied (e.g., hydrostatic) pressure (e.g., in the range from around 0.5 atm. to around 1000 atm.). In some designs, it may be advantageous to conduct melt-infiltration of the solid (at room temperature) electrolyte at temperatures in the range from around +30° C. to around 500° C. (in some designs, from around +80° C. to around 350° C.). In some designs, it may be advantageous to utilize solid electrolytes that may exhibit viscosity below around 1000,000 cP (in some designs, below around 10,000 cP; in some designs, below around 1,000 cP) during the melt-infiltration procedure.

In some designs, it may be advantageous to deposit a thin (e.g., around 0.25 nm-10 nm) surface layer into the internal pores of the essentially electrolyte-free electrodes prior to (e.g., solid or liquid) electrolyte infiltration in order to enhance electrolyte wetting, reduce interfacial resistance, enhance cell stability or rate or provide other performance benefits. In some designs, it may be advantageous to deposit such a thin layer on the electrode comprising core-shell active (Li-ion storing) particles. In some designs, such a thin surface layer may comprise oxides or nitrides or oxy-nitrides or oxy-fluorides or fluorides of one, two or more metals (e.g., Al, Mg, Zr, Zn, Y, Fe, among others).

In some designs, it may be advantageous (e.g., for enhanced stability) for the fluoride-comprising (e.g., conversion-type) cathodes (in particular, composite cathodes that comprise matrix materials in addition to active materials) to comprise one or more ionically conductive polymers with Li ion conductivity in the range from about $10^{-8}$ S/m to about 10 S/m (that is about $10^{-10}$ to about 0.1 S/cm in "S/cm" units). In some designs, it may be advantageous for the ionically conductive polymers to cover from around 5.0% to around 100.0% of the exterior surface area of the composite particles in the cathodes. In some designs, smaller than about 5% contact area may lead to undesirably low rate performance or undesirably low stability or overall reduced benefits of using ionically conductive polymers. In some designs, it may be advantageous for the ionically conductive polymers in the cathodes to constitute from around 2.0 vol. % to around 35 vol. % of the cathode volume. In some designs, smaller than around 2 vol. % volume fractions of the ionically conductive polymers may not provide enough improvements, while larger than around 35 vol. % fraction may undesirably reduce volumetric cathode capacity and cell-level energy density and specific energy.

In some designs, one or more ionically conductive polymers may be incorporated into different parts of the metal fluoride-based cathodes, such as within the fluoride-containing composite particles, around the fluoride-containing composite particles, between the composite fluoride-containing particles, on the surface of the electrode, and/or within the separator membrane layer, among others.

Figure 2A:
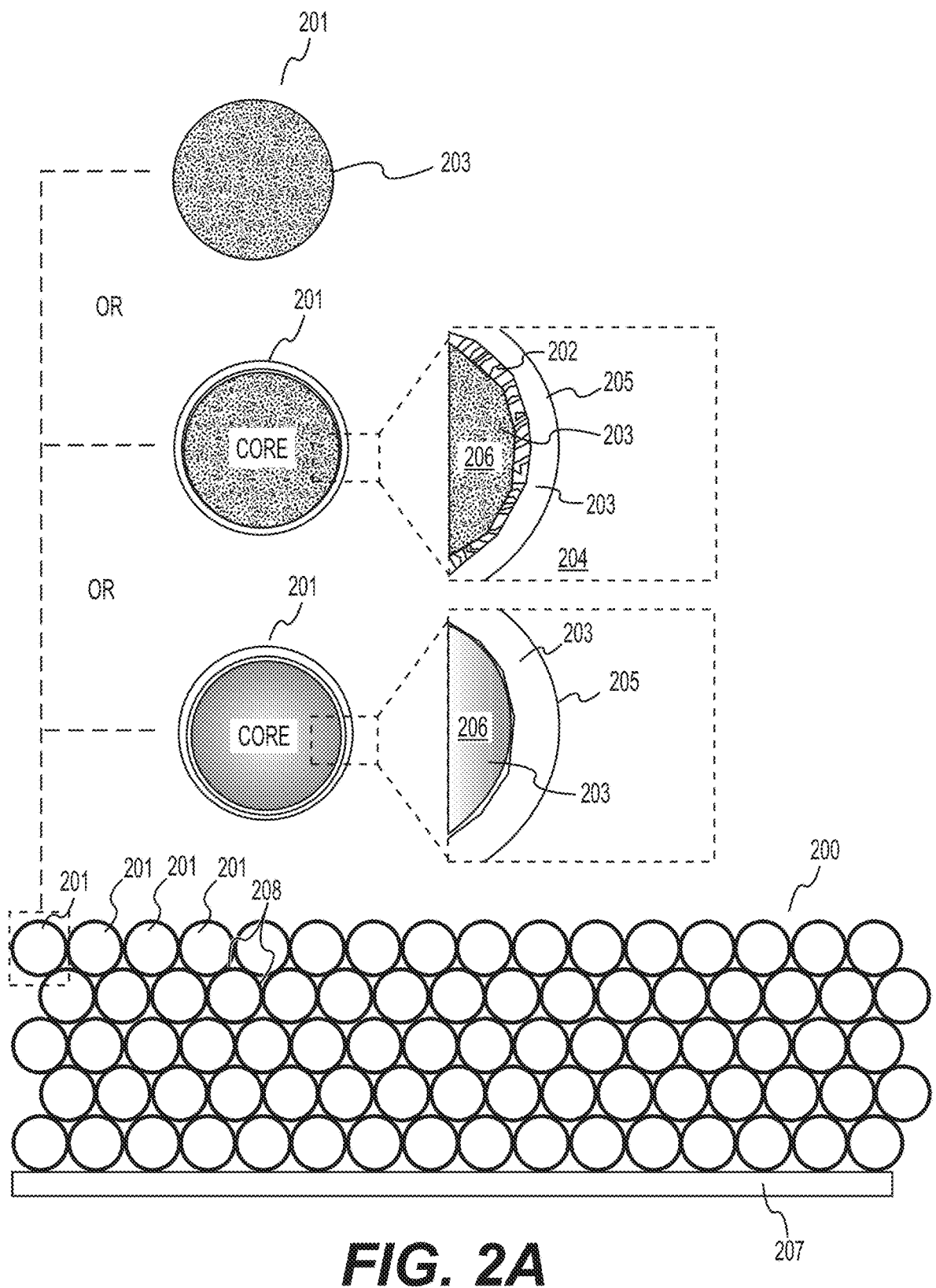
FIGS. 2A-2C cross-sections of composite particles arranged at a cathode in accordance embodiments of the present disclosure.
Figure 2B:
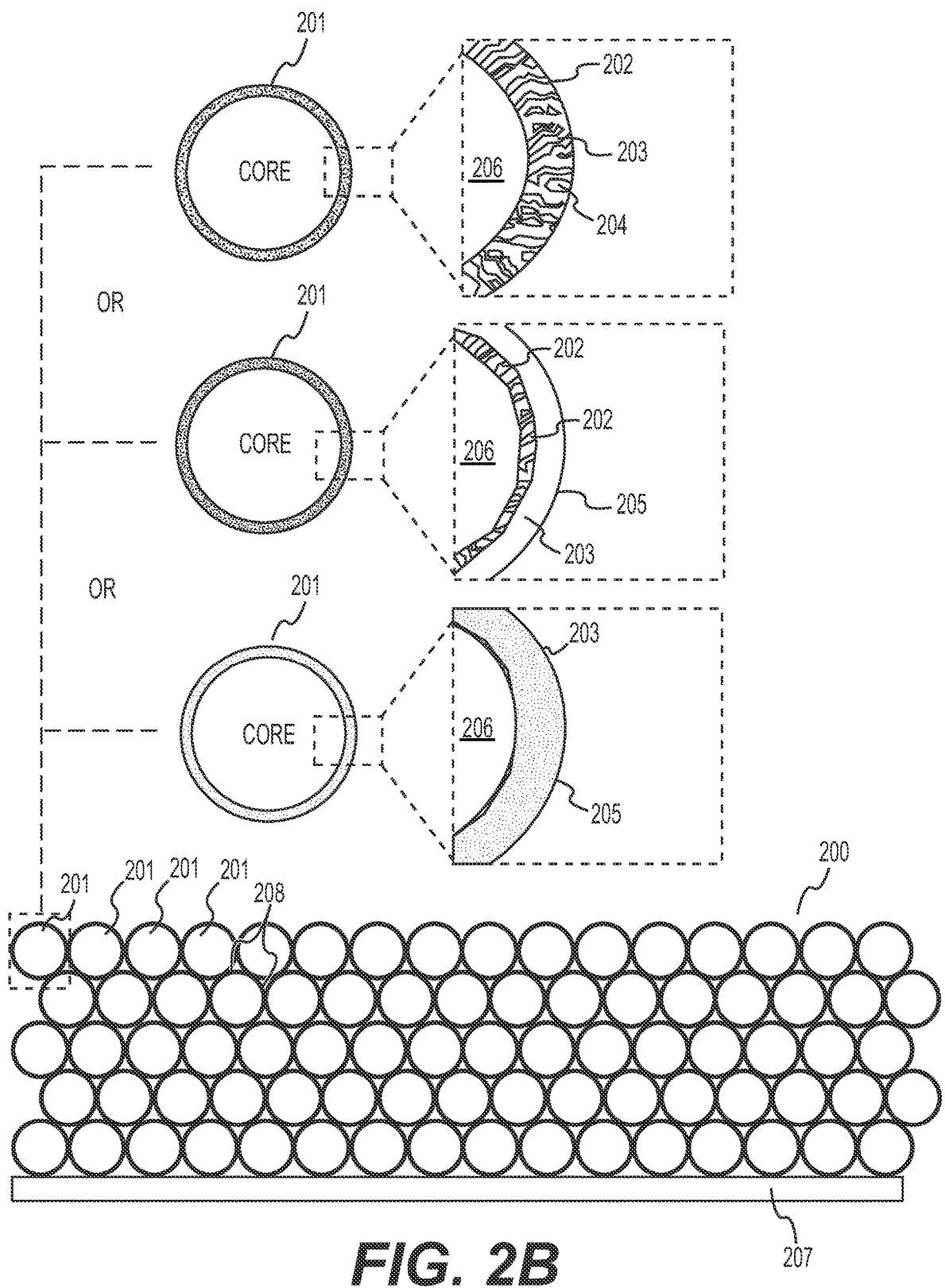
Figure 2C:
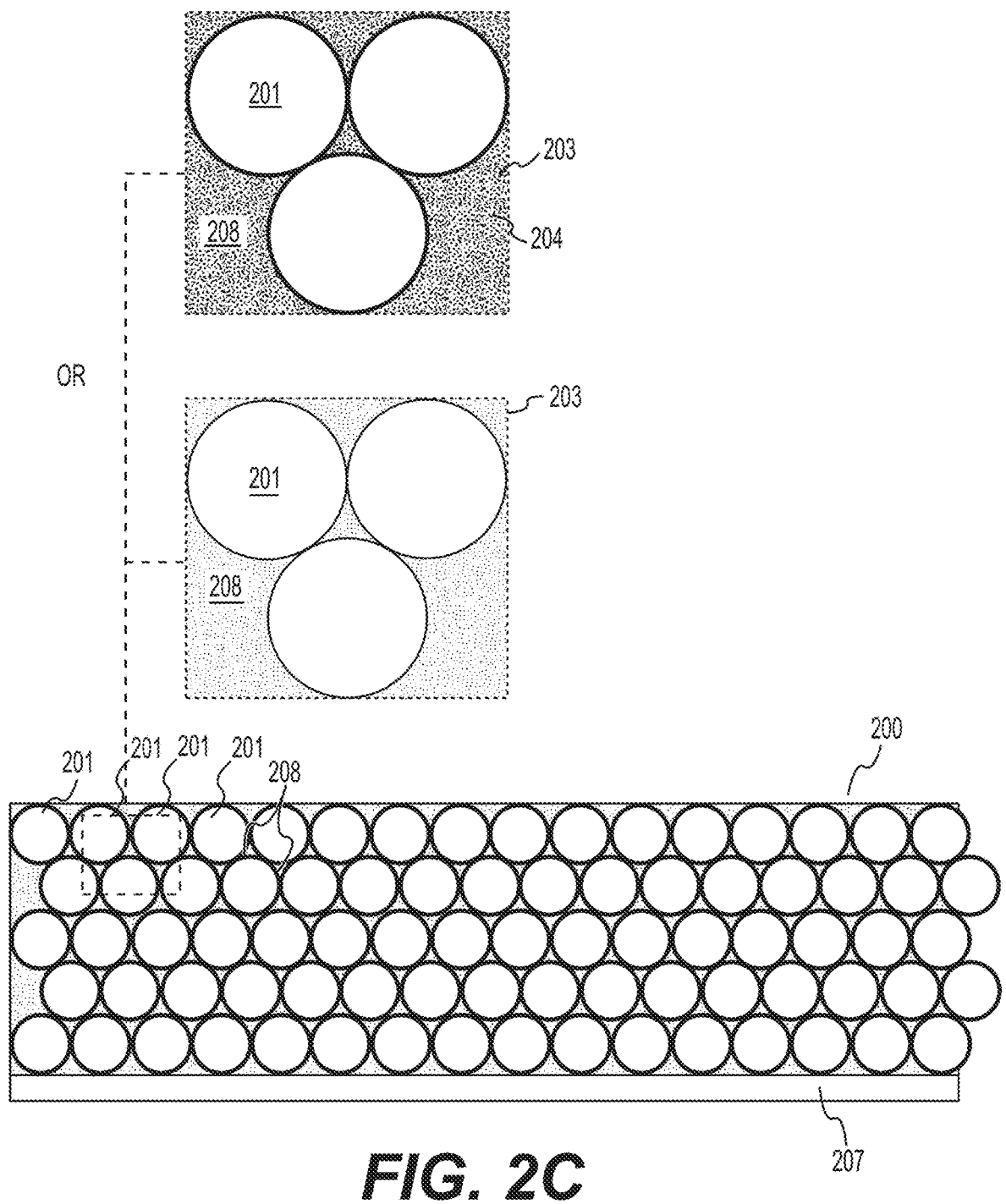

FIG. 2A-2C schematically illustrate some examples of the incorporation of one or more ionically conductive polymers 203 into a metal fluoride-based composite cathode 200 in accordance with aspects of the present disclosure. In FIGS. 2A-2C, composite particles 201 (i.e., metal fluoride-based composite cathode particles) are shown as spheres densely packed on a current collector 207, for illustrative purposes. Conductive additives and binder(s) are not shown for simplicity. FIGS. 2A-2C each depict a cross-section of the metal fluoride-based composite cathode 200 so that some of the morphological features (e.g., core-shell structures, etc.) may be distinguished. FIG. 2A schematically illustrates example designs, where the one or more ionically conductive polymers 203 are incorporated into the bulk of the composite particles 201. In some designs, the one or more ionically conductive polymers 203 may be incorporated into the bulk of the composite particles 201 uniformly, while in other designs there may be some gradient in the polymer distribution within the composite particles 201. In some designs, incorporation of the one or more ionically conductive polymers 203 in the bulk of the composite particles 201 may be accomplished with simultaneous incorporation of a conductive polymer in surface layers 202 or shells 205 and in cores 206 of the composite particles 201 (in case of core-shell particle designs). FIG. 2B schematically illustrates some example designs, where the one or more ionically conductive polymers 203 are incorporated into surface layers 202 of the composite particles 201 or shells 205 enclosing some or all of the metal fluorides within the composite particles 201. The surface layers 202 may also comprise non-polymer material compositions (or regions) 204 (which may be another solid or liquid or a pore). In some designs, the one or more ionically conductive polymers 203 may comprise more than one material composition. FIG. 2C schematically illustrates some example designs, where the one or more ionically conductive polymers 203 fill the pores (voids) 208 between the composite particles 201. In some designs, such filling of the pores 208 may be partial or nearly complete (some of the volume between the particles may also be occupied by a polymer binder or conductive or other additives). In some designs, different conductive polymer compositions for the one or more ionically conductive polymers 203 may be incorporated into different parts of the metal fluoride-based composite cathode 200. In some designs, similar particle architectures may be advantageously used when various all-solid-state electrolytes are used instead of (or in addition to) the one or more ionically conductive polymers 203.

In some designs, it may be advantageous for efficient cell operation to combine lithiated (Li-comprising) fluoride-based conversion-type cathodes (e.g., in the form of the lithium fluoride (LiF) and metal(s) comprising compositions; so that the conversion-type metal fluoride-based cathodes are in partially or fully discharged/lithiated state) with the ionically conductive polymer(s) (i) during one of the stages (e.g., during the last stage) of the (composite) cathode powder fabrication or (ii) during cathode casting onto the current collector (e.g., from a slurry) or (iii) during electrolyte impregnation into the cathode or (iv) during cell assembling. In these designs, the lithiated conversion type cathodes would be in an expanded (e.g., at least partially expanded or lithiated) state prior to electrochemical cycling, which allows for greatly enhanced cell stability during the subsequent cell operation. In addition, in some designs, at least partially lithiated cathodes may allow improved coupling with the ionically-conductive polymer(s).

In some designs, the use of a non-polymer matrix material in the design of the conversion-type metal fluoride-based cathodes in combination with the use of the ionically conductive polymer(s) may be advantageous in terms of enhanced stability or enhanced cell rate performance. In some designs, the ratio of the volume occupied by the non-polymer matrix material to the volume occupied by the ionically conductive polymer(s) within the conversion-type metal fluoride-based cathodes may advantageously range from around 1:100 to around 100:1 (in some designs, from around 1:10 to 10:1). In some designs, a too small volume ratio may lead to reduced cell stability or rate performance, while a too large volume ratio may also lead to reduced stability or rate performance or to reduced volumetric capacity or cell-level energy density.

In some designs, it may be advantageous for efficient cell operation to utilize electrolyte(s) that are free from liquid organic solvents in the cathodes (or, in some designs, no liquid organic solvents in the battery cells may be utilized) that comprise metal fluoride-based conversion-type (e.g., composite, matrix-comprising) cathode materials. In this case, undesirable side reactions between the cathode active materials and electrolyte (e.g., metal dissolution, excessive electrolyte decomposition, etc.) may be reduced significantly or even completely avoided. Furthermore, the interface (or interphase) between the cathode and the solid electrolyte (often called the cathode solid electrolyte interphase (SEI) layer) may be stabilized against one or more of undesirable fractures, undesirable delamination, undesirable growth, building an undesirable layer between LiF and metal (e.g., Cu or Fe or Ni or Co or Bi or their various alloys, etc.) portions of the active material, etc.

In some designs, liquid solvent-free electrolytes in such cathodes (or cells) may advantageously comprise polymer-based electrolytes because polymer electrolytes may exhibit favorable interactions with active materials (or composite particles' surfaces) and additionally may offer attractive mechanical, physical, thermal, chemical and/or electrochemical properties important for cell assembling and/or operation. In some designs, the only type of electrolyte in such cathodes (or cells) may be polymer-based electrolytes (e.g., solid polymer electrolytes). In some designs, the relatively high flexibility (e.g., relatively high elasticity and relatively high maximum elongation) of polymers (e.g., when compared to ceramic or glass electrolytes) may facilitate enhanced mechanical stability of such cells during operation because such polymer(s) may help to accommodate volume changes in the electrodes and various (either internal or externally-induced) stresses that may take place during operation of metal fluoride-comprising cells. In some designs, some polymer electrolytes-filled cathodes may be produced/processed at lower (compared to ceramic or glass electrolytes) temperatures (e.g., from around +10° C. to around +350° C.; in some designs from around +20° C. to around +250° C.), which may be beneficial for processing some metal fluoride-based cathode particles that may exhibit limited thermal stability. In some designs, some polymer electrolytes-filled cathodes may be produced/processed at lower shear stresses or compressive stresses (e.g., such electrodes may experience compressive stresses during electrode or cell assembling from around as little as 0.01 MPa to around 2000 MPa; in some designs from around 1 MPa to around 100 MPa), which may be beneficial for some metal fluoride-based cathode particles that may exhibit limited mechanical strength. Some polymer electrolytes exhibit lower reactivity (compared to ceramic or glass electrolytes) in contact with electrode particles compared to ceramic or glass electrolytes at processing temperatures, which again may be highly beneficial in some designs for the formation of high-performance metal fluoride-based cathodes with high capacity utilization.

In some designs, it may be advantageous for the bonding between a polymer electrolyte and electrode particle surfaces to comprise strong primary (chemical) bonds. In some designs, such particles may be bonded to the polymer binder using secondary bonds (electrostatic or van der Waals forces or hydrogen bonding, etc.). While individual secondary bonds (e.g., hydrogen or van der Waals bonds) are significantly weaker (exhibit lower binding energy) than individual chemical bonds, secondary bonds offer a significant advantage (for some applications) of being able to repair and reform new secondary bonds (after being broken). In contrast, broken chemical bonds are often irreparable or difficult to repair. Sufficiently large contact areas (e.g., from around 20% to around 100% of the particle surface) between electrode particles and the polymer electrolyte that involve hydrogen bonding and high density of secondary bonds may compensate for the lower strength of individual secondary bonds in some designs and, as a result, may form sufficiently strong overall bonding between neighboring particles.

In some designs, it may be advantageous for the maximum elongation of the polymer-based electrolytes (in the cells with metal fluoride-based cathodes) to range from around 0.05% to around 1,000.00% at room temperature (or, more preferably, in the operational temperature range of the battery cell) in order to effectively accommodate various stresses within the cell. In some designs, higher elongation may be beneficial, although excessive maximum elongation may result in undesirably low tensile strength or undesirably low ionic conductivity or other undesirable reduction in useful properties (e.g., reduced thermal stability, excessive thermal expansion, etc.). In some designs, it may be advantageous for the ultimate tensile strength of the polymer electrolytes to range from around 0.05 MPa to around 500.0 MPa in order to provide sufficient electrode/cell stability. Higher strength may yield better mechanical stability, although excessive strength may result in undesirably low maximum elongation or undesirably low ionic conductivity. In some designs, it may be advantageous for the adhesion strength between the surface of the metal fluoride-based conversion-type (e.g., composite, matrix-comprising) cathode materials and the polymer electrolyte to range from around 0.1% to around 1000% of the tensile strength of such polymer electrolytes at room temperature (or, more preferably, in the operational temperature range of the battery cell). In some designs, too low adhesion may lead to mechanical degradation of the cell. In some designs, higher adhesion may be beneficial for mechanical stability (and in some cases for the charge transfer resistance of the electrolyte/electrolyte interface or interphase), although in some designs too high adhesion may result in reduction of other important properties of the electrode (e.g., reduce charge transfer resistance) or make it difficult to produce electrode with sufficiently high uniformity or volume fraction of active materials. In some designs, it may be advantageous for the elastic modulus of the polymer electrolyte(s) to range from around 0.0001 GPa to around 10.0 GPa at room temperature (in some designs, under at least some of the cell operating conditions; in some designs, under all conditions).

In some designs, it may be advantageous for at least some of the ionically conductive polymers in the construction of the fluoride-comprising cathodes to also exhibit electrical conductivity in the range from around $10^{-10}$ S/m to around $10^{+2}$ S/m. In this regard, the polymer compositions may be called "mixed" ionic and electrical conductors.

In some designs, it may be advantageous for the polymer electrolyte to comprise linear polymers or copolymers. In some designs, it may be advantageous for the polymer electrolyte to comprise branched polymers (or copolymers). In some designs, it may be advantageous for the polymer electrolyte to comprise star-shaped or dendritic or comb-type polymers (or copolymers). In some designs, it may be advantageous for the polymer electrolyte to comprise polymers (or copolymers) of more than one shape/architecture (e.g., comprise both linear and branched polymers or both branched and dendritic polymers or linear, branched and dendritic polymers, etc.). In this way, properties of the polymer electrolyte may be favorably tuned for particular applications.

In some designs, it may be advantageous to use a polymer or a copolymer or a polymer network or any mixture thereof that can self-assemble and create preferential pathways for Li+ ions while maintaining or enhancing some useful properties of the polymer electrolyte system (mechanical or electrochemical or thermal stability, high Li transfer number, high Li conductivity, etc.). Suitable examples of such polymer systems include but are not limited to: block copolymers that can self-assemble into cylinders, lamellae, gyroid or any other suitable geometry; a polymer that exhibits a helical conformation in the bulk and may trap salt-rich regions inside the helixes or between helixes while maintaining mechanical and thermal stability; a liquid crystal polymer, among others or any other suitable means.

In some designs, it may be advantageous for the polymer electrolyte within the fluoride-comprising cathode composition to exhibit a relatively high concentration of Li salt(s) with the molar ratio of the salt to the monomer unit ranging from around 0.01 to around 5.00 (e.g., higher concentrations may allow higher conductivity and lower charge transfer resistance; yet too high concentration may reduce mechanical properties of the polymer, induce cell instability, reduce effective conductivity of the polymer electrolyte and/or induce other undesirable outcomes). In some designs, the weight fraction of the Li salt(s) in the polymer electrolyte may generally range from around 1.00 wt. % to around 90.00 wt. % (in some designs, from around 4 wt. % to around 20 wt. %). However, in some designs, an excessive salt concentration may (often undesirably) induce formation of physical crosslinks between polymer chains facilitated by the salt and, in turn, may undesirably increase the Tg of the polymer and lower Li+ conductivity. At the same time, in some cases, a higher salt concentration may induce a plasticizing effect on the polymer (reduce Tg). In some designs with higher salt concentrations (and where salt(s) may effectively conduct Li ions), the polymer may be used to reduce or prevent salt(s) from crystallizing. In some designs, the optimum salt concentration may strongly depend on the polymer electrolyte composition, cell chemistry, requirements for the cell operation conditions (temperature, rate, cycle stability requirements, etc.), thickness and capacity loadings of the electrodes in cells, among other factors. In some designs, two or more Li salts may be advantageously used in the polymer electrolyte (e.g., to achieve enhanced stability or conductivity or safety, etc.). In some designs, one or more non-Li salts (e.g., Mg salts, Ca salts, Na salts, K salts, Cs salts, La salts, Y salts, Al salts, Cu salts, Ba salts, Bi salts, Fe salts, Zn salts, etc.) may be advantageously used in the polymer electrolyte (e.g., to enhance electrochemical stability on one of the electrodes, or to tune electrolyte physical properties or to enhance conductivity or to improve cell safety or to achieve other favorable outcomes). In some designs, some or all of Li or non-Li salts or their components may be chemically (e.g., covalently) attached to the polymer backbone (rather than being just physically mixed). In some designs, one or more salts or their components may be chemically attached to the polymer backbone, while one or more other salts or their components may be physically mixed with the polymer. In some designs, these physically mixed salt(s) may exhibit the same composition as the chemically attached salt(s). In other designs, these physically mixed salt(s) may exhibit distinctly different compositions than the chemically attached salt(s). In some designs, some or all of Li or non-Li salts or their components may be chemically (e.g., covalently) attached to the electrode particles. In some designs, some or all of Li or non-Li salts or their components may be chemically (e.g., covalently) attached to the polymer binder. In some designs, some or all of Li or non-Li salts or their components may be chemically (e.g., covalently) attached to the "filler" nanoparticles purposely added to the polymer electrolyte. In some designs, such nanoparticles may be added to one (or both) of the electrodes (e.g., cathode, anode or both) prior to the polymer electrolyte infiltration into the electrode(s). In some designs, the optimal range and salt (mixture) composition may depend on the polymer electrolyte composition and cell operating conditions.

In some designs, it may be advantageous for the polymer electrolyte within the fluoride-comprising cathode composition to comprise two or more distinct phases or compositions with distinct properties (e.g., distinct ionic conductivity or transfer number or elastic modulus or electrochemical stability window or glass transition temperature, among others). In some designs, the polymer electrolyte may comprise a physical blend of two or more phases or components. In some designs, two or more of such phases or components may be chemically (e.g., covalently) attached. In some other designs, the polymer electrolyte may be a physical blend of chemically (e.g., covalently) attached and physically mixed components.

In some designs, it may be advantageous for the polymer electrolyte within the fluoride-comprising cathode composition to comprise one or two or three or more copolymers. In some designs, these copolymer(s) may be in the form of a gradient, statistical, alternating, graft or block copolymer(s). For example, it may be beneficial to copolymerize a synthon which has a lower Tg and higher Li+ conductivity with a synthon which has a lower conductivity, but higher affinity to the electrode particles or better thermal stability or better mechanical stability or to achieve other benefits in such a finely tuned system.

In some designs, it may be advantageous for the polymer electrolyte within the fluoride-comprising cathode composition to exhibit a relatively high Li transference number. In some designs, such a number may advantageously range from around 0.10 to around 1.00 (in some designs, preferentially from around 0.30 to 1.00, more preferably from around 0.70 to 1.00 and, in some designs most preferably from around 0.85 to 1.00; a higher transfer number typically results in higher Li ion conductivity, better stability, lower polarization and lower charge transfer resistance). In some designs, it may further be preferred for some or all of the anions of the Li salt(s) to be chemically grafted (attached) onto the polymer electrolyte backbone to enhance cell stability and rate performance and to achieve high transfer number values. In some designs, the polymer electrolyte may comprise anion traps. In some designs, such anion traps may be in the form of macromolecules (including polymeric macromolecules). In some designs, such anion traps may be physically mixed or chemically (e.g., covalently) attached to some of the polymeric macromolecules of the polymer electrolyte.

In some designs, it may be advantageous for the polymer electrolyte within the fluoride-comprising cathode composition to exhibit a relatively low glass transition temperature (Tg). In some designs, the Tg values may advantageously range from around minus (−) 120° C. to around +30° C. (in some designs, from around minus (−) 90° C. to around 0° C.). In some designs, in order to reduce Tg or reduce crystallinity of the polymer electrolytes, it may be advantageous to utilize a copolymerization a polymer (having a lower Tg or lower crystallinity content). As illustrative examples, low Tg polycarbonates or low Tg polysiloxanes or low Tg rubbers or other low Tg polymers may be used for such a copolymerization reaction. In some designs, in order to reduce Tg or reduce crystallinity of the polymer electrolytes, it may be advantageous to add a small amount of plasticizer to the electrolyte. As illustrative examples, phthalates, sebacates, adipates, terephthalates, dibenzoates, and other specialty blends or other plasticizers may be utilized. In some designs, one or more high boiling point solvents (e.g., solvents with the boiling point from around 170° C. to around 350° C.) that may be remaining from the processing of the films may be added on purpose (e.g., as plasticizers). Suitable amounts of such plasticizer(s) may range from around 0.001 vol. % to around 75.000 vol. % of the total volume of the polymer electrolyte. In some designs, two or more plasticizers (e.g., small molecule plasticizers or others) may be added to the polymer electrolyte in order to more finely (or more independently) modify its Tg or its viscosity at elevated temperatures or its degree of crystallinity or salt distribution within the polymer electrolyte or other polymer electrolyte properties. In some designs, some or all of the plasticizer molecules may be physically mixed with the rest of the polymer electrolyte composition. In some designs, some or all of the plasticizer molecules may be chemically (e.g., covalently) attached to the polymers of the polymer electrolyte composition. In some designs, polymer(s) or copolymers in the polymer electrolyte may be functionalized or modified (e.g., to allow for a sufficiently low Tg to ensure successful infiltration into the electrode(s) (e.g., the cathode or the anode or both)). In some designs, electrode (e.g., cathode or anode or both) particles may be functionalized or modified to enhance wetting by the polymer electrolyte or to enable chemical reaction or primary or secondary bonding with the polymer electrolyte.

In some designs, it may be advantageous for the polymer electrolyte within the fluoride-comprising cathode composition to exhibit experimentally observed resistance to electrochemical oxidation (or quickly (within 2-20 cycles) passivating oxidation reaction) at potentials up to around +4.1 V vs. Li/Li$^+$.

In some designs, it may be advantageous for the polymer electrolyte within the fluoride-comprising cathode composition to exhibit a relatively low degree of crystallinity that may range from around 0.0 vol. % to around 30.0 vol. % at room temperature (in some designs, it may be preferred for the degree of crystallinity to range from around 0.0 vol. % to around 20.0 vol. % at all the cell operating temperatures).

In some designs (e.g., when the electrolyte-comprising electrodes are heated to elevated temperatures (e.g., to above about 60° C.) during cell manufacturing or during cell operation or when the operational temperature conditions vary substantially), it may be advantageous for the solid (e.g., polymer or other) electrolyte within the fluoride-comprising cathode composition to exhibit a relatively low coefficient of thermal expansion (CTE). The acceptable value for the CTE (at room temperature) may depend on a particular application and electrode construction and composition, but in some designs may generally be in the range from around $2·10^{-6}$ to around $200·10^{-6}$ K$^{-1}$.

In some designs (e.g., when polymer electrolyte is deposited from a solution) it may be advantageous for the solid (e.g., polymer or other) electrolyte within the fluoride-comprising cathode composition to exhibit relatively high solubility in water (e.g., above about 0.5M). Yet, in other designs (e.g., when polymer electrolyte forms a protective layer around individual cathode particles), it may be advantageous for the deposited polymer electrolyte to exhibit minimal swelling and solubility in water (e.g., in order to process aqueous slurries, e.g., below about 0.5M).

In some designs, it may be highly advantageous for the ratio of the mobility of non-Li cations (e.g., $Cu^{2+}$ or $Fe^{2+}$ or $Fe^{3+}$ or $Bi^{3+}$ or $Ni^{2+}$ or other cations that may be present in the fluoride-based cathodes) to that of Li$^+$ cations in the polymer compositions to range from around $10^{-20}$ to around 0.05 during the cell operation. In some designs, it may be highly advantageous for the ratio of the conductivity of non-Li cations (e.g., $Cu^{2+}$ or $Fe^{2+}$ or $Fe^{3+}$ or other cations that may be present in the fluoride-based cathodes) to that of Li$^+$ cations in the polymer compositions to range from around $10^{-20}$ to around 0.05. Similar properties may also be important for other (not just polymer) solid electrolytes using in the same or similar applications.

In some designs where polymer electrolytes (or "mixed" polymer conductors) are used in combination with liquid electrolytes in the fluoride-comprising cathode, it may be advantageous for the ratio of the mobility of all the liquid electrolyte solvent molecules to that of Li$^+$ cations in the polymer compositions to range from around $10^{-20}$ to around 0.1 during the cell operation.

In some designs, it may be advantageous for the solid electrolyte (such as a polymer electrolyte, among others) to form a distinct layer between the metal fluoride cathode (e.g., composite) particles and the solid electrolyte that exhibits conductivities significantly higher (e.g., from around 2 to around 2,000 times higher) than that of the solid electrolyte itself. In some designs, a suitable thickness of such a layer may range from around 0.5 nm to around 20 nm. In some designs, such a layer may form upon the direct contact between the solid electrolyte and (e.g., a chemically) lithiated conversion-type metal fluoride cathode particles. In some designs, enhanced conductivity within such a layer may result from the local accumulation of Li$^+$ ions or enhanced mobility of Li$^+$ ions due to doping or defects (e.g., formed via reaction or chemical (primary) bonding or secondary bonding with cathode particles) or due to newly formed Li$^+$ transport pathways or due to local surface curvature or modifications in local chemical potential, electronic structure and bonding or due to the formation of highly conductive non-equilibrium phases (unstable in bulk solid electrolyte) or other factors.

In some designs, it may be advantageous for the polymer electrolyte within the fluoride-comprising cathode composition to additionally contain small nanoparticles (e.g., in the form the of spherical nanoparticles or nanofibers/nanowires/nanoribbons or other 1D-shaped nanoparticles or small flakes (platelets) or nanoparticles of random or irregular shape, etc.) as functional "fillers" in order to enhance ionic conductivity or thermal or electrochemical or mechanical stability of the polymer electrolytes or reduce its Tg or crystallinity or to chemically bond to salt anions or to provide other useful functions. In some designs, such filler particles may be ionically conductive (e.g., with room temperature ionic conductivity in the range from around $10^{-6}$ to around 1 S cm$^{-1}$). In some designs (e.g., when the location of such filler nanoparticles is mostly limited to one or both of the electrodes), it may be advantageous for such filler nanoparticles to be electrically conductive. In some designs (e.g., when the location of such filler nanoparticles is within the separator layer between the cathode and the anode), it may be advantageous for such filler nanoparticles to be electrical insulators. In some designs, at least some of the small "filler" nanoparticles may comprise pores. In some designs, the smallest dimensions of such "filler" nanoparticles (e.g., diameter or thickness) may range from around 1 nm to around 100 nm, depending on the size of the cathode particles and other factors. In some designs, such nanoparticles may be inorganic. In some designs, two or more types of nanoparticles may be utilized. In some designs, such nanoparticles may preferably comprise lithium (Li). In some designs, such nanoparticles may comprise one or more halogen (e.g., fluorine (F) or chlorine (Cl) or bromine (Br)). In some designs, such nanoparticles may comprise oxygen (O) or sulfur (S) or selenium (Se) or a combination of such elements. In some designs, such nanoparticles may comprise nitrogen (N). In some designs, such nanoparticles may comprise phosphorous (P). In some designs, such nanoparticles may comprise silicon (Si). In some designs, such nanoparticles may comprise aluminum (Al) or titanium (Ti) or tantalum (Ta) or combination of such elements. In some designs, such nanoparticles may comprise zirconium (Zr). In some designs, such nanoparticles may comprise titanium (Ti). In some designs, such nanoparticles may comprise magnesium (Mg). In some designs, such nanoparticles may comprise calcium (Ca). In some designs, such nanoparticles may comprise cesium (Cs). In some designs, such nanoparticles may comprise scandium (Sc). In some designs, such nanoparticles may comprise lanthanum (La) or another lanthanoid or yttrium (Y) or combination of these elements. In some designs, such nanoparticles may comprise phosphorous (P). In some designs, the surface of the filler nanoparticles may be functionalized with one or multiple polymers or one or multiple anionic species or their various combinations thereof (as an illustrative example with lithium [(4-methylphenyl)-sulfonyl(trifluoromethane)sulfonyl]imide or poly(ethylene glycol) chains, etc.). In some designs, such nanoparticles may also be present in the solid electrolyte within the anode. In some designs, such nanoparticles may also be present in the solid electrolyte within the separator layer.

In some designs, not only mechanical and thermal properties of the polymer electrolytes may be optimized for the effective operation with metal fluoride-based cathode materials, but also their composition and structural properties. In an example, this is because stability of the interfaces between the electrode and polymer electrolyte(s) as well as the charge transfer resistance may depend on the cathode operational potential window (note that in some designs metal fluoride-based cathodes may exhibit lower maximum and lower minimum operational potential compared to conventional intercalation-type cathodes, such as LCO, NCM, NCA, LMO and many others). In addition, in some designs, stability of the interfaces between the electrode and polymer electrolytes as well as the charge transfer resistance may also depend on the surface chemistry of the cathode materials and volume changes during cycling (many metal fluoride based composite cathodes exhibit substantially different surface chemistry and volume changes compared to conventional intercalation-type cathodes, such as LCO, NCM, NCA, LMO and many others). In addition, in some designs, a combination of polymer electrolyte(s) of certain suitable composition and properties with conversion-type metal fluoride-based cathode materials may be particularly advantageous. In other embodiments, some of such polymer electrolyte(s) may also be suitable for using with other types of cathodes (e.g., in some cases accidentally or due to similarity of their surface area or volume changes or operation potential range or other factors).

In some designs, it may be advantageous for the polymer electrolyte to comprise aromatic rings. In some designs, it may be advantageous for the polymer electrolyte backbone to comprise double or triple bonds (conjugated bonds).

In some designs, it may be advantageous for the polymer electrolyte within the fluoride-comprising cathode composition to comprise nitrogen (N). In some designs, N may be a part of the polymer backbone of the polymer electrolyte. In some designs, N may be a part of the polymer functional group(s) of the polymer electrolyte. In some designs, N may form double bonds with neighboring atoms in the polymer electrolyte. In some designs, N may form single bonds with neighboring atoms in the polymer electrolyte. In some designs, the same N may form a double bond with one of the neighboring atoms and single bond with another one of the neighboring atoms in the polymer electrolyte. In some designs, N may be bonded to phosphorous (P) in the polymer electrolyte. In some designs, N may be bonded to hydrogen (H) in the polymer electrolyte. In some designs, N may be bonded to sulfur (S) in the polymer electrolyte. In some designs, N may be bonded to selenium (Se) in the polymer electrolyte. In some designs, N may be bonded to carbon (C) in the polymer electrolyte.

In some designs, it may be advantageous for the polymer electrolyte within the fluoride-comprising cathode composition to comprise oxygen (O). In some designs, O may be a part of the polymer backbone of the polymer electrolyte. In some designs, O may be a part of the polymer functional group(s) of the polymer electrolyte. In some designs, O may form double bonds with neighboring atoms in the polymer electrolyte. In some designs, O may form single bonds with neighboring atoms in the polymer electrolyte.

In some designs, it may be advantageous for the polymer electrolyte within the fluoride-comprising cathode composition to comprise fluorine (F). In some designs, F may be a part of the polymer functional group(s) or (poly)anion(s) attached to the polymer backbone of the polymer electrolyte. In some designs, F may be bonded to carbon (C) in the polymer electrolyte. In some designs, F may be bonded to O in the polymer electrolyte. In some designs, F may be bonded to phosphorus (P) in the polymer electrolyte. In some designs, F may be bonded to boron (B) in the polymer electrolyte.

In some designs, it may be advantageous for the polymer electrolyte within the fluoride-comprising cathode composition to comprise chlorine (Cl). In some designs, Cl may be a part of the polymer functional group(s) or (poly)anion(s) attached to the polymer backbone of the polymer electrolyte. In some designs, Cl may be bonded to carbon (C) in the polymer electrolyte. In some designs, Cl may be bonded to O in the polymer electrolyte. In some designs, Cl may be bonded to P in the polymer electrolyte. In some designs, Cl may be bonded to F in the polymer electrolyte. In some designs, Cl may be bonded to B in the polymer electrolyte.

In some designs, it may be advantageous for the polymer electrolyte within the fluoride-comprising cathode composition to comprise phosphorous (P). In some designs, P may be a part of the polymer backbone. In some designs, P may be a part of the polymer functional group(s) of the polymer electrolyte. In some designs, P may form double bonds with neighboring atoms in the polymer electrolyte. In some designs, P may form single bonds with neighboring atoms in the polymer electrolyte. In some designs, the same P atoms may form a double bond with at least one of the neighboring atoms and single bond(s) with one or more other neighboring atom(s) in the polymer electrolyte. In some designs, P may form bonds with N in the polymer electrolyte. In some designs, P may form bonds with more than one neighboring N in the polymer electrolyte. In some designs, P may form bonds with O in the polymer electrolyte. In some designs, P may form bonds with both N and O in the polymer electrolyte. In some designs, P may form bonds with F in the polymer electrolyte.

In some designs, it may be advantageous for the polymer electrolyte within the fluoride-comprising cathode composition to comprise sulfur (S). In some designs, S may be a part of the polymer backbone of the polymer electrolyte. In some designs, S may bond with neighboring aromatic ring(s) within the polymer backbone or a side group in the polymer electrolyte. In some designs, S may be a part of the polymer functional group(s) or anion(s) attached to the polymer backbone of the polymer electrolyte. In some designs, S may form double bonds with neighboring atoms in the polymer electrolyte. In some designs, S may form single bonds with neighboring atoms in the polymer electrolyte. In some designs, the same S may form a double bond with one of the neighboring atoms and single bond with one or more other neighboring atoms. In some designs, S may form bonds with O in the polymer electrolyte. In some designs, S may form bonds with N in the polymer electrolyte. In some designs, S may form bonds with carbon (C) in the polymer electrolyte.

In some designs, it may be advantageous for the polymer electrolyte within the fluoride-comprising cathode composition to comprise selenium (Se). In some designs, Se may be a part of the polymer backbone of the polymer electrolyte. In some designs, Se may bond with neighboring aromatic ring(s) within the polymer backbone or a side group of the polymer electrolyte. In some designs, Se may be a part of the polymer functional group(s) or anion(s) attached to the polymer backbone of the polymer electrolyte. In some designs, Se may form double bonds with neighboring atoms in the polymer electrolyte. In some designs, Se may form single bonds with neighboring atoms in the polymer electrolyte. In some designs, the same Se may form a double bond with one of the neighboring atoms and a single bond with one or more other neighboring atoms in the polymer electrolyte. In some designs, Se may form bonds with O in the polymer electrolyte. In some designs, Se may form bonds with N in the polymer electrolyte. In some designs, Se may form bonds with C in the polymer electrolyte. In some designs, Se may form bonds with S in the polymer electrolyte.

In some designs, it may be advantageous for the polymer electrolyte within the fluoride-comprising cathode composition to comprise boron (B). In some designs, B may be a part of the polymer functional group(s) or (poly)anion(s) attached to the polymer backbone of the polymer electrolyte. In some designs, B may be bonded to F in the polymer electrolyte. In some designs, B may be bonded to O in the polymer electrolyte.

In some designs, it may be advantageous for the polymer electrolyte within the fluoride-comprising cathode composition to comprise lithium (Li). In some designs, Li may be a part of the polymer functional group(s) attached to the polymer backbone of the polymer electrolyte.

In some designs, it may be advantageous for the polymer electrolyte within the fluoride-comprising cathode composition to comprise one or more hybrid inorganic-organic polymers.

In some designs, it may be advantageous for the polymer electrolyte within the fluoride-comprising cathode composition to comprise one or more conjugated bonds.

In some designs, it may be advantageous for the polymer electrolyte within the fluoride-comprising cathode composition to comprise five-corner or six-corner ring-shaped compounds (including, but not limited to boroxine ring, aromatic/benzene ring, and their various derivatives, etc.). In some designs, the ring-shaped compounds in the polymer electrolyte may comprise B. In some designs, the ring compounds in the polymer electrolyte may comprise N (either within the ring backbone or in a side group or both). In some designs, the ring-shaped compounds in the polymer electrolyte may comprise O (either within the ring backbone or in a side group or both). In some designs, the ring-shaped compounds in the polymer electrolyte may comprise S (either within the ring backbone or in a side group or both). In some designs, the ring-shaped compounds in the polymer electrolyte may comprise F (e.g., in a side group).

Illustrative examples of polymer-based materials that may be used in the polymer electrolyte(s) (as standalone or as part(s) of the copolymers and (block)copolymers) may include, but are not limited to: (i) various oxygen (O)-containing polymers such as polyethers (such as poly(ethylene oxide) (PEO), poly(propylene oxide) (PPO), poly(phenylene oxide)), polyesters (such as poly(ε-caprolactone), poly(butyrolactone), polyesters from malonate, succinate, sebacate, adipate derivatives such as poly(ethylene malonate), poly(ethylene succinate), poly(ethylene sebacate), poly(1,4-butylene adipate)), polycarbonates (such as poly(trimethylene carbonate), poly(ethylene carbonate)), and their derivatives, poly(meth)acrylates such as poly(methacrylate), poly(methyl methacrylate), poly(n-butyl acrylate), poly(t-butyl methacrylate), poly(n-butyl methacrylate), poly(acrylic acid) and poly(methacrylic acid) and their derivatives, poly(meth)acrylates exhibiting pendant oligo(ethylene glycol) or cyclic and non-cyclic esters or cyclic and non-cyclic carbonate groups such as poly(di(ethylene glycol)methyl ether acrylate), poly(di(ethylene glycol)methyl ether methacrylate), poly(oligo(ethyleneglycol) methyl ether acrylate), poly(oligo(ethyleneglycol) methyl ether methacrylate) and their derivatives, among others; (ii) various nitrogen (N)-containing polymers such as polyimides, polyacrylamides and polynitriles and their derivatives (such as poly(acrylonitrile) (PAN) and poly(methacrylonitrile) (PMAN)), polyamides, polyurethanes, polyureas, poly(phosphazene)s, among others; (iii) various H-bonding polymers such as poly(alcohols) (such as poly(vinyl alcohol) (PVA)) and poly(amines) (such as poly(ethyleneimine)) and their derivatives; poly(acrylic acid) (PAA), poly(vinyl chloride) (PVC), poly(vinylidene fluoride) (PVdF), poly(siloxanes) or poly(carboxysilanes) and their various derivatives, among others; (iv) various sulfur (S)-containing polymers such as polyphenylene sulfide (PPS), among many others; (v) various natural biological polymers and polysaccharides, such as chitosan, to name a few examples.

Various types of polymerization processes may be utilized to prepare these and other suitable polymers or copolymers for the polymer electrolyte(s), including but not limited to: polycondensation, polyaddition, ring opening polymerization of cyclic monomers, copolymerization of epoxides with $CO_2$, anionic polymerization, ring-opening metathesis polymerization (ROMP) or radical initiated polymerization such as free radical polymerization, atomic transfer radical polymerization (ATRP), reversible addition-fragmentation chain transfer (RAFT), nitroxide-mediated radical polymerization (NMP) and other suitable polymerization techniques. In some designs, the particular polymerization technique used for a particular application may be selected based on the chemical nature of the polymer or copolymer used for the polymer electrolyte composition.

In some designs, one or more polymers of the polymer electrolyte composition may be chemically or physically cross-linked in such a way as to form a polymer network or a mixture of interpenetrating polymer networks or a polymer network swollen with polymer or any other suitable combination containing a polymer network. Illustrative examples of suitable chemical synthesis routes to do so include, but are not limited to: ring opening reaction such as amines or alcohols on epoxides, reaction of aldehydes or ketones with alcohols or amines, nucleophilic additions such as amines on maleimide derivatives, amidation, esterification or transesterification or etherification.

Illustrative examples of Li salts that may be used in the polymer electrolyte compositions include, but are not limited to, various Li salts with weakly coordinating anions (including, but not limited to polyanions, which may also be copolymers in some examples), such as: lithium trifluoromethane sulfonate ($LiCF_3SO_3$), lithium tetrafluoroborate ($LiBF_4$), lithium bis(pentafluoroethanesulfonyl)imide (LiBETI), lithium bis(trifluoromethanesulfonyl)imide (LiTFSI), lithium bis(fluorosulfonyl)imide (LiFSI), other imides (such as $SO_2FN^-(Li^+)SO_2F$, $CF_3SO_2N(Li^+)SO_2CF_3$, $CF_3CF_2SO_2N^-(Ki^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), lithium hexafluorophosphate ($LiPF_6$), lithium perchlorate ($LiClO_4$), $LiSbF_6$, lithium bis(oxalate)borate (LiB$(C_2O_4)_2$, LiBOB), lithium difluoro(oxalate)borate ($LiBF_2(C_2O_4)$), their various derivatives, among many others.

As previously briefly discussed, in some designs, it may be advantageous for the anion of the salt (e.g., a polyanion) to be immobilized by covalent attachment to a polymer or covalent attachment or coordination to a (e.g., inorganic) filler or an anion trap. Illustrative examples of anion traps may include, but are not limited to, boron derivatives, such as boron trifluoride ($BF_3$) or tris(pentafluorophenyl)borane ($B(C_6F_5)_3$).

Other illustrative examples of organic anions (such as polyanions) for the Li salts of the polymer electrolyte may include, but are not limited to: styrenics or (meth)acrylatics, polyphosphazene, polysiloxanes, polycarboxysilanes, polyetherimide (PEI), polyethylene oxide (PEO) derivatives with pendant carboxylate, sulfonate (such as benzenesulfonate, trifluorobutanesulfonate, perfluoroether sulfonate) or sulfonimide and sulfamide (such as trifluoromethanesulfamide, bis(perfluoroalkanesulfonyl)imide, (trifluoromethane(S-trifluoromethanesulfonylimino)-sulfonyl)imide(s) (($-SO_2N(-)SO-(=NSO_2CF_3)CF_3$), or borate or phosphate, among others. In some designs, the anions may be pendant groups. In some designs, the anions (such as polyanions) may only be decorating the chain ends of the polymer. In some designs, the anion (such as polyanions) and the main polymer chain may be separated by a spacer.

In some designs, the anionic polymer or copolymer may be prepared from a charged monomer by anionic or radical polymerization. In some designs, the anionic polymer or copolymer may be prepared by post-polymerization modification of a charged or uncharged polymer or copolymer. In some designs, the anions may be part of the main chain of the polymer instead of being side/functional/pendant groups.

In some designs, embedding metal fluoride material into a suitable skeleton matrix material or otherwise forming metal fluoride-matrix composites may be advantageous for the formation of fluoride-based cathode materials in terms of improved stability, improved capacity utilization, improved processability and/or improved rate performance in cells, among other benefits. In some designs, such a skeleton matrix material may be mechanically robust, chemically and electrochemically stable and electrically conductive and may serve one or more functions, including but not limited to: (i) confine the size of the metal fluoride nanoparticles (comprising, for example, $CuF_2$ or $FeF_3$ or $FeF_2$ or $NiF_2$ or $BiF_3$ or other active metal fluoride cathode materials in a charged (essentially Li-free) state or mixtures of LiF and the corresponding metals or metal alloys and other active metal fluoride cathode materials in a discharged state (Li-filled state) or comprising partially discharged or partially charged metal fluoride compositions) within about 1-100 nm cavities within the matrix material to reduce or prevent segregation of such an active metal fluoride material; (ii) provide electrical pathways to active metal fluoride cathode material electrochemical reaction sites; reduce volume changes in particles and electrodes during cell operation; (iii) prevent or reduce dissolution of non-Li cations during cycling; (iv) prevent or reduce direct contact between electrolyte and active metal fluoride cathode material during cycling, (v) improve mechanical properties of the cathode, among others. However, for some of metal fluoride materials (for example, for $CuF_2$), formation of such particle architecture may be challenging, expensive, or dangerous. Aspects of the present disclosure not only relate to the advantageous architecture of the composite particles, but also to one or more advanced approaches for suitable formation of such composite particles.

Instead of the traditionally used transition metal fluorides (such as $FeF_2$, $FeF_3$, $CoF_2$, $BiF_3$, $NiF_2$ and others), composite materials in accordance with at least one embodiment of the disclosure may comprise lithium fluoride (LiF) intermixed with clusters or nanoparticles of metal(s) or metal alloy(s) as active material (and may additionally comprise matrix material in some designs). In an example, this particle architecture may provide one or more of the following advantages: (i) the material does not expand significantly since Li is already present in these cathodes; (ii) the cathodes comprising such composite particles may be matched with Li-free anodes (such as graphite anodes, Si-comprising anodes, Sn-comprising anodes, etc.); (iii) formation of protective shells around such particles is significantly more straightforward and cheaper because LiF is significantly more stable and less reactive than many other metal fluorides (e.g., $CuF_2$ in particular); and/or (iv) volume fraction of active material (LiF and metal) in such composites may be significantly higher than in many composites comprising transition metal fluorides and matrix material due to peculiarities of synthesis stages compatible with LiF and not compatible with transition metal fluorides. In one example, this material may be viewed as a metal fluoride cathode material in a fully lithiated (discharged) state. However, in some designs, this material offers significantly more flexibility in the design and optimization of the cathode properties than simply a lithiated transition metal fluoride and thus allows for the formation of significantly better cathodes. In one example, this material may have an excess of LiF (which may be beneficial if some of the LiF is lost during subsequent processing) or an excess of metal nanoparticles (which may be beneficial for improvement of the rate capability of the cathode due to retaining electrically conductive material within an electrically insulative metal fluoride matrix and also due to the remaining metal serving as heterogeneous nucleation sites for the formation of metal clusters/nanoparticles during the conversion reaction). In a further example, another advantage of this material is its high chemical and thermal resistance. For example, if $CuF_2$ is heated in the presence of $H_2$, C, or other reducing agents at very moderate temperatures (e.g., low as about 80° C. to about 200° C.), the $Cu^{2+}$ ions of $CuF_2$ may reduce to $Cu^0$ metal (e.g., note that since this may occur without the simultaneous formation of LiF, an electrochemical reaction back to $CuF_2$ may be prevented from occurring if a battery is assembled with this material). In contrast, in some designs, when a mixed LiF/Cu matrix is heated at similar conditions, the mixed LiF/Cu matrix may remain largely unaffected (e.g., because LiF is more stable than $CuF_2$ and because Cu metal is already in the reduced state). Therefore, in some designs, the often advantageous formation of protective outer shells (e.g., shells that would protect this material from undesirable interactions with the electrolyte) and/or often advantageous formation of electrically conductive shells (e.g., shells that would provide electrical connectivity between individual particles and the current collector) around the LiF/Cu composite matrix particles may be performed at elevated temperatures (e.g., from around +50° C. to around +700° C., the suitable range may depend on the reaction environment and composition as well as the composition of the matrix material and size of Cu and LiF structures) and in a reducing environment (e.g., by using a CVD process that may involve $H_2$ generation or by using a thermal decomposition of a precursor material, etc.) and thus be of significantly higher quality (e.g., better mechanical stability, better integrity, better uniformity, etc.). Furthermore, since this material already has Li in the structure, further expansion is reduced or prevented from taking place during cell operation, and thus, fracturing of the electrode, the composite particles, or the outer protective shells may be significantly reduced or minimized.

For some applications, it may be advantageous for the cathode material to be in the form of individual particles (powders) before being added to a slurry. In some designs, for improved structural and chemical stability, the skeleton matrix for each metal fluoride-based composite particle may preferably be in the form of a single monolithic particle (a single-bodied particle). In some designs, it may also be advantageous for the skeleton matrix material to be electrically conductive (e.g., exhibit electrical conductivity above about 0.000001 S/m; preferably above 0.001 S/m; more preferably above 0.1 S/m; and even more preferably above around 10 S/m).

Figure 3:
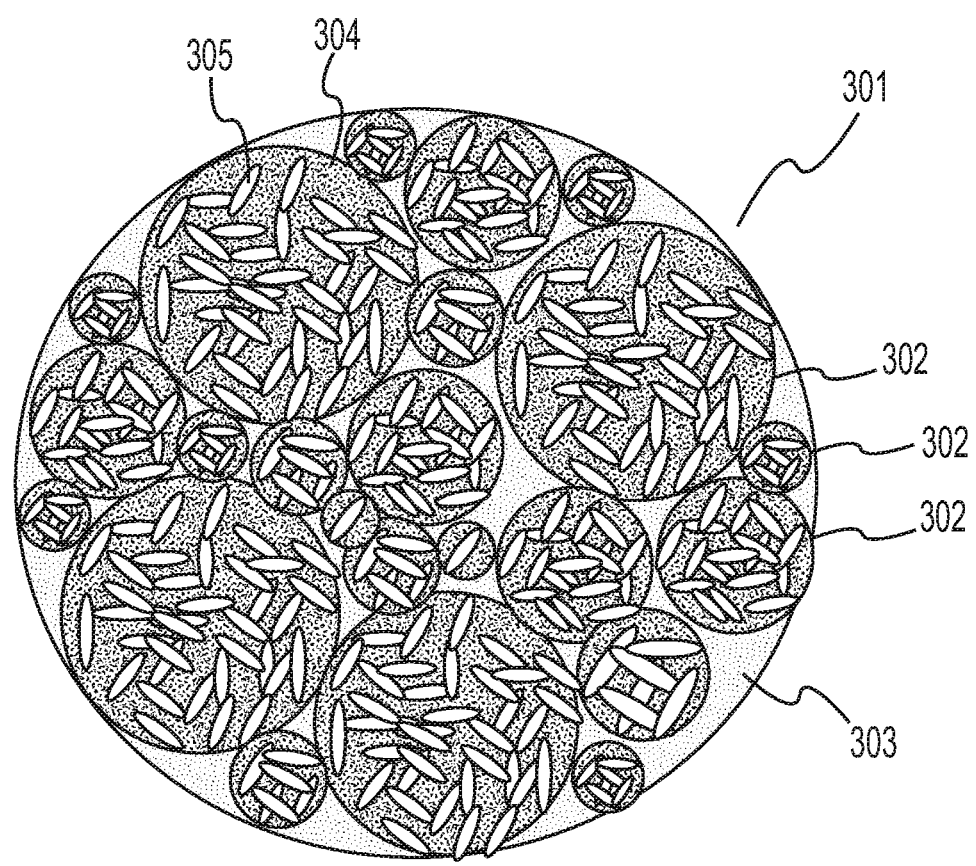
FIG. 3 and FIG. 4 illustrate examples of suitable architectures for composite particles comprising intermixed metal (M) and LiF materials in accordance embodiments of the present disclosure.

FIG. 3 illustrates an example of a suitable architecture for an LiF-M (where M is a metal or metal alloy) nanocomposite particle 301, whereby the LiF-M nanocomposite particle 301 comprises LiF-M composite nanoparticles 302 surrounded by a conductive skeleton matrix material 303, wherein one or more (e.g., each) of the composite nanoparticles 302, in turn, comprises LiF 304 and metal material 305. In some designs, the composite nanoparticles 302 may exhibit average dimensions in the range from around 1 nm to around 200 nm (in some designs, from around 2 nm to around 20 nm). In some designs, the metal material 305 may be in the form of one or more nanoparticles of various shapes (in some designs in the form of interconnected nanoparticles) with average linear dimensions in the range from around 0.5 nm to around 40 nm (in some designs, from around 1 nm to around 10 nm). The composite nanoparticles 302 may be electrically connected with other composite nanoparticles 302 via the conductive skeleton matrix material 303. In some designs, the composite nanoparticles 302 may be at least partially interconnected with other neighboring composite nanoparticles 302. In other designs, a majority (e.g., about 50% or more) of the composite nanoparticles 302 are physically separated (e.g., by around 0.3 nm to around 10 nm) from their respective nearest neighboring composite nanoparticles 302. In an example, the nanocomposite particle 301 may be representative of one or more of the composite particles 201 described above with respect to FIGS. 2A-2C.

In some designs, several material compositions may be suitable for use in a skeleton matrix of the type described herein, including but not limited to: metals and semimetals, polymers (including polymers that are electrically conductive within the cathode operational potential range), metal organic frameworks (MOFs), oxides, carbides (including ternary and other mixed carbides), oxy-carbides (including partially fluorinated ones), oxy-fluorides, various intercalation-type cathode materials, metal sulfides, metal oxy-sulfides, metal nitrides, metal oxy-nitrides, conductive carbons (including partially or fully fluorinated ones, such as carbon fluorides; in some designs with high content (e.g., about 50-100%) of $sp^2$-bonded carbon), carbon oxy-fluorides, their various mixtures and combinations and others. In some designs, it may be advantageous for the skeleton matrix material to be in the form of individual, monolithic (single-bodied) particles. In some designs, the skeleton matrix material may comprise from about 0.05 at. % to about 50 at. % fluorine (F). In some designs, the skeleton matrix material may comprise from about 0.009 at. % to about 99.99 at. % carbon (C). In some designs, it may be further advantageous (e.g., for maximizing energy density of the cathodes) for the volume fraction of the skeleton matrix material in the individual "skeleton matrix material-lithium fluoride-metal composite" particles not to exceed about 35-40 vol. %, more preferably not to exceed about 25-30 vol. %, and even more preferably not to exceed about 10-20 vol. %. However, when its volume fraction becomes too small (e.g., smaller than about 1-5 vol. %) the functionality of the skeleton matrix material may be undesirably reduced. In some designs, it may be further advantageous for the skeleton matrix material particles to exhibit characteristic dimensions in the range of about 20 nm to about 20 microns. In some designs, larger particles are easier to handle during the slurry preparation, but too large particles (e.g., the size of which depends on the cell chemistry and operating conditions, but in some designs may be below about 20 microns) may reduce rate performance below the minimum (for a given application) value. In some designs, if porous skeleton matrix particles are used, the characteristic dimensions of the majority (e.g., above about 70 vol. %) of the skeleton matrix material pores (which may be completely or partially filled with active materials, such as a mixture of LiF and metals, metal fluorides, etc.) may preferably be in the range of about 1 nm to about 100 nm. In some designs, if porous skeleton matrix particles are used (e.g., for filling such pores with active material), the volume of pores within such particles may preferably be in the range of about 60 vol. % to about 95 vol. %. In some designs, at least some of the pores within the skeleton matrix material may be produced using sacrificial template materials (e.g., a sacrificial polymer, sacrificial metal, or sacrificial salt particles). In some designs, the pores within the skeleton matrix material may be straight or curved and may be of various shapes (e.g., mostly slit shape, cylindrical shape, spherical shape, or have some other shape, including irregularly-shaped curved pores). In some designs, if the pores are of elongated or slit-shaped, the orientation of such pores may in some designs depend on the skeleton particle preparation and may vary within a single particle. For example, in the center of the particles the pores may be oriented randomly or along the radius, while closer to the surface the pores may be oriented parallel to the surface of the particles. In this case, the porous skeleton matrix material particles may achieve superior mechanical properties and, in some cases, may simplify formation of the protective coatings or shells, which may serve to stabilize the metal or metal fluorides against irreversible changes and undesirable interactions with electrolyte. In some designs, porous skeleton matrix material particles may have smaller pores closer to the particle surface. In this case, the porous skeleton matrix material particles may achieve superior mechanical properties and, in some cases, may simplify formation of the protective coatings or shells. In some designs, porous skeleton matrix material particles may exhibit a smaller pore volume closer to the particle surface. In this case, the porous skeleton matrix material particles may achieve superior mechanical properties and, in some cases, may simplify formation of the protective coatings or shells. In some designs, when metal fluorides infiltrated in the pores of the porous skeleton matrix material undergo chemical lithiation, the skeleton matrix material may become irreversibly deformed without substantial changes in the mechanical integrity of the composite particles. In some designs (e.g., when either metal fluorides or a mixture of metal and LiF are infiltrated in the pores of the porous skeleton matrix material), the volume changes upon repeated electrochemical cycling of such composites may be accommodated mostly by reversible elastic deformations (e.g., by over about 50% elastic deformation after cycle 5 and by over about 90% elastic deformation after cycle 50); in this case high stability of cells may be achieved.

In some designs, skeleton matrix material particles may comprise one or more conductive additives (e.g., carbon black particles, carbon nanotubes, graphene, exfoliated graphite, carbon fibers, metal particles, metal carbide particles, metal nitride particles, etc.) strongly (e.g., chemically) bonded to its outer surface in order to enhance stability of the electrode during electrochemical cycling.

As discussed above, in one example, porous carbon may serve as an electrically conductive skeleton matrix material. In some designs, porous carbons having most of the pore walls being a monolayer-thick may work particularly well, providing both high pore volume and sufficiently high conductivity, while reducing or minimizing the volume that "inactive" carbon atoms occupy. In some designs, porous carbons with experimentally measured Brunauer, Emmett and Teller (BET) specific surface area above about 50 $m^2/g$ (more preferably above about 500 $m^2/g$, even more preferably above about 1500 $m^2/g$) may work well as a skeleton matrix material. Examples of suitable porous carbon may include, but are not limited to carbide-derived carbon and other types of carbons produced from inorganic precursors, various templated carbons, polymer-derived carbons (e.g., carbons produced by polymer carbonization, including carbonization of naturally produced polymers), hydrochars (hydrothermally produced carbons), exfoliated graphites, exfoliated disordered carbons, activated carbon, among others. In some designs, carbon used as part of the electrically conductive skeleton matrix material may be produced by pyrolysis of carbon-containing organic precursors. In some designs, pores in carbon or carbon precursors may be enhanced by using chemical or physical activation (e.g., partial oxidation of the resulting carbon to enhance its pore volume and specific surface area).

In some designs, metal clusters, metal nanoparticles, or porous metal particles used as part of the electrically conductive skeleton matrix material may be produced by vapor deposition routes, such as chemical vapor deposition (CVD) or atomic layer deposition (ALD) processes or, in some cases (for example, when a high metal vapor pressure may be achieved and utilized) by condensation of metal vapors. In some designs, the metal (or metal alloy) clusters or nanoparticles may be produced from various metal precursors (e.g., metal-organic compounds or metal salts), which are decomposed (e.g., upon heating) or reduced.

In some designs, when the skeleton matrix material is utilized for cathode composite construction, the metal clusters/nanoparticles may be infiltrated into the pores of the skeleton matrix material or deposited onto the surface of the skeleton matrix material (such as skeleton matrix material particles). In some designs, the infiltration temperature may be sufficiently low to prevent excessive growth of metal particles (e.g., their minimum characteristic dimensions may preferably stay within 50 nm, or more preferably within 10 nm). In some designs, the metal clusters or metal nanoparticles in the electrically conductive skeleton matrix material may be interconnected. In some designs, these interconnected metal nanoparticles in the electrically conductive skeleton matrix material may be in the form of a metal foam or a porous metal powder.

In some designs, the LiF clusters, LiF layers, LiF nanoparticles, or LiF porous particles in the electrically conductive skeleton matrix material may be produced or deposited (e.g., on to the surface of the matrix material or matrix material precursor) by using various vapor deposition routes, such as chemical vapor deposition (CVD) or atomic layer deposition (ALD) processes. In some designs, LiF in the electrically conductive skeleton matrix material may be deposited from the solution either in the course of a chemical reaction or by solvent evaporation from the LiF solution. In some designs, LiF in the electrically conductive skeleton matrix material may be produced by lithiation of another fluoride. In some designs, LiF in the electrically conductive skeleton matrix material may be produced by fluorination of another Li salt or Li oxide. In some designs, when a skeleton matrix material is utilized for the cathode composite construction, LiF may be infiltrated into the pores or deposited onto the surface of the skeleton matrix material before or after the metal infiltration. In some designs, when a porous metal is used as the electrically conductive skeleton matrix material, LiF may be infiltrated into a porous metal powder to form intermixed LiF-metal nanocomposite(s).

In some designs, it may be advantageous to deposit or infiltrate LiF onto or into a cathode composite composition during one or more of the synthesis stages. For example, LiF may be used as an active (Li storing, when used in combination with the metal nanoparticles) material or may be used as inactive material serving for another purpose (e.g., protect the metal nanoparticles from undesirable interactions with electrolyte or ambient environment during the cathode fabrication or battery assembling or cycling, etc.) or both. In some designs, LiF may be deposited into the composite already comprising metal nanoparticles or metal oxide nanoparticles. In some designs, metal oxide nanoparticles may be at least partially reduced to metal nanoparticles after LiF deposition (since LiF material may be harder to reduce), thus forming a matrix-M-LiF composite. In some designs, metal nanoparticles may be deposited into the composite already comprising LiF. In some designs, LiF may be produced from another precursor (e.g., $Li_2O$) by using a fluorination reaction (in some designs, at or near room temperatures). In some designs, LiF may be deposited/infiltrated onto the matrix material (with or without metal or metal oxide particles) in a gaseous phase (e.g., by a CVD or ALD process). In some designs, $NF_3$ may be advantageously utilized as a precursor for F in a LiF composition (e.g., for the CVD or ALD of LiF). $NF_3$ may also be effectively used for various other fluorination reactions. Illustrative examples of other suitable F sources for LiF formation or various fluorination reactions may include, but are not limited to, $F_2$, HF, $SiF_4$, $SF_6$, $CF_4$, $CF_xH_{(4-x)}$ (x=1-4), tetrafluoroethylene, other fluoroethylenes ($C_2F_xH_{(4-x)}$ where x=1-4), fluoroethanes ($C_2F_xH_{(6-x)}$ where x=1-6), or other gaseous fluorocarbons. In some designs, various Li precursors may be effectively utilized for LiF deposition (and, more generally, for the lithiation reactions). In some designs, for example, such lithium precursors may contain Li—O bonds (for examples, as in (2,2,6,6-Tetramethyl-3,5-heptanedionato)lithium (Li (TMHD)) or lithium acetylacetonate (Li(acac)) or others). In other designs, for example, such lithium precursors may contain Li—C bonds (for examples, as in n-butillithium (n-BuLi) or tetr-butillithium (t-BuLi), among others).

In some designs, it may be advantageous to deposit or infiltrate metal (M) or metal oxide (MOx) onto or into the cathode composite composition during one or more of the synthesis stages. Suitable techniques for metal or metal oxide deposition include, but are not limited to, various vapor deposition techniques (e.g., ALD, CVD, etc.), electrodeposition, electroless deposition, solution-based infiltration of the metal or metal precursor salts, followed by their conversion to metal or metal oxide during subsequent thermal treatment or chemical reaction, among others.

In some designs, metal fluoride-matrix (nano)composite particles may be produced by conversion (including chemical transformation reaction) (e.g., by heat-treatment under controlled environment) or, more generally, a chemical reaction (e.g., in a gaseous or liquid phase), of the (nano) composite precursor particles that comprise both the precursor for the final matrix material (e.g., organic or metal organic or inorganic material precursor) and the precursor for the final active fluoride material (e.g., metal salt or metal oxide precursor).

In some designs, the above discussed precursor (nano) composite particles may be produced by co-precipitation from a solution (or, more generally, a liquid phase), co-precipitation/nucleation from a gas phase, spray-drying from a solution, spray-drying from a melt, electro-spraying, milling or mixing of the components, and various other suitable means. In some designs, one or more hydrothermal or solvothermal reactions may be used in at least one of the stages of the (nano)composite synthesis of the metal fluoride-matrix (nano)composite particles. In some designs, mechanical milling may be used in at least one of the stages of the (nano)composite synthesis of the metal fluoride-matrix (nano)composite particles. In some designs, the (nano)composite precursor particles may comprise a final or near-final composition of the active metal fluoride material and the precursor for the matrix material or a final or near-final composition of the matrix material and the precursor for the active metal fluoride material.

In one illustrative example, a matrix material precursor may be a polymer solution and metal fluoride precursor is a metal salt or a metal-organic compound that is soluble in the same solvent as the polymer. Illustrative examples of some of the suitable solvents include, but are not limited to, water, ethanol, methanol, dimethylformamide (DMF), NMP, among many others, and mixtures thereof. In some designs, the polymer-precursor solution may be spray-dried to produce (nano)composite particles comprising the nano-sized (e.g., from around 1 nm to around 100 nm) structures of the precursor (e.g., metal salt or metal-organic compound) and the polymer. If needed, such particles may be milled to produce finer particles (e.g., below about 10-50 micron in size). In some process designs, bonds may form between the precursor (e.g., metal salt or metal-organic compound) and the polymer or the precursor (e.g., metal salt or metal-organic compound) may promote cross-linking of the particles. In an example, the heat-treatment during or after the spray drying may cause cross-linking of the polymer. If needed, particles may be milled to produce finer particles after the additional heat-treatment (e.g., below about 10-50 micron in size). In some designs, the polymer may be carbonized at a temperature lower than a polymer melting point or precursor (e.g., metal salt or metal-organic compound) melting point. If needed, particles may be milled to produce finer particles after the carbonization (e.g., below about 10-50 micron in size). In some designs, carbonization may also chemically reduce metal salt nanoparticles to metal nanoparticles. In some designs, heat-treatment in a controlled environment (e.g., in some designs containing oxygen in some temperature range) may convert metal salt nanoparticles to metal oxide nanoparticles. In some designs, the metal in the metal/carbon composite may also oxidize upon exposure to oxygen-containing environment (e.g., air). In some designs, the produced particles may be fluorinated and then lithiated (in some designs, first lithiated and then fluorinated) to produce a metal-LiF-carbon nanocomposite. In some designs, (nano)composite particles may be enclosed in a Li-ion permeable (at room temperature) but substantially $H_2O$ or $O_2$ or electrolyte impermeable (at room temperature) air-tight shell at one or more stages of particle synthesis. In some designs, such shells may be deposited before and in some designs after the lithiation. In some designs, such shells may be deposited before and in some designs after the fluorination.

In some applications, direct contact between active material (e.g., of the conversion-type metal fluoride-based cathodes) and liquid electrolyte may induce dissolution of active materials. In some cases, such direct contact may also lead to undesirable and excessive liquid electrolyte decomposition within the potential window of cathode operation. For example, when Cu metal is exposed to electrolyte, the Cu metal may oxidize and dissolve as $Cu^{1+}$ and $Cu^{2+}$ species at around 3.56V versus Li/Li+ and 3.38V vs. Li/Li+, respectively (e.g., based on the standard oxidation potentials with 1M $Cu^+$ or $Cu^{2+}$ in solution). Unfortunately, these Cu oxidation potentials are very close to the redox potential for the conversion reaction of LiF and Cu metal to $CuF_2$ of 3.55V vs. Li/Li+. Thus, the formation of $Cu^+$ and $Cu^{2+}$ may occur alongside the desired redox reaction, unless one or more precautions are taken to prevent Cu metal dissolution. Besides causing the loss of Cu in the electrode, the formation of $Cu^+$ and $Cu^{2+}$ in solution may also encourage the dissolution of LiF through the formation of $[Cu(I)F_4]^{3-}$ or $[Cu(II)F_6]^{4-}$ species and also damage the SEI on the anode. Other metal fluoride ($MF_x$)-comprising particles may similarly suffer from such limitations.

Furthermore, in some applications, many solid electrolytes (e.g., many solid ceramic or glass or glass-ceramic electrolytes or some polymer electrolytes or various mixed electrolytes) as well as many hybrid electrolytes may unfavorably react (e.g., chemically or electrochemically) with fluoride-based conversion-type cathodes in some state of cathode charge or discharge (in some examples, nano-sized metal particles produced upon discharge of metal fluorides may be particularly reactive in contact with OH or S or Se or Cl or Br or Te-comprising electrolytes). One or more aspects of the present disclosure overcome one or more of these and/or other limitations via formation of suitable microstructure and composition of the composite electrode particles comprising conversion-type active materials and/or suitable electrode designs and compositions, among others. In some designs, in order to reduce or prevent metal dissolution and/or various other undesirable interactions between metal fluoride-containing active material and various electrolytes, formation of composite (e.g., matrix-comprising) materials including those that comprise suitable protective $Li^+$ permeable shells (e.g., comprising an oxide or nitride or oxi-nitride or phosphate or an oxi-fluoride of one or more metals, such as Al, Mg, Li, Nb, Co, Fe, Mn, Ni, W, Zn, Zr, among other suitable materials) around the metal fluoride electrode or around the individual particles comprising metal fluoride material may be effectively used. In some designs, a primary function of the "protective" shell may be to effectively seal active material and reduce, avoid or minimize the direct interaction(s) with the electrolyte during electrochemical (battery) cycling. In addition, in some designs, such shells may advantageously protect active material from unfavorable interactions with air or moisture during electrode or cell preparation. As such, low permeability of the shelling material by water ($H_2O$) or oxygen ($O_2$) may be highly advantageous, in some designs. While in some designs the shelling material may be primarily located near the perimeter of the composite particles (within the outer surface layer), in other designs it may be distributed within the bulk (or core) of the composite particles in order to enhance "robustness" of the composite against undesirable fractures during mixing, casting, calendaring and use. In some designs, the same or different shelling materials may form an outer surface layer while also being distributed at least in part within the bulk (or core) of the composite particles. In some designs, it may be advantageous for the shelling material to form a gradient with higher volume fraction of the shelling material closer to the external surface of the composite particles and smaller volume fraction of the shelling material near the center of the composite particles.

In some designs, such "protective" Li-ion permeable shells may serve multiple purposes. For example, the Li-ion permeable shells may enhance wetting of the electrolyte on active material. In another example, the Li-ion permeable shells may reduce or prevent migration of active material from the composite during synthesis or post-synthesis treatment or cell operation. In yet another example, the Li-ion permeable shells may enhance electrical conductivity of the electrode particles.

In some designs (e.g., when solid electrolyte is used), the Li-ion permeable shells may also serve to reduce interfacial stresses at the electrode/electrolyte interphase. In such and other designs, it may be advantageous (e.g., for improved stability or rate performance) for the shell to comprise pores. In some designs, at least a portion of such pores could be closed (internal). In some designs, at least a portion of such pores could be interconnected (open). In some designs, the size of such pores may advantageously range from around 0.2 nm to around 20 nm.

Formation of properly functioning shells is often challenging, expensive, insufficiently reliable (e.g., for achieving stability during cycling or storage, particularly at a partially or fully discharged state when repeated cycling may cause shells to delaminate or crack) and potentially dangerous. For example, formation of various shells around $CuF_2$-comprising material (particularly at temperatures above around 60° C. in an HF-free or F-free environment) may result in undesirable reactions, such as conversion of $CuF_2$ into a Cu metal, HF vapors, $F_2$ gas, or various other fluorinated compounds (e.g., depending on the particular chemical synthesis route utilized for the shell deposition). The use of an HF- or F-gaseous environment may help to reduce or prevent $CuF_2$ decomposition or conversion reactions in some cases, but it may significantly increase the fabrication cost and potential hazard during this operation. Even once formed, the produced protective shells may become broken during cell operation if the expansion (e.g., induced by electrochemical lithiation of the electrodes) induces stresses sufficiently large to initiate cracks and fractures in the shell during the initial or the subsequent cycles (fatigue). Once broken, the shells may not provide the required stabilization against side reactions in some applications, particularly if cathodes are immersed into a liquid electrolyte in a battery cell. One or more aspects of the present disclosure relate to synthesis routes to overcome one or more of such challenges and deposit suitable coatings that may better withstand stresses during battery cycling. In some designs, for example, formation of shells onto (at least partially) lithiated cathodes or cathode particles may offer an advantage of enhanced thermal stability of such cathodes and also their expanded (in some designs, fully expanded) state.

The combination of using core-shell particle architecture and embedding metal fluoride materials in a suitable matrix material may be particularly effective in some designs. In some designs, this particle architecture may significantly reduce irreversible changes in the electrode during cycling (for example, by preventing irreversible growth of metal clusters) and reduce cell degradation and resistance growth. In some designs, this particle architecture may significantly reduce ionic and/or electrical resistance of the cathode particles.

In some designs, the shell in the core-shell particle architecture may advantageously comprise a gradient in composition (e.g., two, three or more distinct layers in terms of composition). In some designs, it may be advantageous to deposit at least a portion of the shell prior to particle assembling into electrodes (e.g., prior to casting a slurry onto a current collector). In some designs, it may be advantageous to deposit at least a portion of the shell after the particles' assembling into electrodes (that may comprise a conductive additive and a binder in addition to active particles). A deposition of such a shell may be done, for example, by ALD or other suitable deposition techniques.

In some designs (e.g., due to sensitivity of the fluoride cathode particles to some solvents (e.g., water) or other design considerations (e.g., not using toxic solvents), etc.), it may be advantageous to cast an electrode onto a current collector (e.g., metal foil, porous metal foil, metal mesh, etc.) in a dry state (without using a solvent in a slurry). Various suitable dry (solvent-free) film deposition techniques could be utilized, including but not limited to electrospraying.

Figure 4:
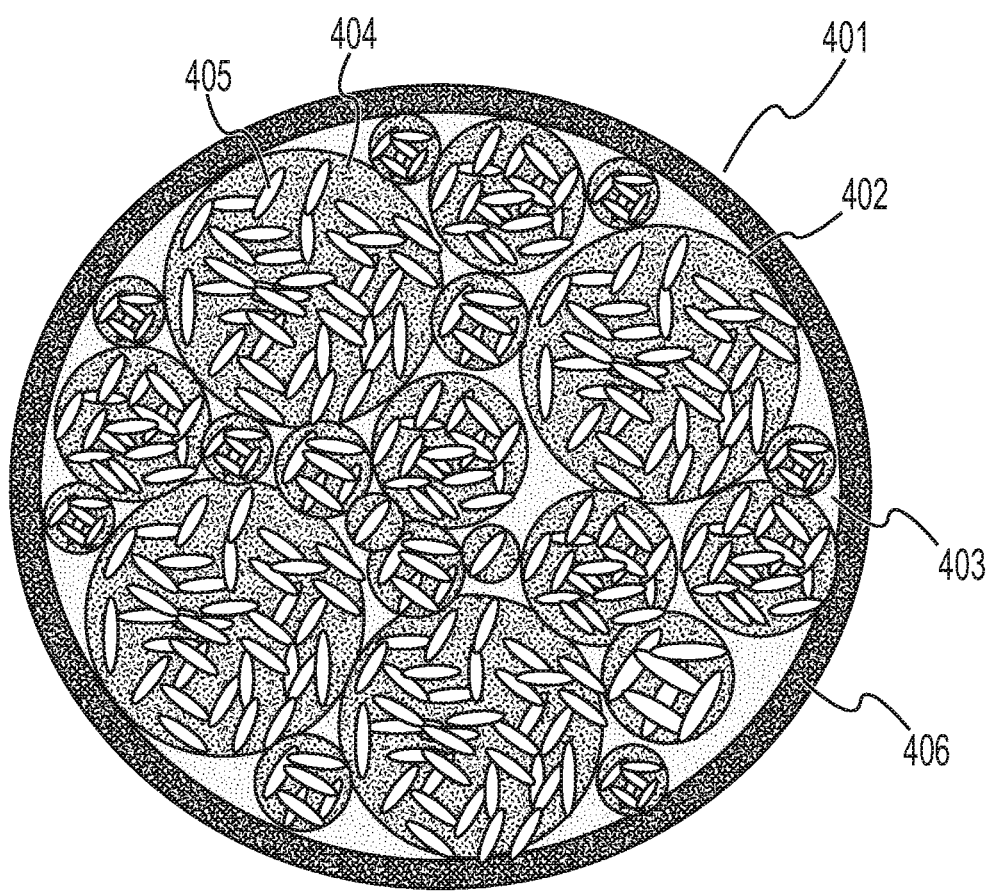

FIG. 4 illustrate an example of a LiF-M (where M is a metal or metal alloy) nanocomposite particle 401 in accordance with another aspect of the prevent disclosure. The LiF-M nanocomposite particle 401 is similar to the LiF-M nanocomposite particle 301 of FIG. 3, except that the LiF-M nanocomposite particle 401 of FIG. 4 is further coated with a functional shell 406. In an example, one function of the functional shell 406 may be to reduce or prevent undesirable reactions between the electrolyte and M or between the electrolyte and LiF (in other words, the functional shell 406 may be substantially impermeable to an electrolyte that contacts at least part of the functional shell 406). In an example, another function of the functional shell 406 may be to improve electrical conductivity (since LiF is electrically insulative). In an example, another function of the functional shell 406 may be to improve the properties of the active material/electrolyte interface (or interphase)—e.g., by reducing charge transfer resistance or stability, or providing other suitable and useful functions. In this illustrating example (similar to FIG. 3), the nanocomposite particle 401 comprises LiF-M composite nanoparticles 402 surrounded by a skeleton matrix material 403, wherein one or more (e.g., each) of the composite nanoparticles 402, in turn, comprises LiF 404 and a metal material 405. In an example, the nanocomposite particle 401 may be representative of one or more of the composite particles 201 described above with respect to FIGS. 2A-2C.

In some designs, material composition of the shell (e.g., functional shell 406) may comprise a (nano)composite. In some designs, the shell material may advantageously comprise two or more distinct layers of different microstructures or compositions. In some designs, each layer may serve a different purpose (e.g., an outer layer may, for example, may enhance electrolyte wetting or charge-transfer resistance or improve electrical contact between the individual particles or other useful functions, while an inner layer may, for example, prevent undesirable direct contact between the active metal fluoride composition and the outer layer or electrolyte or other useful functions). In some designs, the thickness of each individual layer of the (nano)composite shell material may range from around 0.2 nm to around 50 nm (in some designs, from around 0.3 nm to around 20 nm).

In some designs (e.g., when a shell material comprises a (nano)composite with two or more distinct components), at least some of the components of the shell material may form interpenetrative networks. In some designs, one component of the shell material may be arranged as a porous material with either opened or closed pores or both, where at least some of such pores are filled with the other (e.g., second) component(s) of the (nano)composite. Such an interpenetrating design may be beneficial when the two or more components offer complementary properties (e.g., one component providing higher electrical conductivity and another component higher $Li^+$ ion conductivity, or one component providing higher $Li^+$ mobility and another component providing higher $Li^+$ solubility at the cycling potentials, or component providing improved dispersion during slurry preparation and another component providing improved mechanical stability, or one component providing improved wetting by electrolyte and another component providing improved compatibility/interface with the core of the composite particles, etc.). In some designs, the interface between such interpenetrating materials may offer enhanced ionic mobility or other useful properties unavailable in each of the individual components. In some designs, the shell material may comprise active (Li storing) material compositions. In some designs, the shell material may comprise pores that are not filled with another liquid or solid material (e.g., voids that comprise a gaseous composition or a vacuum).

In some designs, the shell material may penetrate deep into the particles (e.g., about 20-100% of the distance from the surface of the composite particles (counting the thickness of the outer shell layer) to the center of the composite particles). In this case, the shell material may facilitate more robust sealing of a respective particle. In addition, in some designs, such a particle architecture makes the particles more resilient to stresses during cycling or electrode mixing and calendaring.

In some designs, it may be advantageous for the shell material to occupy from around 0.5 vol. % to around 30 vol. % (in some designs, from around 1 vol. % to around 15 vol. %) of the volume of the composite metal fluoride-comprising particles. In some designs, the optimum volume fraction may depend on the composition of the composite, fabrication and/or operational conditions of the electrodes and cells. In some designs, too little volume fraction may undesirably fail to achieve the needed protection, while too large volume fraction may undesirably reduce energy and power performance of the cathodes and may additionally lead to premature cell failure under some operating conditions.

In some designs, the shell material may be deposited onto a composite comprising matrix material and a metal (M) fluoride (e.g., $CuF_2$, $FeF_3$, Cu—Fe—F, among others), thereby at least partially sealing the composite. In some designs, subsequent (e.g., chemical) lithiation may induce formation of M-LiF. In some designs, the lithiation may also introduce Li into the shell material (e.g., depending on the shell material composition and lithiation conditions), which, in turn, may enhance the composite's ionic conductivity or reduce first cycle losses or improve sealing properties or improve dispersion in slurries or improve adhesion to the binders or reduce charge transfer resistance or provide other benefits, in some designs.

In some designs, the shell material may be deposited onto a composite comprising matrix material and a suitable metal (M). In some designs, subsequent (e.g., chemical) fluorination may induce formation of metal fluoride material in the composite. The fluorination may also introduce F into the shell material, in some designs (e.g., depending on the shell material composition and fluorination conditions). In some designs, the fluorination reaction may induce volume expansion of the shell material. Such an expansion may help to create a better sealing, in some designs. In some designs, subsequent (e.g., chemical) lithiation may induce formation of M-LiF in the composite. In some designs, the lithiation may also introduce Li into the shell material (e.g., depending on the shell material composition and lithiation conditions), which, in turn, may enhance the composite's ionic conductivity or reduce first cycle losses or improve sealing properties or improve dispersion in slurries or improve adhesion to the binders or reduce charge transfer resistance or provide other benefits, in some designs.

In some designs, the shell material may be deposited onto a composite comprising matrix material and a suitable metal oxide. In some designs, the metal oxide may be (at least partially) chemically reduced before or after the shell material deposition (e.g., using a hydrogen gas or hydrocarbon gas or matrix material or other means and their combinations, often at elevated temperatures). In some designs (e.g., when undesirable amount of oxygen is left in the composite after the shell material deposition using described here or another synthesis method process flow), it may be advantageous to utilize shell material chemistry with lower reduction potential so that upon exposing the produced composites into a reduced environment the active material precursor (e.g., oxygen-comprising metal or metal oxide) may be selectively reduced without inducing substantial or undesired reduction of the shell material under the same conditions (e.g., due to much slower kinetics or due to different thermodynamics for such a reduction reaction). In some designs, subsequent (e.g., chemical) fluorination may induce formation of metal fluoride material in the composite. In some designs, the oxygen (from the metal oxide) may be removed from the composite during the fluorination reaction. In some designs, at least a portion of the oxygen may be intentionally left in order to introduce oxygen doping or formation of metal oxyfluoride. The fluorination reaction may also introduce F into the shell material, in some designs. In some designs, subsequent (e.g., chemical) lithiation may induce formation of M-LiF in the composite. In some designs, the lithiation may also introduce Li into the shell material.

In some designs, the shell material may be deposited onto a composite comprising matrix material, LiF and a suitable metal (M). In some designs, both the LiF and the metal M may comprise some amount of oxygen or nitrogen. In some designs (e.g., when a shell material comprises oxygen, as in a metal oxide), it may be important to prevent or minimize the oxidation of the metal M in the composite. As such, in some designs when the shell material precursor (e.g., in a gaseous or liquid form) comprises oxygen atoms, such oxygen atoms may be chemically bonded to the metal atoms of the shell material precursor.

Various fluorine-comprising gases may be used for the fluorination reaction in some designs. In some process designs, $NF_3$ may be advantageously used as an F source for the fluorination reaction. In other designs, fluorine gas ($F_2$) or hydrofluoric acid (HF) (e.g., in ether gaseous or liquid/ solution form) may be used for the fluorination. In yet other designs, $SiF_4$ or $SF_6$ or $CF_4$ or $CF_xH_{(4-x)}$ (x=1-4) or tetrafluoroethylene or other fluoroethylenes ($C_2F_xH_{(4-x)}$ where x=1-4), fluoroethanes ($C_2F_xH_{(6-x)}$ where x=1-6) or other gaseous fluoro-carbons and hydro-fluoro-carbons and other fluorine-containing and their combinations may be used for the fluorination reaction.

In some designs, it may be advantageous (e.g., for more precise microstructure, morphology or composition control) for the fluoride precursor material (e.g., a metal salt) to be first at least partially converted into an oxide (e.g., by heating in an inert or oxygen-containing environment, depending on the precursor composition) prior to fluorination.

In some designs, it may be advantageous for the shell to comprise a polymeric material. In some designs, it may be advantageous for the shell to comprise a metallic material (e.g., a metal such as Cu or Fe or Mn or Ni or Bi or Co or Zr or Zn or Cr or Al or W or Ti or Ta or Y or La or In or HF or other suitable metals or a semimetal such as Si or Sb or Sn, among others). In some designs, it may be advantageous for the shell to comprise the same metallic material as an active fluoride cathode (e.g., Cu, Fe, Ni, Mn, Bi, etc.). In some designs, it may be advantageous for the shell to comprise two or more metals in its composition. In some applications, it is important to prevent dissolution of such metallic material during electrochemical cycling in a battery. In some designs, such metals may be used in combination with solid electrolytes or exhibit passivation reaction during oxidation in liquid electrolytes (e.g., like Al). In some designs, it may be advantageous for the shell to comprise a ceramic material comprising discussed above or other (e.g., Li, Mg, Cs, Na, etc.) metals or semimetals or their combinations (e.g., an oxide material or a fluoride material or an oxyfluoride material or a sulfide material or a nitride material or a carbide material or another suitable ceramic material, the optimal chemistry may depend on various factors). In some examples, the metal of the corresponding ceramic material (e.g., a metal fluoride, metal oxyfluoride, etc.) may be Li, other Group 1 metals, Group 2 metals, transition metal, p-block metal or a rare-earth metal or combination of two or more metals. In some designs, it may be advantageous for the shell to comprise carbon (such as conductive graphitic, mostly $sp^2$-bonded carbon, among others). In some designs, it may be advantageous for the shell to comprise more than one type of material, including any of those discussed above. In some designs, it may be preferred for the shell material (or at least a portion of the shell material) not to exhibit conversion reaction(s) in the electrochemical potential window of the cathode operation (charging and discharging) in a (Li or Li-ion) battery cell. In some designs, the shell material (or at least to a portion of the shell material) may preferably not exhibit conversion reaction(s) when exposed to a low electrochemical potential (e.g., in some designs to around 1.5 V vs. Li/Li+; in some designs—to around 1.0 V vs. Li/Li+). In some designs, the shell material (or at least a portion of the shell material) may preferably stay in its highest common oxidation state at the electrochemical potentials down to around 1.5 V vs. Li/Li+.

In some designs, at least a portion of the shell material may be deposited in a gaseous phase. In some designs, precursor molecules for the shell material deposition in a gaseous phase may comprise volatile solids (e.g., solids with sufficiently high vapor pressure at deposition conditions). In some designs, precursor molecules for the shell material deposition in a gaseous phase may be volatile liquids (e.g., liquids with sufficiently high vapor pressure at deposition conditions). In some designs (e.g., when a shell material comprises metal atoms in its composition), precursor molecules for the shell material deposition in a gaseous phase may be organometallics. In some designs (e.g., when the shell material comprises oxygen) the organometallic precursors may comprise metal-oxygen bonds (M-O). In some designs, precursor molecules for the shell material in a gaseous phase may be organometallics that comprise metal-nitrogen bonds (M-N). In some designs, precursor molecules for the shell material in a gaseous phase may be organometallics that comprise metal-carbon bonds (M-C). In some designs, oxygen or oxygen containing gas may be used during the deposition of the oxygen-containing shell material in a gaseous phase.

In some designs, at least a portion of the shell material may be deposited in a liquid phase. In some designs, a sol-gel technique may be used for the shell material deposition. In some designs, an electrodeposition technique may be used for the shell material deposition. In some designs, a layer-by-layer technique may be used for the shell material deposition. In some designs, an electroless deposition technique may be used for the shell material deposition. In some designs, an electrophoretic deposition technique may be used for the shell material deposition.

In some designs, at least a portion of the shell material may comprise carbon (e.g., in the form of graphitic or turbostratic or amorphous conductive carbon), as previously mentioned. In some designs, such a carbon-based shell material may be deposited in a gaseous phase (e.g., via a CVD reaction). In some designs, ethylene, propylene, acetylene, butene, butadiene, benzene, toluene, naphthalene, anthracene, and other known hydrocarbons may be utilized as precursor(s) for carbon deposition in a gaseous phase (e.g., by thermal decomposition or CVD). In some designs, hydrogen gas may be used together with hydrocarbon gas for carbon deposition in order to control the carbon microstructure and the type of the affluent formed during the deposition reaction. In some designs, a precursor of carbon material may first be deposited (e.g., either from a solution phase or a vapor phase via CVD or other suitable methods) and then at least partially converted to carbon by thermal annealing at elevated temperatures (e.g., from around 300° C. to around 750° C., depending on the precursor and composite composition). In some designs, more than one type of carbon may be utilized (e.g., a portion of the carbon produced by decomposition of the organic or inorganic precursor and another portion deposited from a gaseous phase). In some designs, spray-type CVD may be utilized for carbon deposition or carbon precursor deposition. In some designs, alcohols or carbon precursor(s) or other suitable solvents may be effectively utilized for the spray-type CVD process.

In some designs, at least a portion of the shell material may comprise a solid state electrolyte (e.g., of the previously described or other suitable compositions and properties).

In some designs, it may be advantageous for the shell to comprise both organic and inorganic constituents and thus be a (nano)composite. In some designs, an organic component of the shell may comprise an organic polymer or an organic polymer-derived product. In some designs, an inorganic component of the shell may comprise conductive carbon or a ceramic (e.g., fluoride, oxide, nitride, carbide, their various mixtures and alloys, etc.) or an inorganic polymer. In some designs, the shell may comprise lithium (Li). In some designs, the atomic fraction of Li in the shell material composition may range from around 0.01 at. % to around 75 at. %. In some designs, organic and inorganic components of the shell may be intimately (i.e., directly) connected. In some designs, there may be little (e.g., about 0.001-10 areal %) or no voids at the interfaces between the organic or inorganic components. In some designs, the organic and inorganic components of the shell material may be arranged as different layers of a layered structure. In some designs, the organic and inorganic components of the shell material may interpenetrate each other.

In some designs, it may be beneficial that the protective or multifunctional shell comprises a polymeric material. In some designs, the polymeric material may be ionically conductive for Li+ ions. In some designs (e.g., when the polymeric material exhibits a low ionic conductivity) the polymeric material may comprise only a portion of the shell so that the majority of the Li+ transport takes place through other portion(s) of the shell or through the interface between the polymeric and non-polymeric material. In some designs, polymeric material in the shell may comprise more than one distinct phase or more than one polymer, where each phase (polymer) may offer some complementary properties (e.g., one being more ionically conductive and another being more electronically conductive, etc.). In some designs, polymeric material in the shell may comprise one or more small molecule plasticizers. In some designs (e.g., when two or more distinct phases or polymers are present in the polymeric material), the polymeric material in the shell may be a physical blend of some of these components. In some other designs, two or more of these components might be covalently attached. In some other designs, the polymeric shell material might be a physical blend of covalently and non-covalently attached components. In some examples, the polymeric shell material may be covalently attached to the particle containing the active materials while in some other examples, the polymeric shell material may only exhibit non-covalent interactions with the particle containing the active ingredient.

In some designs, it may be advantageous for the polymer shell material to comprise nitrogen (N). In some designs, N may be a part of the polymer backbone of the polymer shell material. In some designs, N may be a part of polymer functional group(s) of the polymer shell material. In some designs, N may form double bonds with neighboring atoms in the polymer shell material. In some designs, N may form single bonds with neighboring atoms in the polymer shell material. In some designs, the same N may form a double bond with one of the neighboring atoms and single bond with another one of the neighboring atoms in the polymer shell material. In some designs, N may be bonded to phosphorous (P) in the polymer shell material. In some designs, N may be bonded to hydrogen (H) in the polymer shell material. In some designs, N may be bonded to sulfur (S) in the polymer shell material. In some designs, N may be bonded to selenium (Se) in the polymer shell material. In some designs, N may be bonded to carbon (C) in the polymer shell material.

In some designs, it may be advantageous for the polymer shell material to comprise oxygen (O). In some designs, O may be a part of the polymer backbone of the polymer shell material. In some designs, O may be a part of polymer functional group(s) of the polymer shell material. In some designs, O may form double bonds with neighboring atoms in the polymer shell material. In some designs, O may form single bonds with neighboring atoms in the polymer shell material.

In some designs, it may be advantageous for the polymer shell material to comprise fluorine (F). In some designs, F may be a part of polymer functional group(s) or (poly)-anion(s) attached to the polymer backbone of the polymer shell material. In some designs, F may be bonded to carbon (C) in the polymer shell material. In some designs, F may be bonded to O in the polymer shell material. In some designs, F may be bonded to phosphorus (P) in the polymer shell material. In some designs, F may be bonded to boron (B) in the polymer shell material.

In some designs, it may be advantageous for the polymer shell material to comprise chlorine (Cl). In some designs, Cl may be a part of polymer functional group(s) or (poly)-anion(s) attached to the polymer backbone of the polymer shell material. In some designs, Cl may be bonded to carbon (C) in the polymer shell material. In some designs, Cl may be bonded to O in the polymer shell material. In some designs, Cl may be bonded to P in the polymer shell material. In some designs, Cl may be bonded to F in the polymer shell material. In some designs, Cl may be bonded to B in the polymer shell material.

In some designs, it may be advantageous for the polymer shell material to comprise phosphorous (P). In some designs, P may be a part of the polymer backbone of the polymer shell material. In some designs, P may be a part of polymer functional group(s) of the polymer shell material. In some designs, P may form double bonds with neighboring atoms in the polymer shell material. In some designs, P may form single bonds with neighboring atoms in the polymer shell material. In some designs, the same P atoms may form a double bond with at least one of the neighboring atoms and single bond(s) with other neighboring atom(s) in the polymer shell material. In some designs, P may form bonds with N in the polymer shell material. In some designs, P may form bonds with more than one neighboring N in the polymer shell material. In some designs, P may form bonds with O in the polymer shell material. In some designs, P may form bonds with both N and O in the polymer shell material. In some designs, P may form bonds with F in the polymer shell material.

In some designs, it may be advantageous for the polymer shell material to comprise sulfur (S). In some designs, S may be a part of the polymer backbone of the polymer shell material. In some designs, S may be a part of polymer functional group(s) or anion(s) attached to the polymer backbone of the polymer shell material. In some designs, S may form double bonds with neighboring atoms in the polymer shell material. In some designs, S may form single bonds with neighboring atoms in the polymer shell material. In some designs, the same S may form a double bond with one of the neighboring atoms and single bond with other neighboring atoms in the polymer shell material. In some designs, S may form bonds with O in the polymer shell material. In some designs, S may form bonds with N in the polymer shell material. In some designs, S may form bonds with carbon (C) in the polymer shell material.

In some designs, it may be advantageous for the polymer shell material to comprise selenium (Se). In some designs, Se may be a part of the polymer backbone of the polymer shell material. In some designs, Se may be a part of polymer functional group(s) or anion(s) attached to the polymer backbone of the polymer shell material. In some designs, Se may form double bonds with neighboring atoms in the polymer shell material. In some designs, Se may form single bonds with neighboring atoms in the polymer shell material. In some designs, the same Se may form a double bond with one of the neighboring atoms and single bond with other neighboring atoms in the polymer shell material. In some designs, Se may form bonds with O in the polymer shell material. In some designs, Se may form bonds with N in the polymer shell material. In some designs, Se may form bonds with C in the polymer shell material. In some designs, Se may form bonds with S in the polymer shell material.

In some designs, it may be advantageous for the polymer shell material to comprise boron (B). In some designs, B may be a part of polymer functional group(s) or (poly)-anion(s) attached to the polymer backbone of the polymer shell material. In some designs, B may be bonded to F in the polymer shell material. In some designs, B may be bonded to O in the polymer shell material.

In some designs, it may be advantageous for the polymer shell material to comprise one or more hybrid inorganic-organic polymers.

In some designs, it may be advantageous for the polymer shell material to comprise one or more conjugated bonds.

In some designs, it may be advantageous for the polymer shell material to comprise five-corner or six-corner ring-shaped compounds (including, but not limited to boroxine ring, aromatic/benzene ring, and their various derivatives, etc.). In some designs, the ring-shaped compounds in the polymer shell material may comprise B. In some designs, the ring-shaped compounds in the polymer shell material may comprise N (e.g., either within the ring backbone or in a side group or both). In some designs, the ring-shaped compounds in the polymer shell material may comprise O (e.g., either within the ring backbone or in a side group or both). In some designs, the ring-shaped compounds in the polymer shell material may comprise S (e.g., either within the ring backbone or in a side group or both). In some designs, the ring-shaped compounds in the polymer shell material may comprise F (e.g., in a side group).

In some designs, it may be advantageous for the polymer material in the protective or multifunctional shell to comprise one or more linear polymers (or copolymers). In some designs, it may be advantageous for the polymer material in the protective or multifunctional shell to comprise one or more branched polymers (or copolymers). In some designs, it may be advantageous for the polymer material in the shell to comprise one or more star-shaped or dendritic or comb-type polymers (or copolymers). In some designs, it may be advantageous for the polymer material in the shell to comprise polymers (or copolymers) of more than one shape/architecture (e.g., comprise both linear and branched polymers or both branched and dendritic polymers or linear, branched and dendritic polymers, etc.). In this way, properties of the polymer-comprising shell may be favorably tuned to particular applications.

Illustrative examples of suitable polymers that may be used in a polymeric shell material include, but are not limited to: poly(acrylics) and poly(methacrylics) (such as poly(methyl methacrylate), poly(ethyl acrylate), poly(n-butyl acrylate), poly(t-butyl acrylate), poly(n-butyl methacrylate), poly(t-butyl methacrylate), poly(hexyl acrylate), poly(hexyl methacrylate), poly(cyclohexyl acrylate), poly(cyclohexyl methacrylate), poly(benzyl acrylate), poly(benzyl methacrylate), poly(perfluorobenzyl acrylate), poly(perfluorobenzyl methacrylate), poly((1H,1H,2H,2H-perfluorodecyl)acrylate), poly((1H,1H,2H,2H-perfluorodecyl)methacrylate), poly(phosphazene), poly(methacrylic acid), poly(acrylic acid), poly(2-hydroxyethyl acrylate), poly(2-hydroxyethyl methacrylate), poly(glycidyl acrylate), poly(glycidyl methacrylate), poly(ethylene glycol acrylate), poly(ethylene glycol methacrylate), poly(acrylamido-) and poly(methacrylamido-) (such as poly(N-isopropylacrylamide), poly(acrylonitrile), poly(1-vinyl-2-pyrrolidone), styrenics (such as poly(styrene), poly(dimethylaminomethyl styrene)), or any of the electron-conducting or Li+-conducting polymers described in the polymer electrolyte section or other sections of this disclosure.

In some designs, one or more multifunctional monomers such as ethylene glycol dimethacrylate, ethylene glycol diacrylate, divinylbenzene, 1,3,5-trivinyl, trimethyl trisiloxane, N,N'-methylenebisacrylamide, may be used in combination with one or more linear (or, in some designs, branched, star-shaped, dendritic, etc.) polymers describe in this embodiment or by themselves to produce a cross-linked polymeric shell material. In some designs, resin forming monomers or prepolymers may be used by themselves or in combination with the polymers described in this embodiment. Illustrative examples of suitable resins include, but are not limited to: urea-formaldehyde resins, maleimide resins, epoxy resins, polybenzoxazine resins, polyurethane resins, phenol resins or any combination thereof.

In some designs, the electronic conductivity of the polymer shell material may be increased by chemically or physically incorporating one or more electron-conducting polymer or one or more electron-conducting additive or any mixture thereof. In some of these examples, one or more electron-conducting polymer may be n-doped or p-doped. Suitable examples of such polymers include but are not limited to: poly(3,4-ethylenedioxythiophene) (PEDOT), poly(thiophene), poly((3-alkyl)thiophene), poly ((3-hexyl) thiophene) (P3HT), poly(acetylene), poly(paraphenylene), poly(paraphenylene vinylene), poly((2,5 dialkoxy)paraphenylene vinylene), poly(heptadiyne), poly(paraphenylene sulphide), poly(aniline) (PANT) or poly(pyrrole) (PPy).

In some designs, two or more polymers used in the polymeric shell material may be mixed to form a physical blend or covalently attached to form a gradient, statistical, alternating, graft or block copolymer. For example, it might be beneficial in some instances to copolymerize a synthon which has high electronic conductivity or high affinity with conductive additives with a synthon that has high affinity with the solvent used to prepare the slurry or to copolymerize a synthon which has a low Tg with a synthon which can be cross-linked to finely tune the properties of the polymeric shell material.

In some designs, the polymers, copolymers or cross-linked networks of the polymeric shell material may be prepared by various suitable type of polymerization techniques, including, but not limited to, polycondensation, polyaddition, coordination-insertion polymerization, oxidative polymerization, anionic polymerization, ring opening polymerization, ring-opening metathesis polymerization (ROMP) or radical initiated polymerization such as free-radical polymerization, atomic transfer radical polymerization (ATRP), reversible addition-fragmentation chain transfer (RAFT), nitroxide-mediated radical polymerization (NMP) and other suitable polymerization techniques. In some designs, the particular polymerization technique may be selected based on the chemical nature of the polymer or copolymer.

Illustrative examples of suitable deposition techniques for the polymeric shell material include, but are not limited to: electrodeposition (including self-limited electrodeposition), electroless deposition (including self-limited deposition), spray-drying, various dispersed media polymerization methods such as precipitation polymerization or emulsion polymerization, electrospray, microfluidics, dry blending, self-assembly of one or more preformed polymer at the surface of the particle favored by chemical interactions or initiated chemical vapor deposition (iCVD) or atomic layer deposition (ALD).

In some designs, one or more prepolymers exhibiting reactive moieties, with a molar mass between 300 g/mol and 1,000,000 g/mol, may be deposited as part of the polymeric shell material on and/or inside the particle containing the active metal fluoride material. In some of these examples, the reactive moieties may be used at a later stage, in combination with one or more other molecules, to either install some other chemical functionalities at the surface of the particle containing the active ingredient or to increase the crosslinking density of the shell. In some of these designs, intermolecular and/or intramolecular cross-linking reactions involving one or more prepolymers may be used to increase the cross-linking density of the polymeric shell material. Suitable deposition techniques for the one or more prepolymers include, but are not limited to: spray-drying, any dispersed media polymerization such as precipitation polymerization or emulsion polymerization, dry blending or self-assembly of one or more preformed polymer at the surface of the particle favored by chemical interactions. Suitable techniques to induce the reaction of the reactive moieties include, but are not limited to: one or more chemical triggers such as the addition of an acid or a base or an oxidizer or a reducer or a radical and/or physical triggers such as temperature or exposure to UV light or a combination thereof such as the release of radicals triggered by temperature or the release of radicals, or one or more bases or acids triggered by UV-light. In some examples, the reaction of the reactive moieties may be triggered before the electrode has been coated, for instance, using a solvent as a dispersing media or in an agitated or fluidized bed while in some other examples, the reaction of the reactive moieties may be triggered after the electrode has been coated.

In some designs, the polymeric shell material may be deposited, cured, or modified or any combination thereof, using a hydrothermal or a solvothermal process.

In some designs, the polymeric shell material may be deposited, cured, or modified or any combination thereof, using a polymeric or molecular stabilizer or surfactant. In some of these designs, the stabilizer or surfactant may be chemically incorporated in the polymer shell material.

In some designs, it may be beneficial for a polymer or mixture of polymers used in the polymeric shell material deposited inside and/or at the surface of the individual particles containing the active metal fluoride material to exhibit a Tg low enough so that after the electrode coating has been prepared, the electrode can be heated and/or calendared above that Tg to allow for the re-localization of the polymer shell material. In some of these examples, the packing density of the electrode may be improved and the distance between the particles containing the active ingredient and/or the conductive additive may be tuned.

In some designs, a polymeric shell material may be coated on the electrode after drying the electrode. In some of these examples, it may be beneficial to heat and/or calendar the polymeric shell coating to allow for the polymer shell material coated at the surface of the electrode coating to impregnate the electrode coating deeper.

In some designs, chemical lithiation may be effectively used during one or more stages of the fluoride-comprising composite synthesis. For example, as an alternative to the subsequent formation or deposition of metal (M) and LiF clusters/nanoparticles/porous particles, metal fluoride ($MF_x$) (nano)particles may be first formed (or deposited or infiltrated into a skeleton matrix material) and then converted into a LiF/M nanocomposite by using one of the chemical lithiation procedures (e.g., preferably in an anhydrous environment or other environments free from those solvents that may induce undesirable interactions either with LiF or with M). In some designs, these chemical lithiation processes may reduce a metal (M) from the $MF_x$ into its metallic state and simultaneously form LiF.

In some designs, the size of such $MF_x$-comprising particles may range from about 1 nm to about 50 microns (in some designs, from about 50 nm to about 10 micron). In some designs, such particles may comprise from around 25 wt. % to around 100 wt. % metal fluoride(s). In some designs, the rest of the particle composition (i.e., other than the metal fluoride part) may be comprised substantially of (i) electrochemically inactive material, (ii) electrochemically active material, (iii) a precursor for excess LiF or excess M (if desired), or (iv) another useful material (e.g., a dopant, a surfactant, a sacrificial template material, or a precursor for the skeleton matrix material). As used herein, an "electrochemically active material" generally refers to a material capable of electrochemically accepting and releasing Li or other metal ions in excess of around 50 mA/g (Li capacity). In some designs, higher content of metal fluoride(s) may be preferable to achieve higher capacity in the cathode.

In some designs, the $MF_x$-comprising compositions may be placed in a temperature-controlled environment of a lithiation reactor. In this case, controlling the temperature to which the $MF_x$-comprising compositions are exposed may be used to control the size and/or morphology of structural features in the obtained M/LiF composites. At some temperatures (and compositions), M and LiF may form interpenetrating networks during lithiation of $MF_x$ particles. At other temperatures (and compositions), M and LiF may form porous M with LiF filling its pores during lithiation of $MF_x$. At yet other temperatures (and compositions), M and LiF may form porous LiF with M filling its pores. In some conditions, the obtained M/LiF composite particles may largely retain the initial shape of the $MF_x$ particles. Such a situation may be preferable for some applications (e.g., when control of the composite morphology is important). At too high temperatures of the lithiation reactions, the size of M clusters or LiF clusters may be undesirably large for some applications and morphology of the M/LiF composite may deviate significantly from the morphology and size of the initial $MF_x$ particle. Unfortunately, chemical lithiation may be a highly exothermic process, where heat is released upon the chemical lithiation reaction. If such a reaction proceeds too fast and the heat extraction from the reactor is too slow, the control of the reaction temperature may be lost and the desired M/LiF composite morphology may not be obtained. The third stage may involve lithiation of the $MF_x$ compositions. In some designs, excess of metal (M) may be introduced into the M/LiF composite by, for example, post-deposition (e.g., by CVD, ALD, or wet chemistry routes—such as precipitation from the solution with subsequent reduction). Alternatively, in other designs, a metal precursor may be added to the $MF_x$ particles prior to chemical lithiation. In this case, the lithiation procedure may simultaneously reduce the metal precursor to form an additional metal component of the composite. Excess LiF may be introduced into the M/LiF composite by, for example, post-deposition (e.g., by CVD, ALD, or wet chemistry routes). Alternatively, in some designs, fluorinating a composite matrix material may provide extra fluorine needed for the additional LiF formation during the chemical lithiation. In some designs, by-products of the chemical reactions may be removed after synthesis.

In some designs, lithiation may proceed in a gaseous environment, where lithiation or reducing agents are delivered as vapor or gas molecules. In some designs, one advantage of this approach is its high precision and control, but there may be disadvantages in terms of high cost, slow rates, and limited (often expensive) chemistries of the suitable lithiation/reducing agents available. In other designs, lithiation may proceed in a solid phase (e.g., by mixing the powders). For example, lithium hydride (LiH) may be mixed with metal fluoride-containing compositions to produce LiF and metal-comprising compositions. In some designs, $H_2$ gas produced during this process may be evacuated. In some designs, such a mixing may be produced in a dry environment (in some designs, upon heating) or in solvent-comprising slurries. In yet other designs, the lithiation stage takes place in one or more solutions. A possible advantage of this approach (e.g., over lithiation by mixing powders in a dry state) in some designs is more precise control over the reaction rate (e.g., controlled by the choice of the lithiating or reducing agents, their concentration, and by the temperature of the reactor since liquids have higher conductivities than gases).

In some designs (e.g., depending on the chemical potential of different lithiation reagents and temperature of the lithiation process), one may preferably select lithiation conditions that may convert $MF_x$ to M-LiF compositions without having the shell or matrix material(s) undergo a conversion or substitution reaction.

In some designs, it may be advantageous to lithiate cathode material in a powder form (e.g., before being added to a slurry and cast onto an electrode). Yet in other designs, the cathode material may be lithiated only after being cast onto electrodes (e.g., cathodes). In some designs, if binder is utilized in such electrodes and if the lithiation proceeds in a solvent, it may be important to reduce or prevent binder dissolution by selecting a compatible binder/lithiation solvent combination. In some designs, a lithiation byproduct may either be dissolved in the same solvent or evacuated in a gaseous form. In some designs, electrodes and compressed powders or dense slurries (e.g., where particles are linked to each other using conductive additives) may be lithiated electrochemically. In some designs, it may be advantageous to use redox-active polymers that we may lithiate cathode materials in their reduced state. In some designs, such polymers may then be used as binders or polymer electrolyte for the electrode formulations.

In some designs, the use of one or more lithiating or reducing agents provide a more controlled lithiation and thus may be advantageous. Suitable examples of lithiating/reducing agents may include, but are not limited to, the following: (i) lithium alkylborohydrides (including lithium triethylborohydride), (ii) alkyllithium reagents (including tri-sec-butylborohydride, n-butyllithium, sec-butyllithium, and tert-butyllithium) (iii) alkyllithium magnesates (including tri-n-butyllithium magnesate and lithium dibutyl(isopropyl) magnesate) (iv) radical anions of polycyclic aromatic hydrocarbons (including lithium naphthalene radical anion and lithium anthracene radical anion) (v) lithium ketone radical anions (including lithium benzophenone ketyl), (vi) lithium aluminum hydride, or (vii) lithium borohydride. In some designs, any of these lithiating/reducing agents may be solutions in hydrocarbon or ethereal solvents or mixtures thereof. In some designs, chemical lithiation of $MF_x$ may also be conducted using separate lithiation and reducing agents, where a reducing agent transforms metal ions $M^{x+}$ to a metallic state $M^0$ and another lithiation agent provides $Li^+$ cations that combine with anions to form LiF. In some designs, such an approach may also be advantageous as it adds a new degree of freedom to control the rate and heat release during the lithiation, and, in addition, may allow overall process cost reduction. In some designs, lithiation agents may include any $Li^+$-containing salts (for example, lithium carbonate, lithium hexafluorophosphate, lithium nitrate, lithium phosphate, lithium sulfate, lithium tetrafluoroborate, lithium trifluoromethanesulfonate, lithium bis(trifluoromethyl)sulfonamide) and reducing agents may include any compound in its reduced form with a reduction potential below that of $M^{x+}/M$ (for example, any reducing/lithating agent listed above with a Group 1 or Group 2 metal cation in place of lithium, hydrazine, bis(cyclopentadienyl)cobalt (II), bis (pentamethylcyclopentadienyl)cobalt(II), $SmX_2$ (X=F, Cl, Br, I), Ni(0) compounds, tin alkyl hydrides). In some designs, the obtained composite particles (comprising metal and LiF components) may then be separated from the solution (e.g., by filtering, washing, and drying).

Many lithiation/reducing agents are reactive to air and moisture and may need to be handled under a dry, inert atmosphere. For some designs, lithiating/reducing agents should ideally produce LiF and $MF_x$ without side reactions and with reaction byproducts that are easily removable. In some designs, byproducts may be removed by extraction with organic solvents or evaporation/sublimation at reduced pressures or elevated temperatures. Alkyllithium reagents produce short-chain hydrocarbon byproducts that may either be extracted with organic solvent or removed by evaporation under reduced pressure or elevated temperature in some designs. A drawback of alkyllithium reagents is that they may produce alkylate metal salts (e.g., producing $M(alkyl)_x$), which is an undesired reaction for some applications. In some designs, the byproducts of organic radical anions (including ketyl radical anions or polycyclic aromatic hydrocarbon radical anions) may be uncharged organic small molecules that may be extracted with organic solvents or removed under reduced pressure or elevated temperature by evaporation or sublimation. The byproducts of alkyllithium magnesates, alkyl magnesium compounds and hydrocarbons may also be easily removable by extraction in organic solvents or be removed by evaporation (e.g., under reduced pressure or elevated temperatures). In some applications, lithium trialkylborohydrides produce hydrogen gas and trialkylboranes, which may be easily removed by evaporation, but trialkylboranes are pyrophoric such that this reagent may be less desirable for some applications where safety and ease of handling is desired.

In some designs, reactions with chemical reducing agents may be conducted in organic solvents, specifically including ethereal solvents such as tetrahydrofuran, dimethoxyethane, diethylether, or dioxolane or hydrocarbon solvents such as C5-C9 alkyl chains. In some designs, reactions may be conducted in an inert atmosphere to reduce or prevent oxidation by $O_2$ or oxidation or hydration by water. In some designs, the temperature of lithiation reactions may range from about −78° C. to about 600° C. (e.g., too low temperature restricts reaction kinetics too much, while too high temperature makes it less controllable). In some designs, a pressure of the reaction may range from about 0.05 atm. to about 50 atm. (e.g., near-atmospheric pressure may be suitable). In some designs, a concentration of the soluble reducing agents may range from about 0.001 M to about 10 M (or more, in some cases) in the reaction solvent. In some designs, molar ratios of lithium cations $Li^+$ relative to metal cations $M^{n+}$ may range from about 0.5n to about 100n. In some designs, the byproducts and solvents from reaction may be removed by filtration, centrifugation, evaporation, sublimation, carbonization, a combination thereof or other techniques.

In some designs, one or more of the described above lithiation techniques may be useful for lithiating other conversion-type electrode materials (e.g., S, Se, Si, Sn, etc.) or mixed intercalation/conversion materials or purely intercalation materials for use in rechargeable Li and Li ion batteries.

In some designs, in order to achieve a high energy cell (e.g., and often the lowest cost per unit energy in such cells and most favorable performance), when a battery is constructed with the cathode comprising mixed LiF and metal compositions and exhibiting a high volumetric capacity (e.g., above about 700 mAh/cc on the electrode level, more preferably above about 800 mAh/cc, even more preferable above about 900 mAh/cc, even more preferable above about 1000 mAh/cc), in some designs it may be preferred for the battery anode to also exhibit comparably high (or higher) volumetric capacity (e.g., above about 800 mAh/cc, even more preferably above about 900 mAh/cc, in some designs—more preferably above about 1000 mAh/cc or even above about 1100 mAh/cc). In some designs, it may be preferable for such high capacity anodes to comprise Si. In some designs, such high capacity anodes may comprise about 30 at. % of Si or more. In some designs, such high capacity anodes may comprise about 5 at. % of C or more in order to achieve better stability and higher rates. In some designs, it may be preferable for such high capacity anodes to comprise Li in order to further enhance cell energy density. In some designs, such high capacity anodes may comprise about 3 at. % of Li or more. In some designs, effectively Li metal or Li metal alloy anodes may be used in such high specific energy cells. In some designs, all (or essentially all) cyclable Li in the cell may be advantageously introduced into the cathode during the cell assembling so that Li is inserted (or alloyed or plated) within the anode during the first charge (e.g., after the cell assembling). In other words, in some designs it may be advantageous for the fluoride-cathode comprising cells to be assembled in a fully (or at least partially) discharged state. In some designs (e.g., when a solid electrolyte is used in contact with the Li metal anode), it may be advantageous for the Li to be deposited (plated) into the pre-existing open pores within the anode. In some designs, electrically interconnected porous carbon particles (e.g., surrounded by the solid electrolyte) may provide pore space for Li plating during charging. In some designs, the pores may comprise Li alloying element nanoparticles (e.g., Si nanoparticles or Si layers, among others) to provide a better dimensional control over Li insertion areas. Indeed, Li plating uniformity may be more difficult to control compared to Li alloying (e.g., to form Li—Si or Li—Sn alloys, etc.). The use of the rigid solid electrolyte surrounding porous particles may help to prevent Li plating onto the outer surface of the particles (because it would require overcoming a significant energy barrier associated with the plastic and elastic deformation of the solid electrolyte) and force Li insertion (or plating) inside the pores. Instead of (or in addition to) porous carbon (or hollow carbon spheres), the anode may comprise porous metal or semimetal or metal oxide particles based on materials that are permeable to Li ions and react/alloy with Li. Examples of such materials may include, but are not limited to, Si, Sn, Sb, Al, their various alloys, oxides (incl. suboxides), nitrides and other suitable compositions. Like the above-described designs and architectures of the metal fluoride cathodes, the conversion (e.g., Si-based) or Li metal (or Li alloy) anodes may exhibit a core-shell morphology in some designs. In some designs, at least a portion of the shell may be deposited after the anode fabrication (casting onto the current collector) (e.g., by ALD or other suitable techniques).

In some designs, the cathode (or both anode and cathode) may comprise a distinguishable polymer binder, where individual (e.g., composite) electrode particles are bonded to each other (and to a current collector) using such a binder. Furthermore, in some designs, it may be advantageous for the bonding between a polymer binder and electrode particle surfaces to comprise strong primary (chemical) bonds. In some designs, such particles may be bonded to the polymer binder using secondary bonds (electrostatic or van der Waals forces or hydrogen bonding, etc.). While individual secondary bonds (e.g., hydrogen or van der Waals bonds) are significantly weaker (exhibit lower binding energy) than individual chemical bonds, secondary bonds offer a significant advantage (for some applications) of being able to repair and reform new secondary bonds (after being broken). In contrast, broken chemical bonds are often irreparable or difficult to repair in some applications. In some designs, sufficiently large contact areas (e.g., from around 0.1% to around 100%) between electrode particles and the polymer binder that involve hydrogen bonding and high density of secondary bonds may compensate for the lower strength of individual secondary bonds in some designs and, as a result, may form sufficiently strong overall bonding between neighboring particles.

In some designs, the polymer binder need not be particularly ionically conductive (e.g., exhibit Li+ conductivity below about $10^{-8}$ S/cm at room temperature) as its primary function is to bind electrode particles together to form mechanically robust electrodes (e.g., which may be particularly important when conversion-type and thus volume changing active materials are utilized in the electrodes, such as metal fluoride-based conversion-type cathode active materials). However, in some designs, it may also be advantageous for the polymer binder to additionally exhibit sufficiently high ionic conductivity (e.g., above about $10^{-6}$ S/cm at room temperature) in order not to block the ion flow in/from the electrolyte to the active electrode particles. Alternatively, in some designs, the polymer binder may coat only a fraction of the electrode particle surfaces outer surface area in the electrode (e.g., from around 0.0001% to around 80.0%; in some designs from around 0.1% to around 25%) thereby leaving sufficient space for largely unobstructed ion transport.

In some designs, the suitable fraction of the polymer binder in the final electrode coating layer may range from around 0.0 wt. % to around 25 wt. % or from around 0.0 vol. % to around 35 vol. % (in some designs, from around 0.1 wt. % to around 10 wt. % or from around 0.1 vol. % to around 15.0 vol. %), depending on the volume changes in the electrode particles, shape and size of the electrode particles, surface chemistry of the electrode particles, electrode particle composition, ionic conductivity within a polymer binder in a fabricated cell, reactivity of the polymer binder with the electrolyte, miscibility of the polymer binder with the electrolyte, electrolyte composition, polymer binder composition, the electrode fabrication methodologies and/or other factors. In some designs, an insufficient mass or volume of the polymer binder may lead to mechanical failure of the electrode layer during cell fabrication or cell operation. In some designs, excessive mass or volume of the polymer binder may lead to reduced volumetric and gravimetric electrode capacities, reduced cell-level energy and power characteristics and/or reduced cycle stability of the electrodes or cells.

In some designs (e.g., for some chemistries of the binder, electrode particles and electrolyte), it may be advantageous for the binder to form chemical bonds with the electrode. In some designs, it may be advantageous for the binder to exhibit some limited reactivity with the electrolyte and form a binder/solid electrolyte interphase layer. In some designs, the thickness of such a layer may preferably not exceed around 20 nm. In some designs, it may be advantageous for the binder to form chemical bonds with the solid electrolyte.

In some designs, it may be advantageous for the binder distribution within the electrode not to be substantially uniform. In some designs, for example, it may be advantageous for the electrode to comprise a larger volume fraction of the binder near the current collector surface. In some designs, it may be advantageous for the binder to coat from around 0.1% to around 90% of the outer surface area of the electrode particles. The optimal binder coating on the electrode particles for particular applications may depend on the electrode, binder and electrolyte chemistry and/or electrode particle size. In some designs, too small areal coating may reduce mechanical strength and stability of the electrode. In some designs, too large area coating may reduce electrochemical stability of the cells and/or reduce its rate performance or provide other undesirable outcomes.

In some designs, at least a portion of the polymer binder may be in the form of polymer fibers (including porous fibers and (nano)fibers and other one dimensional (1D) elongated particles with an aspect ratio in the range from around 4 to around 1,000,000) or polymer flakes or platelets (including (nano)flakes and porous flakes and other two dimensional (2D) elongated particles with an aspect ratio in the range from around 4 to around 1,000,000) or polymer comprising composite fibers or polymer-comprising composite flakes. In some designs, the average smallest dimensions (thickness or diameter) of such fibers or flakes may advantageously range from around 2 nm to around 40 nm. In some designs, such polymer fibers (or flakes) may bond with the electrode particles to enhance mechanical properties or processability of the electrodes. In some designs, polymer fibers or flakes may form primary (chemical) bonds with electrode particles. In other designs, polymer fibers or flakes may form secondary bonds with the electrode particles in the electrode. In some designs, such a form of the polymer binder may help to enhance mechanical properties of the electrode(s) (polymer (nano)fibers and (nano)flakes may be particularly strong). The fiber-shape form of the polymer binder may also help to enhance ion transport within the electrode and through the electrode/electrolyte interface(s) or interphase(s).

In some designs, it may be advantageous for the individual polymer flakes or polymer fibers to exhibit tensile strength in the range from around 10 MPa to around 10 GPa. In some designs (e.g., when electrolyte is introduced at elevated temperatures into the electrode or when cells are exposed to relatively high temperatures during operation, etc.), it may be advantageous for the polymer flakes or fibers to exhibit thermal stability in the range of about 60° C. to about 400° C. (e.g., so as not to lose more than about 50% of its room temperature tensile strength while heating to such elevated temperatures).

In some designs, it may be advantageous for the individual polymer flakes or fibers to exhibit diameter (thickness) (e.g., an average diameter or thickness) in the range from around 1.0 nm to around 200 nm (e.g., depending on various factors, such as electrode particle size, electrode composition, binder mechanical and thermal properties, among others). In some designs, too thin fibers (or flakes) may not be sufficiently strong, while too thick fibers (or flakes) may reduce volumetric and gravimetric electrode capacities and, in some cases, may not provide sufficient contact area with the electrode particles to establish adequate mechanical properties.

In some designs, it may be advantageous for the stand-alone portion of the electrode (e.g., cathode or anode or both) layer (without the metal current collector) to exhibit a tensile strength (measured at room temperature in air) in the range from around 0.1 MPa to around 1,000 MPa (e.g., either when filled with the electrolyte or in the electrolyte-free state). In some designs, it may be advantageous for the electrode layer to exhibit a tensile strength in the range from around 0.1 MPa to around 1,000 MPa in the operating temperature range.

In some designs, it may be advantageous for the stand-alone portion of the electrode (cathode or anode or both) layer (without the metal current collector) to exhibit a compressive strength (in air, measured at room temperature) in the range from around 0.1 MPa to around 2,000 MPa in at least some state of charge or discharge (in one example, in the fully (or partially) lithiated/discharged state for the cathode or, in another example, in the fully (or partially) delithiated state for the anode; for example measured prior to cell operation). In some designs, it may be advantageous for the electrode layer(s) to exhibit a compressive strength in the range from around 0.1 MPa to around 2,000 MPa in the operating temperature range. In some designs, it may be advantageous for the electrode layer to exhibit a room-temperature compressive strength in the range from around 0.1 MPa to around 1,000 MPa when filled with the electrolyte.

In some designs (e.g., depending on a particular application, operational cell temperature range, electrode potentials during cell operation, synthesis method, desired electrode properties, chemical composition, volume changes of the electrode particles and/or other factors), a polymer binder in the electrode may comprise thermoset or thermoplastic polymers (either standalone or as a mixture or as a co-polymer component), including, but not limited to: various polysaccharides and mixture of polysaccharides with other polymers including but not limited to proteins (e.g., arabinoxylans, gum arabic, xantham gum, pectins, chitin and chitin derivatives, cellulose and cellulose derivatives including various modified natural polymers, such as cellulose acetate (CA), cellulose acetate butyrate (CBA), carboxymethylcellulose (CMC), cellulose nitrate (CN), ethyl cellulose (EC), among others cellulose derivatives, alginates including alginic acids and its salts, etc.); acrylonitrile-butadiene-styrene (ABS); allyl resin (Allyl); casein (CS); cresol-formaldehyde (CF); chlorinated polyethylene (CPE); chlorinated polyvinyl chloride (CPVC); various epoxies (polyepoxides) (including fluorinated epoxies); epichlorhydrin copolymers (ECO); ethylene-propylene-diene terpolymer (EPDM); ethylene-propylene copolymer (EPM); ethylene vinyl acetate copolymer (EVA); ethylene vinyl alcohol (E/VAL); various fluoropolymers (such as polytetrafluoroethylene (PTFE), polytetrafluoroethylene (PCTFE), perfluoroalkoxy polymer (PFA/MFA), fluorinated ethylene-propylene (FEP), tetrafluoroethylene, hexafluoropropylene, vinylidene fluoride and their copolymers (e.g., THV), poly-ethylenetetrafluoroethylene (ETFE), polyethylenechlorotrifluoroethylene (ECTFE), various perfluorinated elastomers (FFPM/FFKM), various fluorocarbons including chlorotrifluoroethylenevinylidene fluoride (FPM/FKM), tetrafluoroethylene-propylene (FEPM), perfluoropolyether (PFPE), perfluorosulfonic acid (PFSA), perfluoropolyoxetane, polyvinylfluoride (PVF), polyvinylidene fluoride (PVDF), various fluorosilicone rubbers (vinyl, methyl, etc.), among others); various ionomer-thermoplastic polymers; isobutene-isoprene copolymer (IIR); various liquid crystal polymers (LCP); melamine formaldehyde (MF); natural rubber (NR); phenol-formaldehyde plastic (PF); polyoxymethylene (POM); polyacrylate (ACM); polyacrylic acid (PAA); polyacrylic amide, polyacrylonitrile (PAN); various polyamides (PA) (including various aromatic polyamides often called aramids or polyaramids); polyaryletherketone (PAEK); polybutadiene (PBD); polybutylene (PB); polybutylene teraphtalate (PBTP); polycarbonate (PC); polychloromethyloxirane (epichlorhydrin polymer) (CO); polychloroprene (CR); polydicyclopentadiene (PDCP); polyester (in the form of either thermoplastic or thermoset polycondensate); polyetheretherketone (PEEK); polyetherimide (PEI); various sulfones and their derivatives such as polyethersulfone (PES) and polyphenylsulfone (PP SU); polyethylene (PE); polyethylenechlorinates (PEC); polyethylene teraphtalate (PET); poly(3,4-ethylenedioxythiophene) polystyrene sulfonate (PEDOT:PSS); phenol-formaldehyde (PF); polyimide (PI) (as thermoplastic or thermoset polycondensate); various imides and their derivatives such as polyetherimide (PEI) and polyamide-imide (PAI), among others; polyisobutylene (PM); polymethyl methacrylate (PMMA); polymethylpentene (PMP); polyoxymethylene (POM); polyketone (PK); polymethylpentene (PMP); polyethylene oxide (PEO); polyphenylene Oxide (PPO); polyphenylene sulfide (PPS); various polyamides and their derivatives, such as polyphthalamide (PTA), among others; polypropylene (PP); propylene oxide copolymer (GPO); polystyrene (PS); polysulfone (PSU); polyester urethane (AU); polyether urethane (PUR); polyvinylalcohol (PVA); polyvinylacetate (PVAc); polyvinyl butyral (PVB); polyvinylchloride (PVC); polyvinyl formal (PVF); polyvinylidene chloride (PVDC); styrene-acrylonitrile copolymer (SAN); styrene-butadiene copolymers (SBR and YSBR); various silicones (SI) (such as polydimethylsiloxanes, polymethylhydrosiloxane, hex-amethyldisiloxane, Sylgard®, various silicone elastomers ((phenyl, methyl) (PMQ), (phenyl, vinyl, methyl) (PMVQ), (vinyl, methyl) (VMQ), etc.); polyisoprene; urea-formaldehyde (UF), among others. In some designs, some of such polymers may be at least partially fluorinated.

In some designs, polymer(s) and/or a co-polymer composition of the electrode binder may comprise at least one of the following monomer constituents: acrylates and modified acrylates (methylacrylate, methylmethacrylate, etc.), diallylphthalates, dianhydrides, amines, alcohols, anhydrides, epoxies, dipodals, imides (polyimides), furans, melamines, parylenes, phenol-formaldehydes, polyesters, urea-formaldehydes, urethanes, acetals, amides, butylene terephthalates, carbonates, ether ketones, ethylenes, phenylene sulfides, propylenes, styrene, sulfones, vinyl, vinyl butyrals, vinyl chlorides, butylenes, chlorobutyls, fluorobutyls, bromobutyls, epichlorohydrins, fluorocarbons, isoprenes, neoprenes, nitriles, sulfides, silicones, among others.

In some designs, conversion-type metal-fluoride comprising electrodes may advantageously comprise one or more elongated conductive additives with aspect ratios in the range from around 5 to around 1000,000 and minimum dimensions (e.g., diameter or thickness) in the range from around 0.25 nm to around 100 nm. In an example, the optimum dimensions of the conductive additives for particular applications may depend on the electrode preparation conditions. Suitable examples of such elongated conductive additive particles may include, but are not limited to, various carbon nanotubes (such as, single-walled, double-walled, multiwalled and their various combinations), carbon nanofibers, metal nanofibers (or nanowires) (such as aluminum nanowires/nanofibers, nickel nanowires/nanofibers, iron nanowires/nanofibers, titanium nanowires/nanofibers, copper nanowires/nanofibers, among others, selected depending on the cell operating potential and electrolyte composition), carbon ribbons, conductive carbide nanofibers or nanowires or nanoribbons (e.g., made of conductive titanium carbide), conductive nitride nanofibers or nanowires or nanoribbons, electrically conductive oxide nanofibers or nanowires or nanoribbons, among others. In some designs, the one or more conductive additives may exhibit dendritic shape. In some designs, the one or more conductive additives may exhibit flake-like (platelet-like) shape. In some designs, the one or more conductive additives may comprise nanopores (e.g., from around 0.2 nm to around 100 nm in size). In some designs, the one or more conductive additives may comprise a thin (from around 0.2 nm to around 20 nm) surface layer (e.g., an oxide or nitride or carbide, etc.) deposited in order to enhance their electrochemical or mechanical stability or to enhance electrolyte wetting or to achieve other electrode-level or cell-level performance benefits. In some designs, the one or more conductive additives may be deposited onto or grown onto or chemically attached onto the surface of conversion-type fluoride cathode particles.

In some designs, one or more binders of similar composition, properties and shape to those described above as well as one or more conductive additives of similar composition, properties and shape to those described above and their various combinations may also be advantageously used for other conversion-type cathodes as well as for conversion-type (including alloying-type) anodes (such as Si-containing anodes, among others).

In some designs, binders of similar composition, properties and shape to those described above as well as conductive additives of similar composition, properties and shape to those described above and their various combinations may be advantageously used for intercalation-type cathodes and anodes, particularly those that incorporate solid electrolyte compositions, including those introduced by melt-infiltration method.

In some designs in the context of the present disclosure, it may be advantageous for the separator membrane between the anode and cathode to comprise ceramic (e.g., oxide) material in order to enhance mechanical (or thermal) properties of the cell during its construction or operation. In some designs, the fraction of ceramic material in the separator membrane may range from around 1 w. % to around 100 wt. % as a fraction of the membrane mass. In some designs, the separator membrane may be porous and impregnated with a suitable (e.g., liquid or solid) electrolyte. In some designs, such a porous separator may comprise fibers or nanofibers (e.g., about 1-100 wt. % relative to the all the solid material in the separator prior to electrolyte filling). In some designs, such fibers or nanofibers may be porous. In some designs, such fibers or nanofibers may be (or may comprise) ceramic fibers or nanofibers. In some designs, such fibers or nanofibers may be chemically bonded to at least some of their respective neighboring fibers or nanofibers. In some design, a ceramic portion of the separator may comprise aluminum oxide or magnesium oxide or zirconium oxide or zinc oxide. In some designs, the separator may comprise oxide fibers or nanofibers. In some designs, a porous separator may exhibit a core-shell morphology. In some designs, such a porous separator may be coated with the surface (shell) layer via a vapor deposition technique (e.g., ALD or CVD) or a suitable solution-deposition technique (e.g., sole-gel, spay-drying, layer-by-layer deposition, electroless deposition, etc.). In some designs, such a coating may comprise a thin (e.g., an average thickness between about 1-100 nm) ceramic layer (e.g., an oxide comprising Al, Zn, Zr, Mg, Na, Li or another suitable metal). In some designs, the surface layer may enhance electrolyte wetting. In some designs, at least a portion of such a surface layer may exhibit the same composition as a porous of the surface layer in the anode or cathode or both. In some designs, the surface (shell) layer may form or be modified upon reaction with an electrolyte. In some designs, at least a portion of the separator may be deposited into an anode or cathode or both prior to cell assembling or prior to surface layer deposition.

In some designs in the context of the present disclosure, it may be advantageous for the (e.g., metal) current collector(s) for the cathode or anode or both to comprise pores. In some designs, the total pore volume may range from around 1 vol. % to around 50 vol. %. In some designs, at least a portion of such pores (e.g., 25% or more) may be interconnected. Multiple favorable design considerations may be enabled by the presence of such pores in certain applications. For example, such pores may further reduce the weight of the current collectors (e.g., the weight of Cu in the anode) which is particularly substantial for lightweight conversion-type electrodes. In some designs, such pores may be infiltrated with a solid electrolyte during cell assembling and enhance mechanical robustness of the cell. In some designs, such pores may improve adhesion of the electrode to the current collector. In some designs, such pores may enable faster infiltration of the precursor molecules during the deposition of the surface layer onto the electrode(s). In some designs, such pores may relieve some stresses during cycling of conversion-type electrodes. In some designs, such pores may enable Li diffusion across the electrode/separator/electrode stacks (e.g., in order to provide active Li to the cell or to replenish lost Li in a cell). In some designs, it may be advantageous for the (e.g., metal) current collector(s) for the cathode or anode or both to comprise fibers or nanofibers. In some designs, such fibers may comprise polymer or carbon (e.g., such as carbon nanotubes). In some designs, such fibers may enhance mechanical properties of the current collector or improve adhesion of the electrode(s) to the current collector or provide other cell performance benefits.

Figure 5:
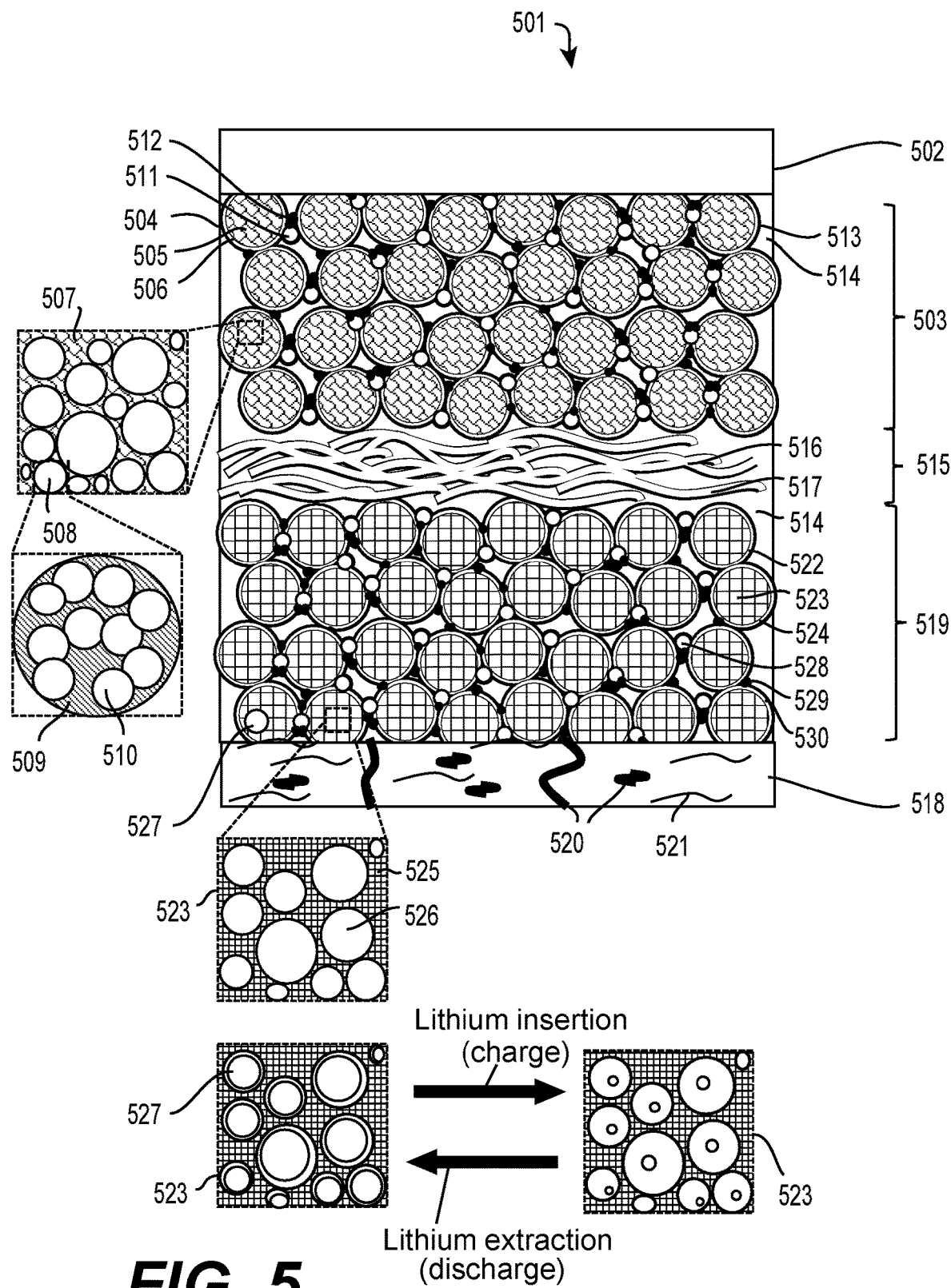
FIG. 5 illustrate examples of an architecture for cell components and a cell that comprises conversion-type electrode(s) in accordance embodiments of the present disclosure.

FIG. 5 illustrates examples of an architecture for an exemplary Li-ion or Li metal cell components and a cell that comprises conversion-type electrode(s) in accordance embodiments of the present disclosure. Here several described embodiments are combined in one cell design for illustrative purposes, although it will be appreciated that the particular combination of elements depicted in FIG. 5 need not be used in combination with each other in other embodiments. In particular, FIG. 5 illustrates a building block (e.g., an arrangement comprising cathode current collector/cathode/separator/anode/anode current collector) 501 that comprises a cathode current collector 502 coated (by a suitable technique) with an active cathode layer 503 of suitable composition. The cathode layer 503 may comprise, for example, suitable (for example, composite including core-shell) conversion-type composite cathode particles 504 of suitable size. Such particles may, for example, comprise a core 505 and a protective shell 506 of suitable compositions, morphologies and properties. The core 505 of such particles 504 may, for example, be a composite comprising conductive matrix material 507 and a suitable active material 508. The active material 508 may, for example, be also a composite comprising, for example, LiF 509 and suitable metal clusters 510. In other designs, the active material 508 may comprise, for example, $Li_2S$. The cathode layer 503 may also comprise a suitable binder 511 and suitable conductive additives 512. The current collector 502 and the cathode layer 503 may be coated with another functional surface layer 513, which may, for example, improve the interface (or interphase) with a suitable electrolyte 514 filling (in some designs, impregnated into) pores of the cathode layer 503 by a suitable technique. In some designs, the electrolyte 514 may comprise a solid electrolyte exhibiting suitable composition and properties. The building block 501 also comprises a suitable separator layer 515, which may comprise a suitable porous separator membrane 516 impregnated by the same electrolyte 514. The separator membrane 516 may comprise fibers or nanofibers 517 of suitable composition, morphology and properties. The building block 501 also comprises a suitable anode current collector 518 coated (by a suitable technique) with an anode layer 519 of suitable composition. The anode current collector 518 may, for example, comprise pores 520 and/or imbedded fibers 521 of suitable composition. The anode layer 519 may comprise suitable active material particles 522 of suitable composition, morphology and architecture. The anode active material particles 522 may, for example, comprise a core 523 and a protective shell 524. The core 523 of the anode active material particles 522 may, for example, be a composite comprising conductive matrix material 525 and a suitable active material 526. In some designs, the active material 526 may, for example, comprise Li metal or Li alloy (for example, a Li—Si alloy). In some designs, the building block 501 may be assembled in such a way that all or substantially all of the cyclable Li in a cell is initially comprised in the cathode particles 504. In this case, Li may be deposited or inserted into the anode active material particles 522 during the first charge. In this case, the anode active material particles 522 may initially comprise pores 527 to provide space for Li insertion during charge. Some (e.g., preferably very small) portion or fraction of the pores 527 may remain after Li insertion. The anode layer 519 may also comprise a suitable binder 528 and suitable conductive additives 529. The anode current collector 518 and the anode layer 519 may be coated with another functional surface layer 530 by a suitable technique, which may, for example, improve the interface (or interphase) with a suitable electrolyte 514 impregnated into the pores of the anode layer 519 by a suitable technique. In some designs, the electrolyte 514 in the anode layer 519 may be the same as the electrolyte 514 impregnated into the cathode layer 503 and the separator layer 515. In some designs, the electrolyte 514 in the cathode layer 503, the separator layer 515 and/or the anode layer 519 may be a solid electrolyte exhibiting suitable composition and properties. In some designs, the areal capacity loading on the anode layer 519 may, for example, range from around 2 mAh/cm² to around 12 mAh/cm². In some designs, the areal capacity loading on the cathode layer 503 may, for example, range from around 2 mAh/cm² to around 12 mAh/cm². In some designs, the average thickness of the anode current collector 518 and the cathode current collector 502 may range, for example, from around 5 microns to around 15 microns. In some designs, the average thickness of the separator layer 515 may range, for example, from around 1 micron to around 15 microns. In some designs, the average thickness of the cathode layer 503 may range, for example, from around 20 to around 200 microns. In some designs, the average thickness of the anode layer 519 may range, for example, from around 20 to around 200 microns. In some designs, the volume fraction of the electrolyte 514 within the cathode layer 503 may range, for example, from around 8 to around 40 vol. % (as a fraction of the total volume of the cathode layer 503). In some designs, the volume fraction of the electrolyte 514 within the anode layer 519 may range, for example, from around 8 to around 40 vol. % (as a fraction of the total volume of the layer 519).

Figure 6:
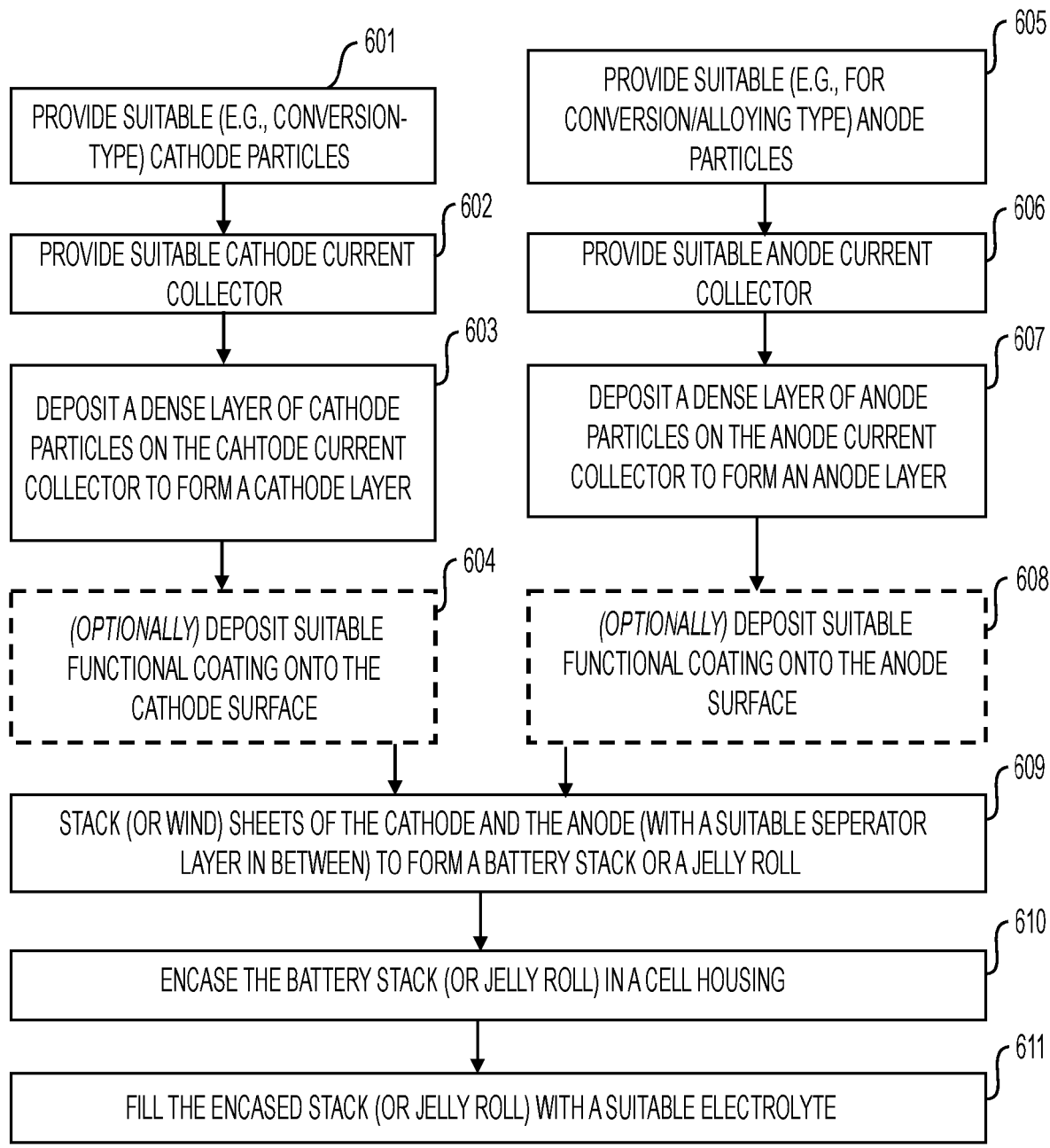
FIG. 6 illustrates examples of processes involved in constructing a cell comprising conversion-type electrodes, such as composite cathode particles comprising mixed metal (M) and LiF materials, in accordance embodiments of the present disclosure.

FIG. 6 illustrates example of a process that may be involved in constructing a cell comprising conversion-type electrodes, such as composite cathode particles comprising mixed metal (M) and LiF materials, in accordance embodiments of the present disclosure. Suitable (e.g., composite) cathode particles are provided (601), a suitable cathode current collector is provided (602) and the suitable cathode particles are then deposited onto the cathode current collector (603) by a suitable technique to form a densely packed cathode layer (in some designs, the deposited layer can be further densified/calendared). In some designs, binder and conductive additives may be added into the cathode layer to form a well-adhered and sufficiently conductive cathode layer. A surface of the produced cathode may then be optionally coated (e.g., at least partially) with a functional coating to form a functional layer (604) by a suitable technique (e.g., ALD). In some designs, a porous separator layer or a portion of the porous separator layer may be deposited onto the surface of the cathode before or after the functional layer formation. Before, during or after 601-604, (e.g., composite) anode particles are provided (605), a suitable anode current collector is provided (606) and the suitable anode particles are then deposited onto the anode current collector (607) by a suitable technique to form a densely packed anode layer (in some designs, the deposited layer can be further densified/calendared). In some designs, binder and conductive additives may be added into the anode layer to form a well-adhered and sufficiently conductive anode layer. A surface of the produced anode may then be optionally (e.g., at least partially) coated with a functional coating to form a functional layer (608) by a suitable technique (e.g., ALD). Then, the sheets of the cathode and the anode (with a suitable separator layer in between) are stacked or wounded to form a battery stack or a jelly roll (609), encased in a cell housing (610), filled with a suitable electrolyte by a suitable technique (611), and eventually sealed to form a battery cell.

The description is provided to enable any person skilled in the art to make or use embodiments of the present invention. It will be appreciated, however, that the present invention is not limited to the particular formulations, process stages, and materials disclosed herein, as various modifications to these embodiments will be readily apparent to those skilled in the art. That is, the generic principles defined herein may be applied to other embodiments without departing from the spirit or scope of the invention.

The invention claimed is:
1. A Li metal or Li-ion battery cell, comprising:
a conversion-type cathode capable of storing and releasing Li ions during battery cell operation;
a conversion-type or Li metal-type anode capable of storing and releasing the Li ions during the battery cell operation;
a separator membrane ionically coupling and electronically insulating the cathode and the anode; and
a solid electrolyte with a Li transference number in the range from around 0.7 to around 1.0 impregnating at least the cathode,
wherein:
the cathode comprises a composite core-shell particle and has an areal capacity loading that ranges from around 2 mAh/cm² to around 12 mAh/cm²;
a core of the composite core-shell particle comprises (i) LiF, (ii) metal nanoparticles comprising one, two, or more metals selected from Cu, Fe, Ni, Co and Bi or their alloys and (iii) a matrix material composition;
the solid electrolyte comprises a solid polymer electrolyte; and
the battery cell is free of liquid organic solvents in at least the cathode.

2. The Li metal or Li-ion battery cell of claim 1, wherein the solid electrolyte impregnates into both the anode and the cathode.

3. The Li metal or Li-ion battery cell of claim 1, wherein a volume fraction of the solid electrolyte in the cathode ranges from around 8 vol. % to around 35 vol. %.

4. The Li metal or Li-ion battery cell of claim 1, wherein the solid electrolyte exhibits a melting point or a glass transition temperature below around 400° C.

5. The Li metal or Li-ion battery cell of claim 4, wherein the solid electrolyte exhibits Li ion conductivity in excess of $10^{-4}$ S/cm either at room temperature or at battery cell operating temperatures.

6. The Li metal or Li-ion battery cell of claim 5, wherein a ratio of a mobility of $Cu^{2+}$ and $Fe^{2+}$ to a mobility of $Li^+$ in the solid electrolyte ranges from around $10^{-20}$ to around 0.05 at the battery cell operation temperatures.

7. The Li metal or Li-ion battery cell of claim 1, wherein the solid polymer electrolyte exhibits ultimate tensile strength in the range from around 0.05 MPa to around 500.0 MPa.

8. The Li metal or Li-ion battery cell of claim 1, wherein the solid polymer electrolyte exhibits a glass transition temperature from around minus (−) 90° C. to around 0° C.

9. The Li metal or Li-ion battery cell of claim 1, wherein the solid polymer electrolyte comprises one, two or more copolymers.

10. The Li metal or Li-ion battery cell of claim 1, wherein the solid polymer electrolyte exhibits a degree of crystallinity in the range from around 0.0 vol. % to around 30.0 vol. % at room temperature.

11. The Li metal or Li-ion battery cell of claim 1, wherein the solid polymer electrolyte comprises nitrogen (N) as a part of a polymer backbone.

12. The Li metal or Li-ion battery cell of claim 1, wherein the solid polymer electrolyte comprises sulfur (S) as a part of a polymer backbone.

13. The Li metal or Li-ion battery cell of claim 1, wherein the solid polymer electrolyte comprises one or more Li salts, wherein at least one Li salt comprises an anion immobilized by covalent attachment to a polymer backbone.

14. The Li metal or Li-ion battery cell of claim 1, wherein the solid electrolyte is free of liquid organic solvents throughout the battery cell.

15. The Li metal or Li-ion battery cell of claim 1, wherein a volumetric capacity of both the cathode and the anode exceeds around 700 mAh/cc.

16. The Li metal or Li-ion battery cell of claim 1, wherein the matrix material composition is configured to confine the LiF and the metal nanoparticles during the battery cell operation and to reduce volume changes in the composite core-shell particle during the battery cell operation.

17. The Li metal or Li-ion battery cell of claim 16, wherein at least one core component of the core conducts both Li+ cations and F− anions, wherein the at least one core component exhibits F− conductivity in the range from around 0.1% to around 500% of Li+ conductivity.

18. The Li metal or Li-ion battery cell of claim 1, wherein the anode comprises silicon (Si) or carbon (C) or both.

19. The Li metal or Li-ion battery cell of claim 1, wherein, in a discharged state, the anode comprises pores of sufficient pore volume to accommodate volume expansion in response to Li insertion.

20. The Li metal or Li-ion battery cell of claim 1, wherein the separator membrane comprises ceramic material, wherein a weight fraction of the ceramic material exceeds 1 wt. % relative to a total weight of the separator membrane.

21. The Li metal or Li-ion battery cell of claim 1, wherein the separator membrane comprises fibers or nanofibers.

* * * * *